(12) United States Patent
Abe et al.

(10) Patent No.: US 6,937,728 B1
(45) Date of Patent: Aug. 30, 2005

(54) VERIFIABLE ANONYMOUS CHANNEL

(75) Inventors: Masayuki Abe, Yokohama (JP);
Fumitaka Hoshino, Yokohama (JP);
Miyako Ohkubo, Yokohama (JP);
Atsushi Fujioka, Yokohama (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/573,351

(22) Filed: May 19, 2000

(30) Foreign Application Priority Data

May 19, 1999 (JP) ............................................ 11-139102
Nov. 22, 1999 (JP) ............................................ 11-331387

(51) Int. Cl.[7] ............................ H04N 7/167; G06F 1/04
(52) U.S. Cl. ...................... 380/237; 380/238; 380/239; 713/500; 713/600
(58) Field of Search ................................ 713/500, 600, 713/200, 201, 150, 160, 180, 181, 189, 502; 380/237, 238, 239

(56) References Cited

U.S. PATENT DOCUMENTS

| 5,682,430 A | * | 10/1997 | Kilian et al. | ................... | 380/30 |
| 6,049,613 A | * | 4/2000 | Jakobsson | ..................... | 380/47 |
| 6,377,688 B1 | * | 4/2002 | Numao | ......................... | 380/30 |

FOREIGN PATENT DOCUMENTS

| EP | 1054527 A2 | * | 11/2000 | ............. H04L/9/30 |
| JP | 08-263575 | | 10/1996 | |

OTHER PUBLICATIONS

Abe, M., "A Mix–network on Permutation Networks," Techn. Rpt. of IEICE, ISEC99–10 (May 1999), pp. 61–78 (and English translation).

Abe, M., "Permutation Network, Mix–Net More Efficient Mix–Network on Permutation Networks," The 2000 Symp. on Cryptography & Inf. Sec., Okinawa, Japan, Jan. 26–28, 2000, SCIS2000–B28.

Abe, M., "Universally Verifiable Mix–net with Verification Work Independent of the Number of Mix–servers," NTT Laboratories, Kanagawa–ken, Japan.

European Search Report, EP 00 11 0775, Apr. 19, 2002, p. 1–2.

XP–002196853, Remarks on Mix–Network Based on Permutation Networks, NTT Laboratories, Masayuki Abe et al., Feb. 15, 2001, p. 1–4.

XP–002196854, Millimix: Mixing in Small Batches, DIMACS Technical Report 99–33, Markus Jakobsson et al., Jun. 1999, p. 1–6.

XP–002196855, Universally Verifable Mix–Net with Verification Work Independent of the Number of Mix–Servers, NTT Laboratories, Masayuki Abe et al., Jun. 4, 1998, p. 1–6.

* cited by examiner

*Primary Examiner*—Norman M. Wright
(74) *Attorney, Agent, or Firm*—Connolly, Bove, Lodge & Hutz LLP

(57) ABSTRACT

Two El Gamal ciphertexts, which are input to a two-input two-output unit switching gates SW forming a permutation network, are randomized with a random number and randomly permuted, and a zero-knowledge proof, which proves the correspondence between the inputs and outputs of the switching gates SW, is output to a verifier without revealing the random number and the random permutation. A decryption unit decrypts ciphertexts from a unit switching gate SW in he last column through the use of a secret key, and proves in zero-knowledge the validity of the decryption without revealing the secret key. A verification unit verifies the proof of each unit switching gate and the proof of the decryption unit.

44 Claims, 28 Drawing Sheets

10A

☐ PR PARTIAL DECRYPTOR WITH PROOF FUNCTION

▭ FIXED PARTIAL DECRYPTOR WITH PROOF FUNCTION

BULLETIN BOARD

|   | 1 | 2 | 3 | ... | i | ... | j-1 | j | ... |
|---|---|---|---|---|---|---|---|---|---|
| 1 |   |   |   |   |   |   |   |   |   |
| 2 | O |   |   |   |   |   |   |   |   |
| 3 | O | × |   |   |   |   |   |   |   |
| ⋮ |   |   |   |   |   |   |   |   |   |
| i | O | O | O | ... |   |   |   |   |   |
| ⋮ |   |   |   |   |   |   |   |   |   |
| j-1 | O | × | O | ... | × | ... |   |   |   |
| j | O | × | O | ... | × | ... | O |   |   |
| ⋮ |   |   |   |   |   |   |   |   |   |

FIG. 33B

REGISTER OF SERVER $PS_j$

| k | 1 | 2 | 3 | ... | i | ... | j-1 |
|---|---|---|---|---|---|---|---|
| $R_k$ | TRUE | TRUE | FALSE | ... | FALSE | ... | TRUE |

PROCEDURE IN J-TH COLUMN

PROCEDURE FOR PROCESS 1

VERIFIABLE ANONYMOUS CHANNEL

BACKGROUND OF THE INVENTION

The present invention relates to a verifiable anonymous channel which is used, for instance, to implement secret voting through an electrical communication system and, more particularly, to an anonymous channel that can be implemented with high efficiency.

To facilitate a better understanding of the present invention, a description will be given of an anonymous channel. In general, each server can identify users connected thereto, and hence it can recognize the correspondence between the users and the messages that they are sending; therefore, channels between the users and the server have no anonymity. MIX-NET has been proposed to implement an anonymous channel not by a physical configuration but in the form of an electrical communication system. MIX-NET is a system wherein L servers $U_1, \ldots, U_L$ are cascade-connected via non-anonymous channels.

In the case of implementing the system through the use of the RSA function, an i-th server uses, as a decryption and an encryption key, $(d_i, n_i)$ and $(e_i, n_i)$ which satisfy $n_i = p_i - q_i$ and $e_i - d_i = 1 (\mod \text{LCM}(p_i-1, q_i-1))$ for large primes $p_i$ and $q_i$, respectively. The encryption of a message m by RSA starts with the selection of a random number r, followed by concatenating m and r into m∥r and then by obtaining an encrypted message M as $M:=(m\|r)^{gi} \mod n_i$. This encryption procedure using the encryption key $(e_i, n_i)$ of the server $U_1$ will hereinafter be denoted by $E_i(m,r)$.

A j-th user uses encryption keys $(e_i, n_i)$ of all servers, where $i=1, 2, \ldots, L$, and L random numbers $r_{j1}, r_{j2}, \ldots, r_{jL}$, for multiple encryption of his message $m_j$ into $$M_1 := E_1(E_2(\ldots (E_L(m_j, r_{jL}), \ldots), r_{j2}), r_{j1})$$

and then sends the encrypted message $M_1$ to the server $U_1$.

Having received encrypted messages $M_1, M_2, \ldots$ from more than two users, the server $U_1$ decrypts them with the key $(d_i, n_i)$ to obtain $E_2(\ldots (E_L(m_j, r_{jL}), \ldots), r_{j2})$ and $r_{j1}$ corresponding to each message $m_j$. The server $U_1$ randomly permutes $E_2(\ldots (E_L(m_j, r_{jL}), \ldots), r_{j2})$, where $j=1, 2, \ldots$, derived from the encrypted messages and sends them to the server $U_2$. At this time, by making secret the random number $r_{j1}$ attached to each message $m_j$, the server $U_1$ can cut the link between $E_2(\ldots (E_L(m_j, r_{jL}), \ldots), r_{j2})$ sent to the server $U_2$ and the encrypted messages $M_1, M_2, \ldots$ input to the server $U_1$.

The servers $U_2, \ldots, U_L$ also repeat the same processing as mentioned above. Finally, the server $U_L$ makes each message $m_j$ public. By making a secret of the random number $r_{ji}$ and the order of permutation by at least one server $U_i$, the correspondence between the ciphertexts input into the server $U_1$ and the messages output from the server $U_L$ is concealed; that is, the channel functions as an anonymous channel.

With the conventional scheme described above, even if each server does not perform a predetermined operation but falsifies or stealthily replaces messages, no one can detect the faults in of the output.

One possible scheme that provides verifiability is proposed, for example, in Masayuki ABE, "Universally Verifiable Mix-Net with Verification Work Independent of the Number of Mix-Servers," EUROCRYPT98, May 31. According to the proposed scheme, servers perform randomization and permutation first and then mutually prove and verify their outputs. Then, they perform the decryption and also mutually prove and verify their decrypted outputs. This scheme has the disadvantage of a high computation cost for the proof and verification by each server. For example, in the permutation process, let $O_1, \ldots, O_N$ represent the results of the randomization and random permutation of inputs $I_1, \ldots, I_N$. To prove, without revealing the random choices, that the outputs are the result of randomization and random permutation, the following steps are taken. The inputs $I_1, \ldots, I_N$ are randomized and randomly permuted; in the same way with independently chosen random factors, the results of process being represented by $O'_1, \ldots, O'_N$. In this instance, due to the homomorphic property of the randomization, $O'_1, \ldots, O'_N$ can be regarded as the result of randomization of $O_1, \ldots, O_N$. Here, the verifier chooses 0 or 1 as a challenge and sends it to the prover. When the challenge is 0, the prover publishes all the random choices used for the randomization/permutation of $\{I_1, \ldots, I_N\} \to \{O'_1, \ldots, O'_N\}$. When the challenge is 1, the prover publishes its random choices used for the randomization of $\{O_1, \ldots, O_N\} \to \{O'_1, \ldots, O'_N\}$. Once the random choices are known, the entire procedure can definitely be repeated, enabling the prover to verify the correctness of the input/output relationship. The probability that a fault by the prover in the above procedure cannot be detected is 1/2, equal to the probability that the prover guesses right the challenge; hence, the prover and the verifier repeat the above procedure a desired number k of times in order to prove and verify the correctness of the permutation/randomization process with an error probability $(1/2)^k$. Accordingly, the overall efficiency for N inputs is linear in Nk. The security parameter k is typically set at 80 to provide high reliability of the system.

Though not described to be applied to the anonymous channel, another scheme for verification is set forth in R. Cramer, I. Damgard and B. Schoenmakers, "Proofs of Partial Knowledge and Simplified Design of Witness Hiding Proofs," Proc. of Crypto '94, LNCS 839, pp. 174–187, Springer-Verlag. According to this scheme, the permutation of N inputs can be proved at a computation cost of $N^2$ as described below in brief. Letting $O_1$ represent the result of randomization of an input $I_1$, the relationship between $I_1$ and $O_1$ can be proved using a zero-knowledge interactive proof without revealing random elements used for the randomization. To execute such a zero-knowledge interactive proof, the following steps are performed:

1. The prover sends to the verifier a random message T called a commitment;
2. The verifier sends to the prover a random value C called a challenge C; and
3. The prover sends to the verifier a value Z that satisfies a verification equation on the basis of the commitment T and the challenge C.

The verifier makes a check to see if $(T, C, Z, I_1, O_1)$ satisfies a predetermined verification equation, thereby verifying the correctness of the relationship between $I_1$ and $O_1$. In such a proof system, if the prover does not know the value of the challenge C prior to the preparation of the commitment T, he can send the value Z that satisfies the verification equation only when the relationship between $I_1$ and $O_1$ is correct. On the other hand, however, if the prover knows the value C in advance, he can compute the values T and Z that satisfy the verification equation even if the relationship between $I_1$ and $O_1$ is not valid. Through utilization of this fact, it is possible for the prover to indicate that $I_1$ bears a valid or correct relationship to any one or more of $O_1, \ldots, O_N$. In the first place, the prover randomly selects $C_2, \ldots, C_N$ and $Z_2, \ldots, Z_N$ corresponding thereto, then determines the value of $T_i$ such that $(T_i, C_i, Z_i, I_i, O_i)$ satisfies a predetermined verification equation for i=1, ..., N. Furthermore, the prover chooses $T_1$ randomly. Thereafter, the following steps are carried out.

1. The prover sends $T_1, \ldots, T_N$ to the verifier;
2. The verifier sends his randomly chosen C to the prover, and
3. The prover computes $C_1 = C \oplus C_2 \oplus \ldots \oplus C_N$, then computes the value $Z_1$ such that $(T_1, C_1, Z_1, I_1, O_1)$ satisfies a verification equation, and sends $Z_1, \ldots, Z_N$ and $C_1, \ldots, C_N$ to the verifier. Here, $\oplus$ means bitwise exclusive OR. The verifier needs only to verify that $(T_i, C_i, Z_i, I_i, O_i)$ satisfies a predetermined verification equation for all of i=1, ..., N and to makes sure that $C = C_1 \oplus \ldots \oplus C_N$ holds. Since the prover does not know the value C in advance, he cannot manipulate at least one value $C_i$ inevitably; accordingly, it is possible to confirm that $I_1$ bears a correct relation to at least one value $O_i$.

With this scheme, the computation and communication costs for proving the relation $I_1 \rightarrow O_1$ or ... or $O_N$ are N times larger than those for proving the relation $I_1 \rightarrow O_1$, and consequently, the efficiency for proving the relation $\{O_1, \ldots, O_N\} \rightarrow \{O'_1, \ldots, O'_N\}$ is in the order of $N^2$. Accordingly, an increase in the number N of inputs gives rise to a problem that the amount of data to be processed becomes enormous.

As described above, according to the conventional schemes, the computation and communication cost for the proof and verification by each server is proportional in Nk or $N^2$, providing the disadvantage of low efficiency.

SUMMARY OF THE INVENTION

It is therefore an object of the present invention to provide a method and apparatus with which it is possible to efficiently prove and verify at less computation and communication cost that the output from each server has been permuted after the input thereto was correctly processed, and a recording medium having recorded thereon a program for implementing such a verifiable anonymous communication method.

The verifiable anonymous channel according to the present invention, in which N encrypted input messages, where N is an integer equal to or greater than 2, are permuted and randomized to obtain N output messages and it is proved to an arbitrary verifier that said output messages and said input messages have one-to-one correspondence with each other, comprises:

unit permutation means which: randomly permutes n inputs, where n is an integer equal to or greater than 2 but not exceeding said N, and randomizes said n inputs with secret information to provide n outputs; and executes zero-knowledge proofs to said arbitrary verifier that guarantees the existence of said secret information and said random permutation which indicate the correspondence between said n inputs and said n outputs without revealing said secret information and said random permutation to said arbitrary verifier;

first repeating means which repeatedly invokes the unit permutation means for N inputs in order to deal with N inputs and obtain N outputs.

second repeating means which takes N input messages, invokes the first repeating means to provide N intermediate outputs and succeedingly applies the repeating means to the N intermediate outputs as its inputs for predetermined number of times to obtain N permuted and randomized output messages that have a one-to-one correspondence with the initial N messages.

The verifiable anonymous communication method and a program recorded on a recording medium for implementing the method according to the present invention, in which N encrypted input messages, where N is an integer equal to or greater than 2, are permuted and randomized to obtain N output messages and it is proved to an arbitrary verifier that said output messages and said input messages have one-to-one correspondence with each other, comprise the steps of:

(a) randomly permuting n inputs, where n is an integer equal to or smaller than 2 but not exceeding said N, and randomizing said n inputs with secret information to provide n outputs, and executing zero-knowledge proofs to said arbitrary verifier that guarantees the existence of said secret information and said random permutation which indicate the correspondence between said n inputs and said n outputs without revealing said secret information and said random permutation to said arbitrary verifier;

(b) repeatedly invoking the unit permutation means for n inputs in order to deal with N inputs and obtain N outputs; and (c) taking said N input messages, providing N intermediate outputs and succeedingly applying said first repeating means to said N intermediate outputs as said inputs for a predetermined number of times to obtain N permuted and randomized output messages that have a one-to-one correspondence with the initial N messages.

BRIEF DESCRIPTION OF THE DRAWINGS

FIG. 33A is a table showing the results of decision on the reliability of permutation servers published on a bulletin board in another input list retrieval processing scheme;

FIG. 33B is a table showing an example of reliability information that each permutation server holds in a register in the retrieval processing scheme of FIG. 33A;

DETAILED DESCRIPTION OF THE PREFERRED EMBODIMENTS

According to the present invention, instead of proving and verifying the validity or correctness of randomization and random permutation of the entire input as in the prior art, the input is divided into groups each consisting of a small number of input segments and, for each segment, the validity of its input/output is proved and verified.

Figure 1:
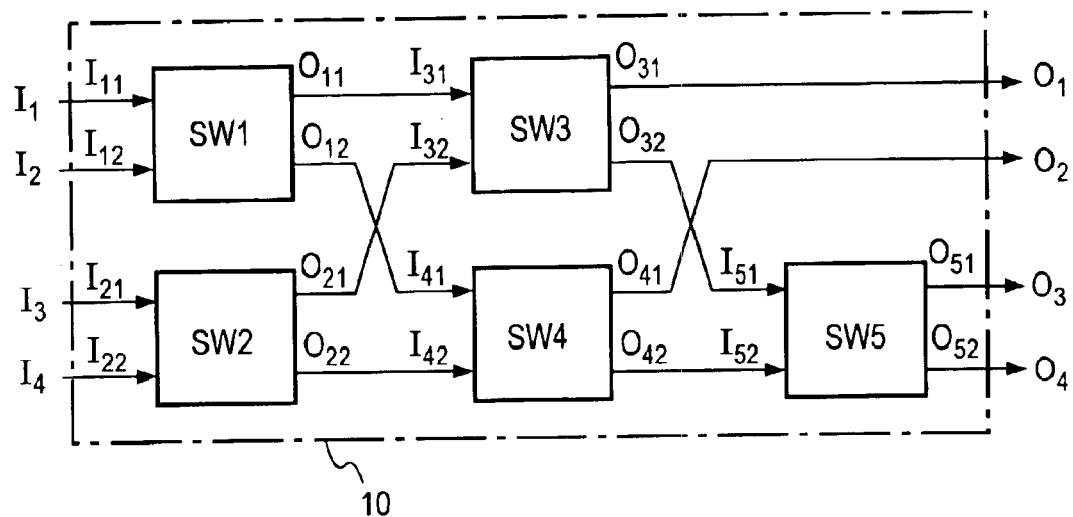
FIG. 1 is a block diagram depicting a conventional permutation network for four inputs.

It is well-known in the art that, for example, by arranging a plurality of two-input-two-output change-over switches (which are each switchable between a permutation mode in which to permute two inputs and a non-permutation mode in which not to permute the two inputs) in a matrix form and connecting the outputs of each column to the inputs of the next column in accordance with a rule, a permutation network can be constituted which covers the entire permutation of a total of $2^L$ inputs (see A. Waksman, "A Permutation Network," Journal of the ACM, Vol. 15, No. 1, January 1968, pp. 159–163). FIG. 1 depicts a configuration of the permutation network 10 for four inputs. A change-over switch SW1 either passes therethrough inputs intact like $(O_{11}, O_{12})=(I_{11}, I_{12})$ or outputs them after permutation like $(O_{11}, O_{12})=(I_{12}, I_{11})$. The other change-over switches SW2 to SW5 also operate likewise. With such a combined use of five change-over switches as depicted in FIG. 1, it is possible to implement a total of $4^2=16$ kinds of permutations for four inputs. Such a permutation network will hereinafter be referred to as a perfect permutation network. In general, it is well-known that a perfect permutation network for N inputs can be formed using $N \log_2 N - N + 1$ change-over switches.

In view of the above, according to the present invention, each of the change-over switches SW1 to SW5 is provided with a function of proving randomization and random permutation of its inputs to form a unit switching gate; every unit switching gate proves the validity of random permutation, thereby proving the validity of permutation of the entire input. The second-mentioned conventional scheme is used for each switching gate to generate the proof. Accordingly, for instance, when the number of inputs to each switching gate is two, the proofs and its verification can be executed at a computation cost $2^2=4$; hence, it is feasible to keep the total computational cost down to approximately $4(N \log_2 N - N + 1)$.

First Embodiment

Figure 2:
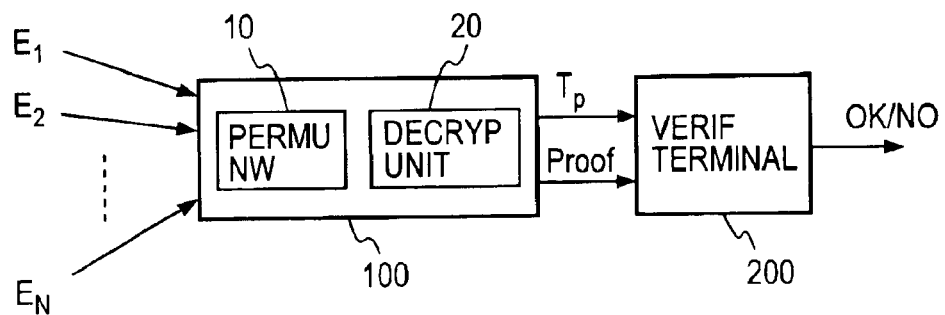
FIG. 2 is a bock diagram illustrating the overall system to which the present invention is applied.

FIG. 2 depicts a verifiable anonymous channel system according to the present invention which comprises: an anonymous channel 100 which receives N ciphertexts or encrypted messages $E_1, \ldots, E_N$ and outputs the results of decryption after randomly permuting them to conceal the correspondence between the inputs and the outputs; and a verification terminal 200 which verifies the validity of the random permutation and the validity of the decryption. In this embodiment the anonymous channel 100 accepts the input ciphertexts $E_1, \ldots, E_N$, then permutes and decrypts them to obtain a list of plaintexts, Tp, then generates proofs necessary for verification of the permutation and the decryption, and sends it to the verification terminal 200 together with Tp.

The anonymous channel 100 has its switching gates SW1 to SW5 connected to form a perfect permutation network. According to the present invention, the switching gates SW1 to SW5 perform random permutation of the inputs and output proofs $Proof_1$ to $Proof_5$ that prove the validity of the permutation in zero-knowledge. In this embodiment each of the switching gates SW1 to SW5 does not decrypt but randomize and permute the input ciphertexts, and after the processing by the permutation network 10, they are decrypted by the decryption unit 20; however, the ciphertexts may be decrypted by the switching gates SW as in the fourth embodiment of the invention described later on. In the latter case, however, each switching gate SW needs to execute a zero-knowledge proof of the decryption by the use of a secret key, whereas in the former case (in the first embodiment) a zero-knowledge proof is done for all the decryptions by the decryption unit 20, and hence the total operation cost can be reduced.

Let p and q represent two predetermined large primes, and assume that p is not divisible by q. Let Gp represent a subgroup of an order q in Zp and g represent an element of the subgroup Gp. In the following, all arithmetic operations are conducted in mod p unless otherwise specified. Let decryption and encryption keys for El Gamal encryption be represented by $x \in Zq$ and $y:=g^R$, respectively. Assume that the encryption key y is prestored as a common parameter, together with predetermined p, q and g, in every switching gate SW forming the permutation network 10 in FIG. 3 described later on and in a memory 23 (FIG. 7) of the decryption unit 20 and a memory 220 in the verification terminal 200. Assume that the decryption key x is prestored solely in the decryption unit 20.

Letting E be an El Gamal ciphertext of a message $m \in Gq$, E becomes as follows, for a random number $t \in Zp$.

$E:=(M, G)=(my^t, g^t)$

Let $E_1$, $E_2$, $E_3$ and $E_4$ represent four El Gamal ciphertexts when the number of inputs to the system is 4.

Figure 3:
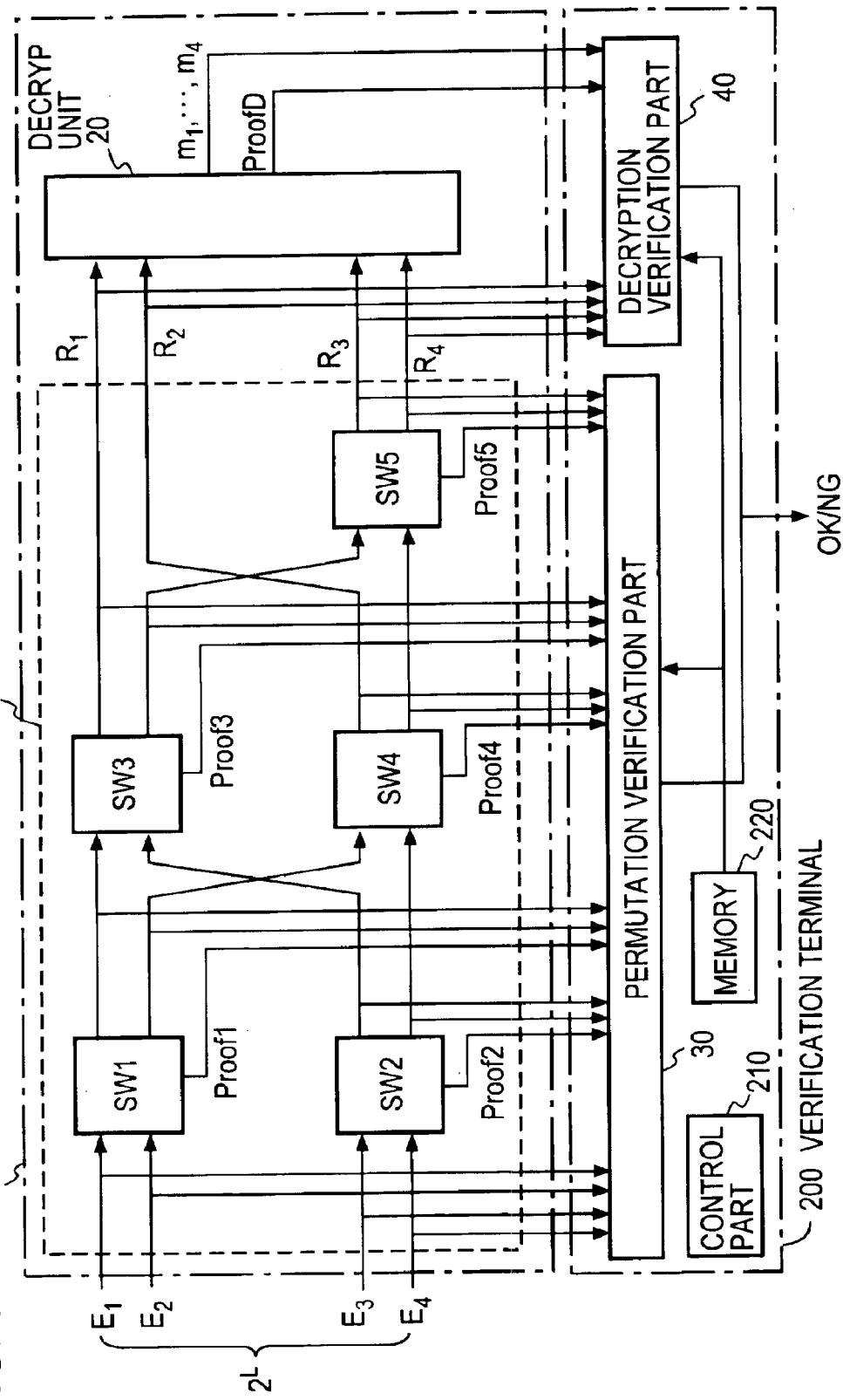
FIG. 3 is a block diagram depicting the configuration of an anonymous channel for four inputs and the configuration of a verification terminal.
Figure 4:
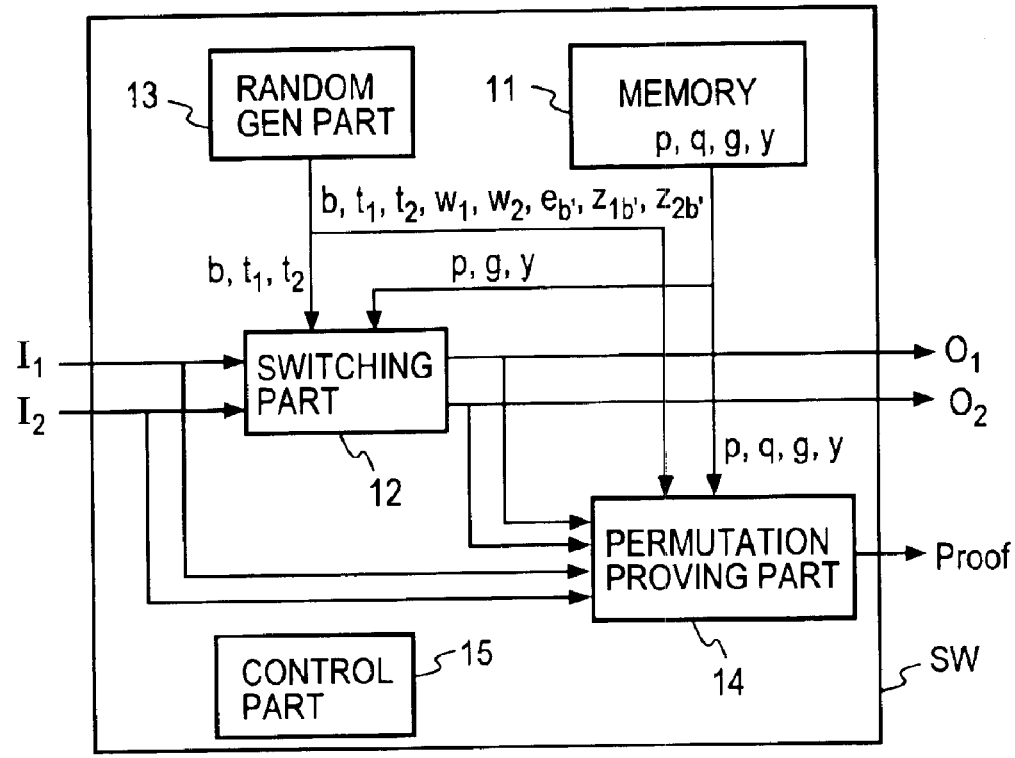
FIG. 4 is a block diagram depicting the configuration of a switching gate SW in FIG. 3.
Figure 5:
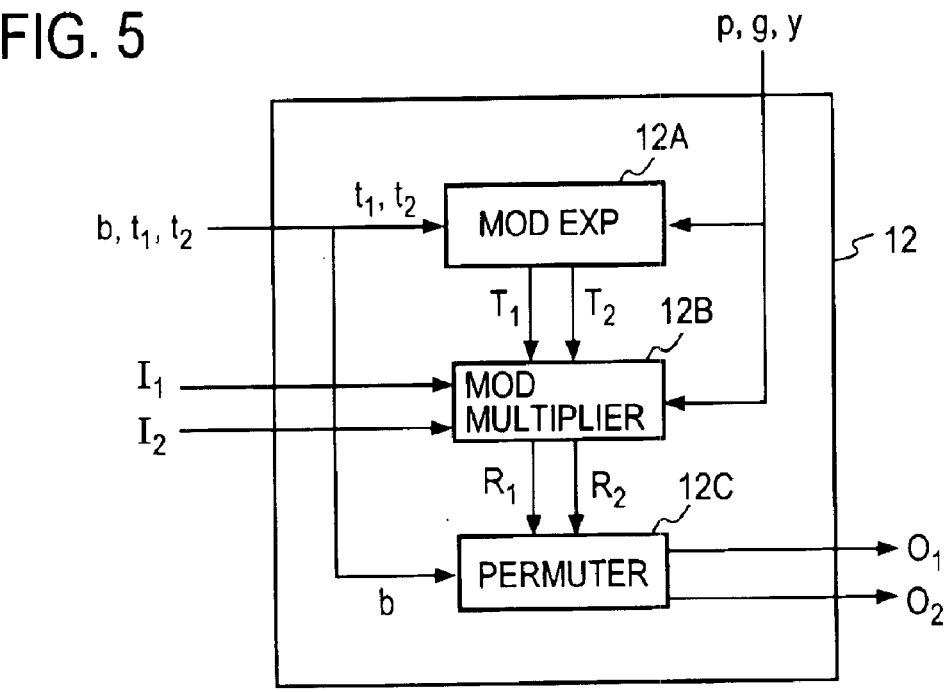
FIG. 5 is a block diagram depicting the configuration of a switching part 12 in FIG. 4.
Figure 6:
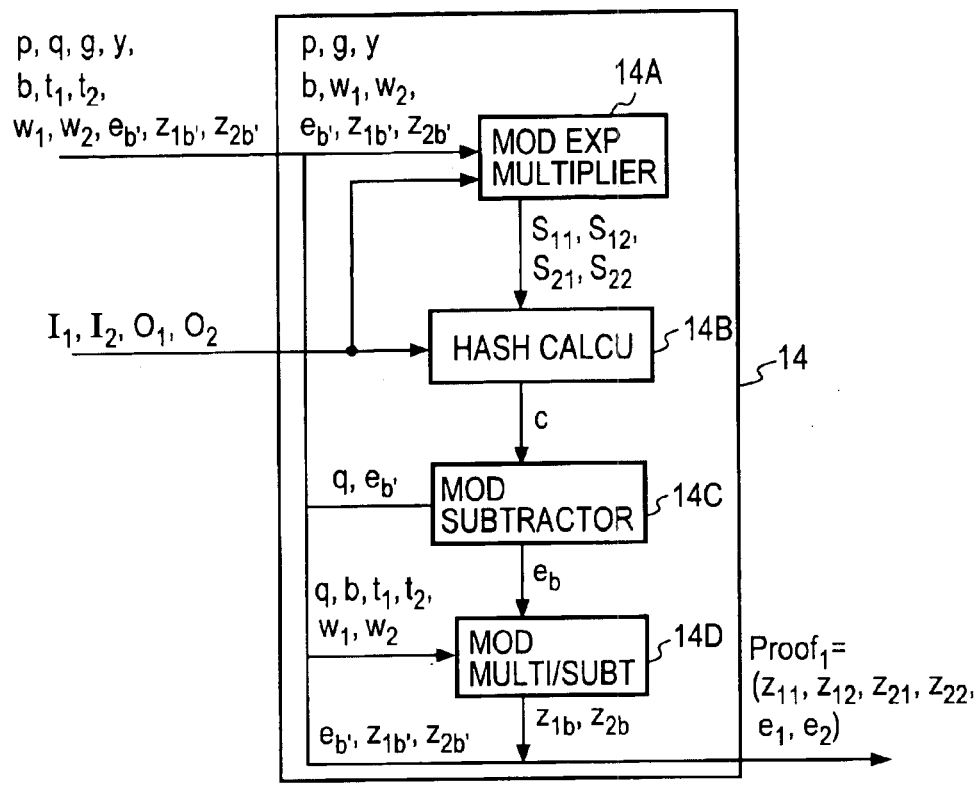
FIG. 6 is a block diagram depicting the configuration of a permutation proving part 14 in FIG. 4.

FIG. 3 depicts in block form the anonymous channel 100 and the certification terminal 200 in a four-input system. The configuration of each of the switching gates SW1 to SW5 is depicted in FIG. 4. The configurations of a switching part 12 and a permutation proving part 14 in each switching gate SW are shown in FIGS. 5 and 6, respectively. The anonymous channel 100 comprises the permutation network 10 and the decryption unit 20. In the permutation network 10 the ciphertexts $E_1$ and $E_2$ are input to the switching gate SW1 and the ciphertexts $E_3$ and $E_4$ are input to the switching gate SW2. Two outputs from the switching gate SW1 are provided to the switching gates SW3 and SE4, respectively. Similarly, two outputs from the switching gate SW2 are provided to the switching gates SW3 and SW4, respectively. The one of the two outputs from each of the switching gates SW3 and SW4 is applied to the switching gate SW5, the other outputs $R_1$ and $R_2$ are applied to the decryption unit 20, and two outputs $R_3$ and $R_4$ from the switching gate SW5 are also applied to the decryption unit 20.

The input ciphertexts $E_1$ to $E_4$ and the two outputs from each of the switching gates SW1 to SW5 are each branched into a permutation verification part 30 of the verification terminal 200, to which are also provided the permutation proof outputs $Proof_1$ to $Proof_5$ from the switching gates SW1 to SW5. The four inputs $R_1$ to $R_4$ to the decryption unit 20 are also branched to a decryption verification part 40, to which are also applied from the decryption unit 20 decrypted messages $m_1, \ldots, m_4$ constituting a decrypted proof output ProofD and the plaintext list Tp. The verification terminal 200 has a control part 210 and a memory 220.

As depicted in FIG. 4, the switching gate SW is made up of a memory 11 which has stored therein p, q, g and y, a switching part 12 which merely perform a two-input-two-output permutation, a random generating part 13, a permutation proving part 14 for proving the validity of the permutation, and a control part 14 for controlling the operations of these parts 11 to 14. The switching part 12 is composed of a modular exponentiator 12A, a modular multiplier 12B, and a permuter 12C. The permutation proving part 14 comprises, as shown in FIG. 6, a modular exponentiation multiplier 14A, a hash calculator 14B, a modular subtractor 14C, and a modular multiplier/subtractor 14D.

The switching gate SW1 performs the following steps of operation (see FIG. 4).

Step 1: Input p, g and y from the memory 11 to the switching part 12.

Step 2: Drive the random generator 13 to generate a random number $b \in \{1, 2\}$ and $t_1, t_2 \in Zq$ and input them to the switching part 12.

Step 3: The switching part 12 operates as follows (see FIG. 5).

Step 3-1: Drive the modular exponentiator 12A to compute
$T_1:=(y^{t_1}, g^{t_1})$, $T_2:=(y^{t_2}, g^{t_2})$.

Step 3-2: Input the outputs $T_1$, $T_2$ from the modular exponentiator 12A and the inputs $I_1=(M_1, G_1)$, $I_2=(M_2, G_2)$ to the modular multiplier 12B to compute
$R_1:=(M_1 y^{t_1}, G_1 g^{t_1})$, $R_2:=(M_2 y^{t_2}, G_2 g^{t_2})$ By the above exponentiation and modular multiplication, the input messages $I_1=(M_1, G_1)$ and $I_2=(M_2, G_2)$ are randomized with the secret information $t_1$, $t_2$.

Step 3-3: Input the outputs $R_1$, $R_2$ from the modular multiplier 12B and the random number b to the permutater 12C. The permutater 12C outputs $O_1:=R_2$ and $O_2:=R_2$ when b=1, and outputs $O_1:=R_2$ and $O_2:=R_1$ when b=2. Let this output be $O_1=(N_1, H_1)$ and $O_2=N_2, H_2)$. Such randomized input messages have their order randomized by b, that is, they are randomly permuted.

Step 4: Drive the random generator 13 in FIG. 4 to generate random numbers $w_1, w_2, e_{b'}, z_{1b'}, z_{2b'} \in Zq$ and provide them to the permutation proving part 14 together with b, $t_1$, $t_2$. Assume that b'=2 when b=1 and b'=1 when b=2. And p, q, g, y are read out of the memory 11 and fed to the permutation proving part 14.

Step 5: The permutation proving part 14 operates as follows (see FIG. 5).

The permutation proving part 14 has branched thereto the two inputs $I_1$, $I_2$ and two outputs $O_1$, $O_2$ of he switching part 12.

Step 5-1: Drive the modular exponentiation multiplier 14A to compute $S_{1b}:=(y^{w_1}, g^{w_1})$ $S_{1b'}:=(N_b{}^{e_{b'}}M_1{}^{-e_{b'}}y^{z_{1b'}}, H_b{}^{e_{b'}}G_1{}^{-e_{b'}}g^{z_{1b'}})$ $S_{2b}:=(y^{w_2}, g^{w_2})$ $S_{2b'}:=(N_b{}^{e_{b'}}M_2{}^{-e_{b'}}y^{z_{2b'}}, H_b{}^{e_b}: G_2{}^{-e_{b'}}g^{z_{2b'}})$ Step 5-2: Input $I_1, I_2, O_1, O_2, S_{11}, S_{12}, S_{21}, S_{22}$ to the hash calculator 14B. Let its output be represented by c.

Step 5-3: Input c and q, $e_{b'}$ to the modular subtractor 14C to compute $e_b:=c-e_{b'} \mod q$.

Step 5-4: Input $e_b$ and $w_1, w_2, q, b, t_1, t_2$ to the modular multiplier/subtractor 14D to compute $z_{1b}:=w_1-e_b \cdot t_1 \mod q$ $z_{2b}:=w_2-e_b \cdot t_2 \mod q$ Step 5-5: To prove in zero-knowledge that the permutation is valid, output $Proof_1:=(e_1, e_2, z_{11}, z_{12}, z_{21}, z_{22})$.

Let $R_1, R_2, R_3, R_4$ represent the outputs that are provided at the terminals of the permutation network 10. At this time, setting $R_1=(M'_1, G'_1)$, the following relations hold.

$$M'_i=mF(i)y^{t^i}$$
$$G'_i=g^{t^i}$$

where $F(*)$ is a permutation function $\{1, 2, 3, 4\} \rightarrow \{1, 2, 3, 4\}$. That is, $R_i$ is an ordinary El Gamal ciphertext for the message $mF(i)$, and it can be decrypted following an ordinary El Gamal decryption procedure.

Figure 7:
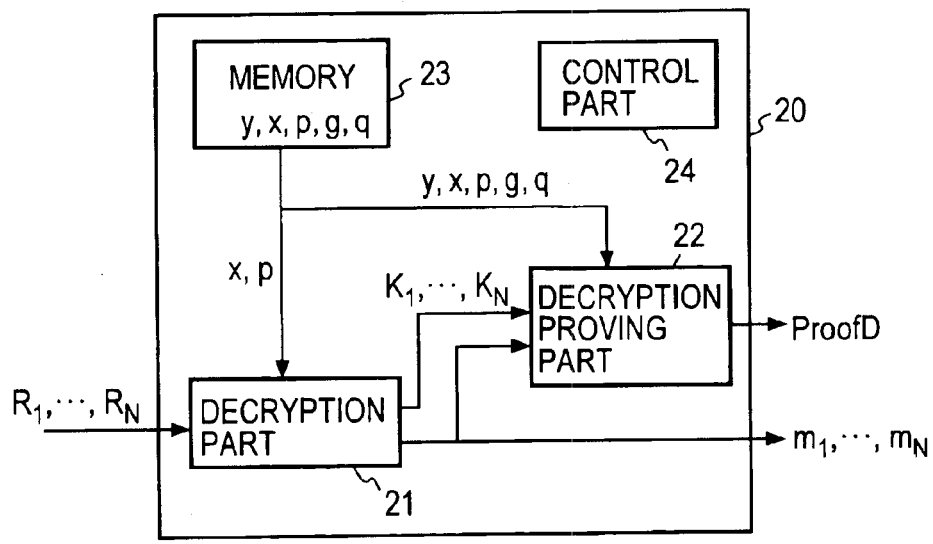
FIG. 7 is a block diagram depicting the configuration of a decryption unit 20 in FIG. 3.
Figure 8:
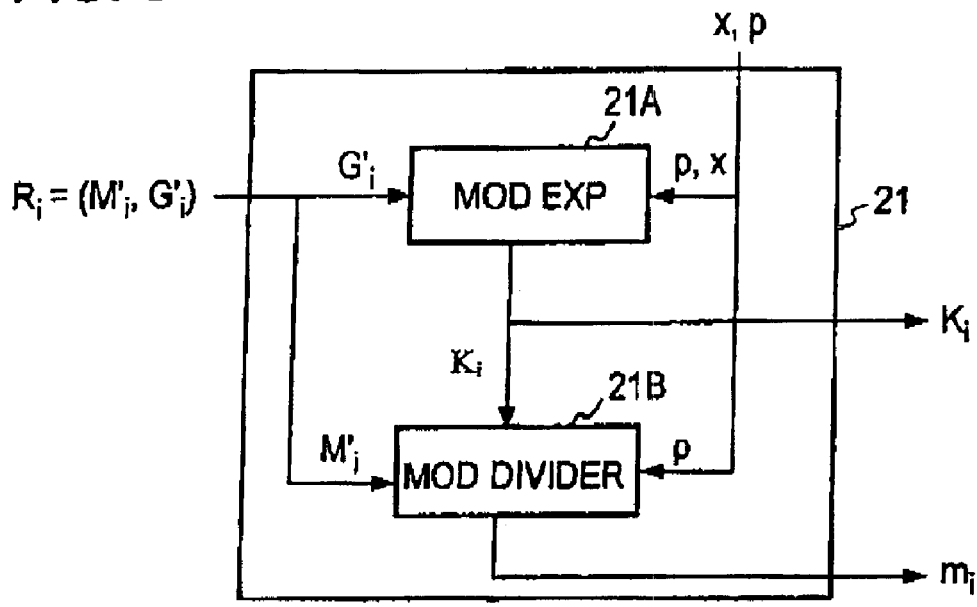
FIG. 8 is a block diagram depicting the configuration of a decryption part 21 in FIG. 3.
Figure 9:
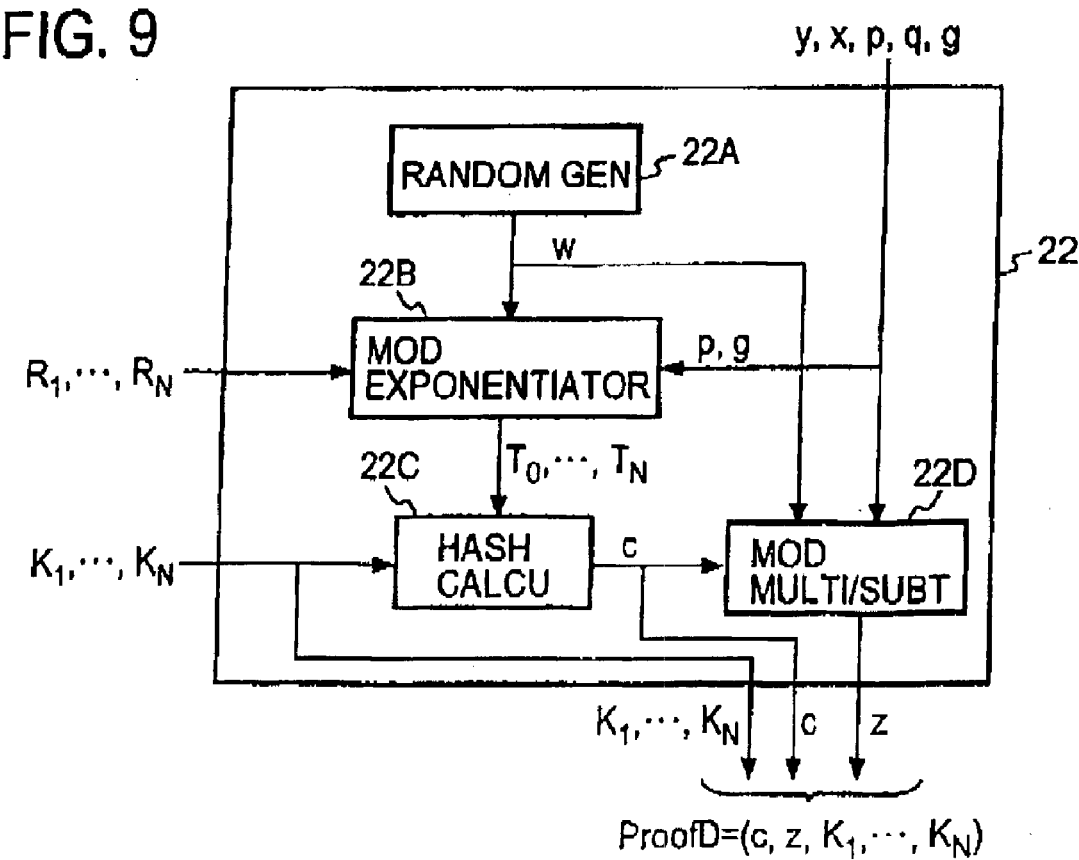
FIG. 9 is a block diagram depicting the configuration of a decryption proving part 22 in FIG. 7.

The decryption unit 20 comprises, as depicted in FIG. 7, a decryption part 21, a decryption proving part 22, a memory 23 and a control part 24 for controlling their operation. The decryption part 21 is made up of a modular exponentiator 21A and a modular divider 21B as depicted in FIG. 8. The decryption proving part 22 comprises, as shown in FIG. 9, a random generator 22A, a modular exponentiator 22B, a hash calculator 22C and a modular multiplier/subtractor 22D.

The decryption unit 20 performs the following steps to process the outputs $R_1$ to $R_4$ one after another.

Step 1: The control part 24 sequentially receives the inputs $R_i$ and provides them to the decryption part 21. Further, the control part 24 reads out x, p from the memory 23 and inputs them to the decryption part 21.

Step 2: In decryption part 21, $G'_i$ and x, p are input to the modular exponentiator 21A to compute $K_i:=G'_i{}^x$ mod p.

Step 3: $M'_i$, p and the output from the modular exponentiator 21A are input to the modular divider 21B to compute $m_i:=M'_i/K_i$ mod p which is output as the result of decryption.

Following this, the decryption unit 20 generates in the decryption proving part 22 the ProofD that proves the correctness of the decryption as described below.

Step 1: The decryption proving part 22 generates a random number $w \in Z_q$ by the random generator 22A as depicted in FIG. 9 and provides it to the modular exponentiator 22B.

Step 2: The modular exponentiator 22B first computes $T_o:=g^w$ mod p, then computes $T_i:=G'_i{}^w$ mod p, and provides them to the hash calculator 22C. In this example, N=4.

Step 3: The hash calculator 22C computes c:=Hash(y, $T_o$, $K_1, T_1, \ldots, K_N, T_N$) and provides c to the modular multiplier/subtractor 22D.

Step 4: The modular multiplier/subtractor 22D computes z:=w−cx(mod q) and outputs it together with c, z, $K_1, \ldots, K_N$.

At this time, set ProofD:=(c, z, $K_1, \ldots, K_N$).

Figure 10:
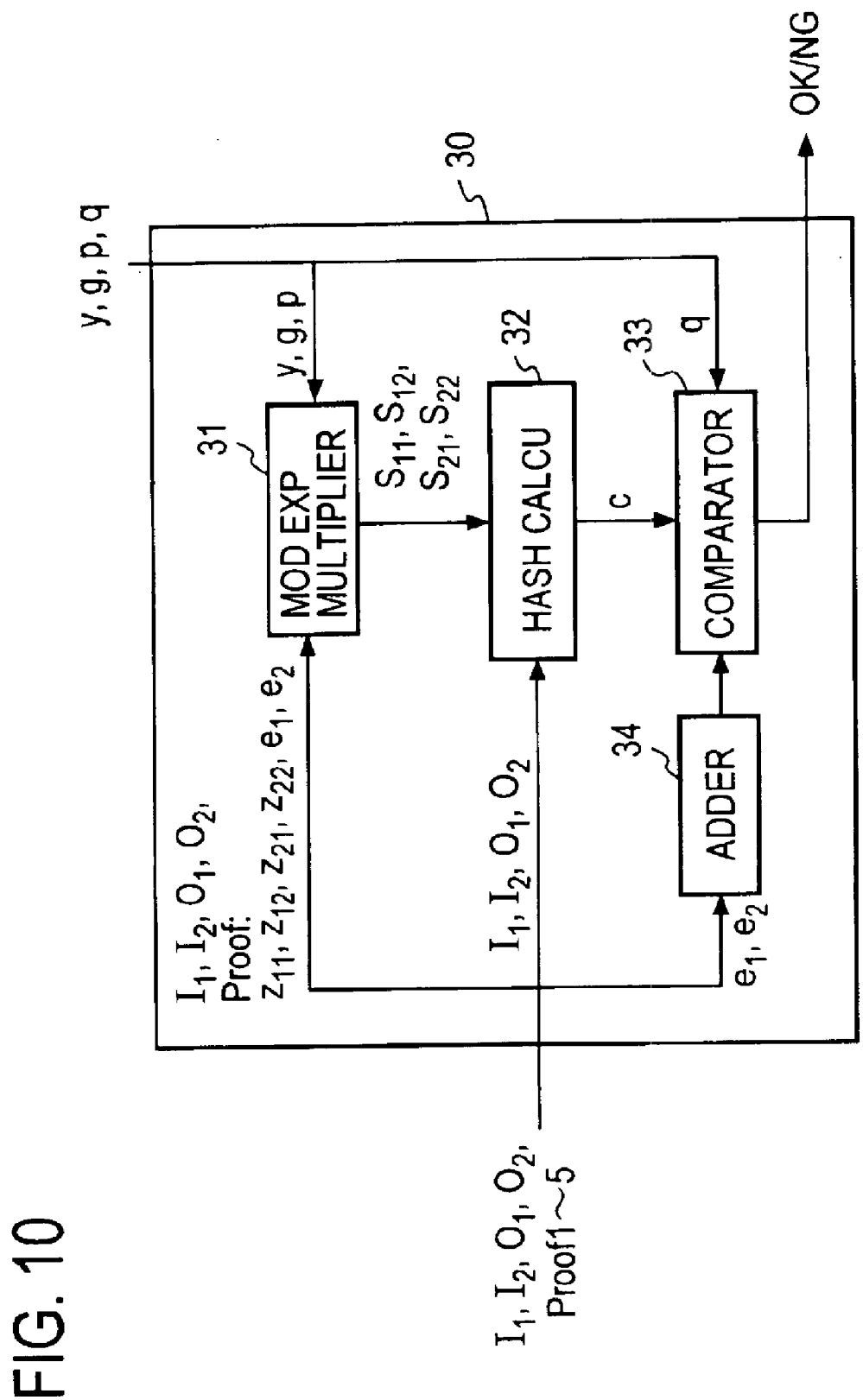
FIG. 10 is a block diagram depicting the configuration of a permutation verification part 30 in FIG. 3.

The verification terminal 200 first drives the permutation verification part 30 to make sure that the permutation was executed correctly. The permutation verification part 30 comprises, as depicted in FIG. 10, a modular exponentiation multiplier 31, a hash calculator 32, a comparator 33 and an adder 34. The permutation verification part 30 follows the following procedure to verify $Proof_i$ by the i-th switching gate $SW_i$.

Step 1: Drive the modular exponentiation multiplier 31 to compute $S_{11}:=(N_1{}^{e_1}M_1{}^{-e_1}y^{z_{11}}, H_1{}^{e_1}G_1{}^{-e_1}g^{z_{11}})$
$S_{12}:=(N_1{}^{e_1}M_1{}^{-e_1}y^{z_{11}}, H_1{}^{e_1}G_1{}^{-e_1}g^{z_{11}})$
$S_{21}:=(N_1{}^{e_1}M_1{}^{-e_2}y^{z_{21}}, H_1{}^{e_2}G_1{}^{-e_2}g^{z_{21}})$
$S_{22}:=(N_1{}^{e_1}M_2{}^{-e_1}y^{z_{22}}, H_1{}^{e_2}G_2{}^{-e_2}g^{z_{22}})$ Step 2: Input $S_{11}, S_{12}, S_{21}, S_{22}$ and $I_1, I_2, O_1, O_2$ to the hash calculator 32, and input its output to the comparator 33.

Step 3: Input $e_1, e_2$ to the adder 34 to compute $e_1+e_2$, and input the result of addition to the comparator 33.

Step 4: Input q to the comparator 33 to make a check to see if $e_1+e_2=c(\text{mod } q)$ holds. If it holds, output OK, and if not, output NG. In this way, the correctness of permutation is verified in zero-knowledge without revealing the random number b on the basis of which the permutation was performed.

Figure 11:
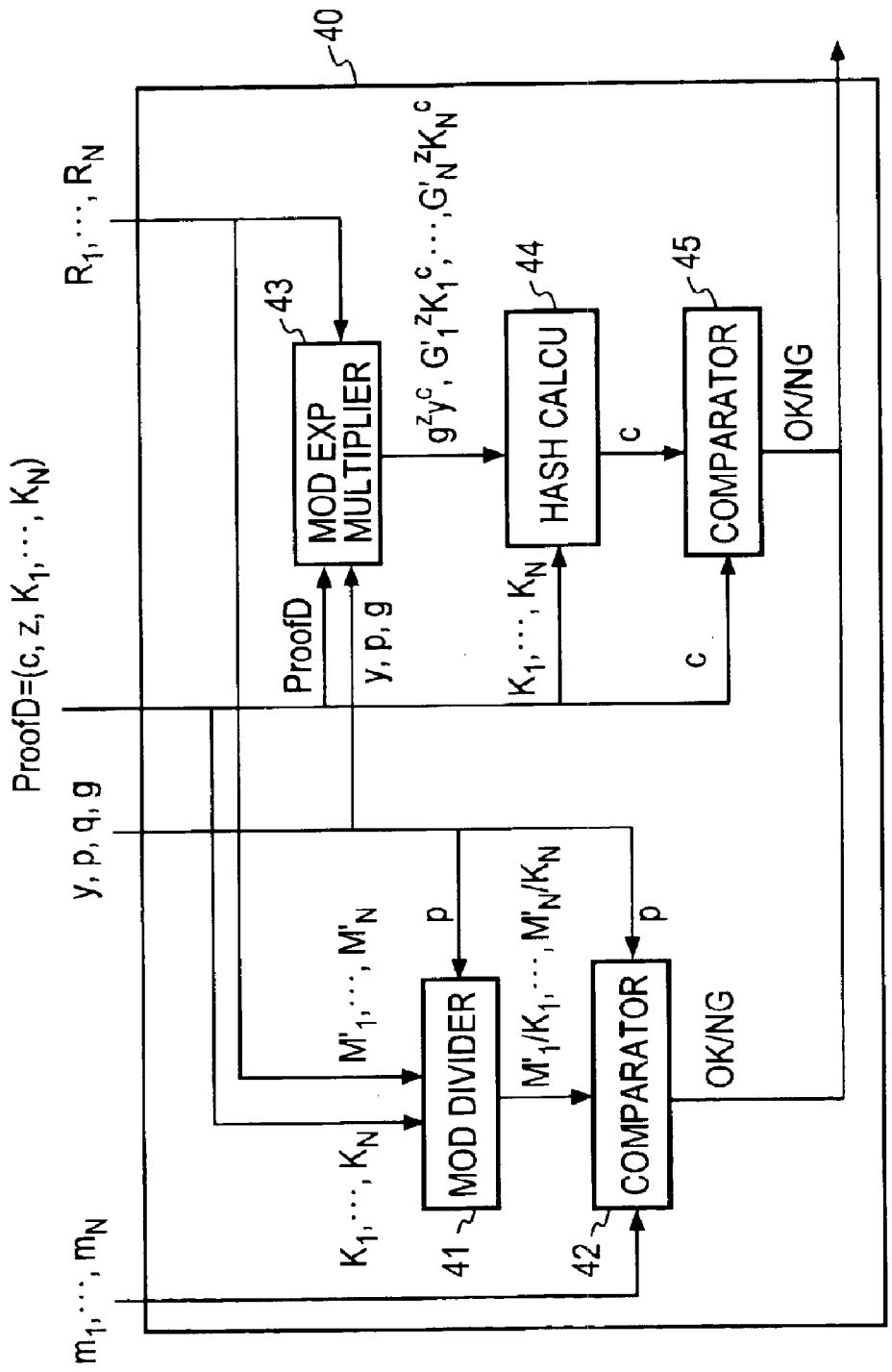
FIG. 11 is a block diagram depicting the configuration of a decryption verification part 40 in FIG. 3.

The above-described verification is made for the input/output of every switching gate, and a switching gate that outputs NG is regarded as being faulty. When the proofs from all the switching gates successfully pass the verifications, $R_1, \ldots, R_{4,m1}, \ldots, m_4$ and ProofD are provided to the decryption verification part 40 to verify that the decryption was performed correctly. FIG. 11 depicts in block form the decryption verification part 40, which is made up of a modular divider 41, a comparator 42, a modular exponentiation multiplier 43, a hash calculator 44 and a comparator 45. The decryption verification part 40 verifies the decryption as described below.

Step 1: Input $M'_i$ and $K_i$ to the modular divider 41 to compute $M'_i/K_i$ and input the result of division, together with $m_i$, to the comparator 42 for comparison. If they are not equal to each other, the comparator 42 outputs NG, making the result of verification NG. When the result of comparison is OK for all i=1, ..., N, proceed to the next step.

Step 2: Drive the modular exponentiation multiplier 43 to compute $g^z c^c$ and $G'_1{}^z K_1{}^c, \ldots, G'_N{}^z K_N{}^c$, and provide the results of computation to the hash calculator 44.

Step 3: Drive the hash calculator 44 to compute e:=Hash(y, $g^z y^c$, $K_1$, $G'_1{}^z K_1{}^c, \ldots, K_N, G'_1{}^z K_1{}^c$).

Step 4: Input c and e output from the hash calculator 44 to the comparator 45, which outputs OK or NG, depending on whether they are equal or not.

When the decryption was conducted correctly, $G^z y^c = g^{w-cx} y^c = g^w = T_c$ and $G'_i{}^z K_i{}^c = G'_i{}^{w-cx} K_i{}^c = G'_i{}^w = T_i$ hold, and hence the output from the hash calculator 44 is equal to c.

In this embodiment, when the random elements used in each switching gate, that is, b, $t_1, t_2, w_1, w_2$, are all kept secret, the correspondence $E_i \rightarrow m_j$ is concealed for any values of i and j. As described above, since this embodiment has a construction in which each switching gate proves the correctness of its random permutation, the amount of data to be processed is significantly smaller than in the case of proving the validity of random permutation by the aforementioned R. Cramer et al. scheme, especially when the number N of inputs to the anonymous channel is large.

Second Embodiment

This embodiment is adapted to conceal the correspondence between inputs and outputs as a whole even if random elements used in some of the switching gates leak out.

Figure 12:
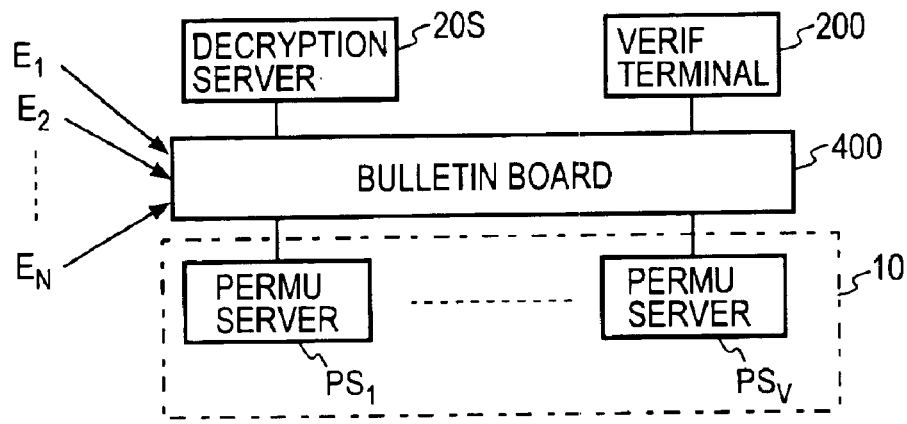
FIG. 12 is a block diagram illustrating the system configuration of a second embodiment of the present invention.

FIG. 12 depicts in block form the principal part of this embodiment, in which the permutation network 10 is comprised of V "permutation servers" $PS_1, \ldots, PS_V$ each of which performs tasks of several switching gates in a sequential order. The following description will be given of the case where four permutation servers form the permutation network 10 and four messages are input. The permutation servers $PS_1$ to $PS_4$ and the verification terminal 200 are supposed to be connected to a bulletin board 400. The bulletin board 400 accepts writes $E_1, \ldots, E_N$ from authenticated users, and has a function that information once written thereon cannot be erased. Assume that the information written on the bulletin board 400 is accessible by anyone. In this embodiment, too, as is the case with the first embodiment, each switching gate SW (FIG. 13) of each permutation server PS in the permutation network 10 does not perform decryption but perform randomization (transformation) and random permutation of input ciphertexts, and the decryption server ultimately perform decryption.

Figure 13:
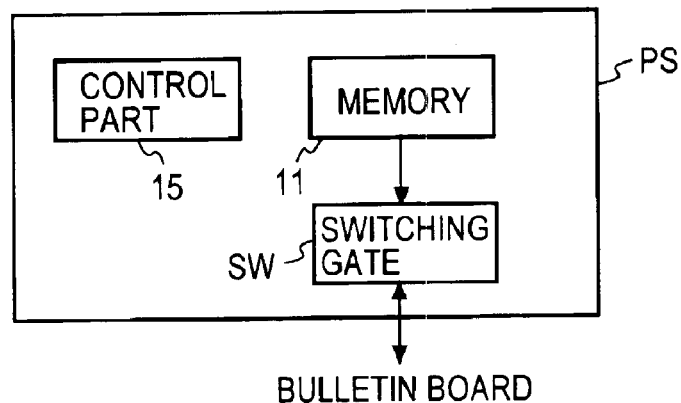
FIG. 13 is a block diagram depicting the configuration of a permutation server PS in FIG. 12.

FIG. 13 depicts in block form the permutation server PS. The switching gate SW in the permutation server PS is identical with the switching gate SW in FIG. 4 except that the control part 15 and the memory 11 are placed outside the switching gate SW.

Figure 14:
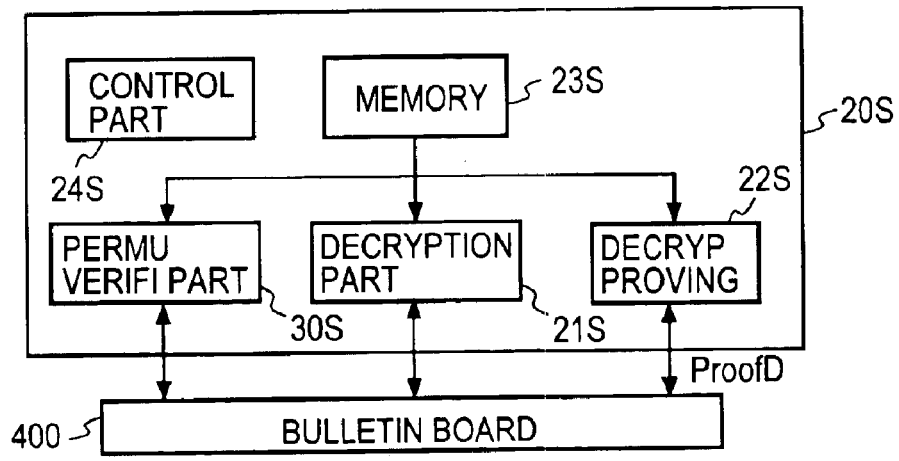
FIG. 14 is a block diagram depicting the configuration of a decryption server 20S in FIG. 12.

FIG. 14 shows in block form the decryption server 20S. The decryption server 20S comprises a permutation verification part 30S, a decryption part 21S and a decryption proving part 22S, which are identical with the permutation verification part 30, the decryption part 21 and the decryption proving part 22 shown in FIGS. 10, 8 and 9, respectively. The decryption server 20S further comprises a memory 23S and a control part 24S.

Figure 15:
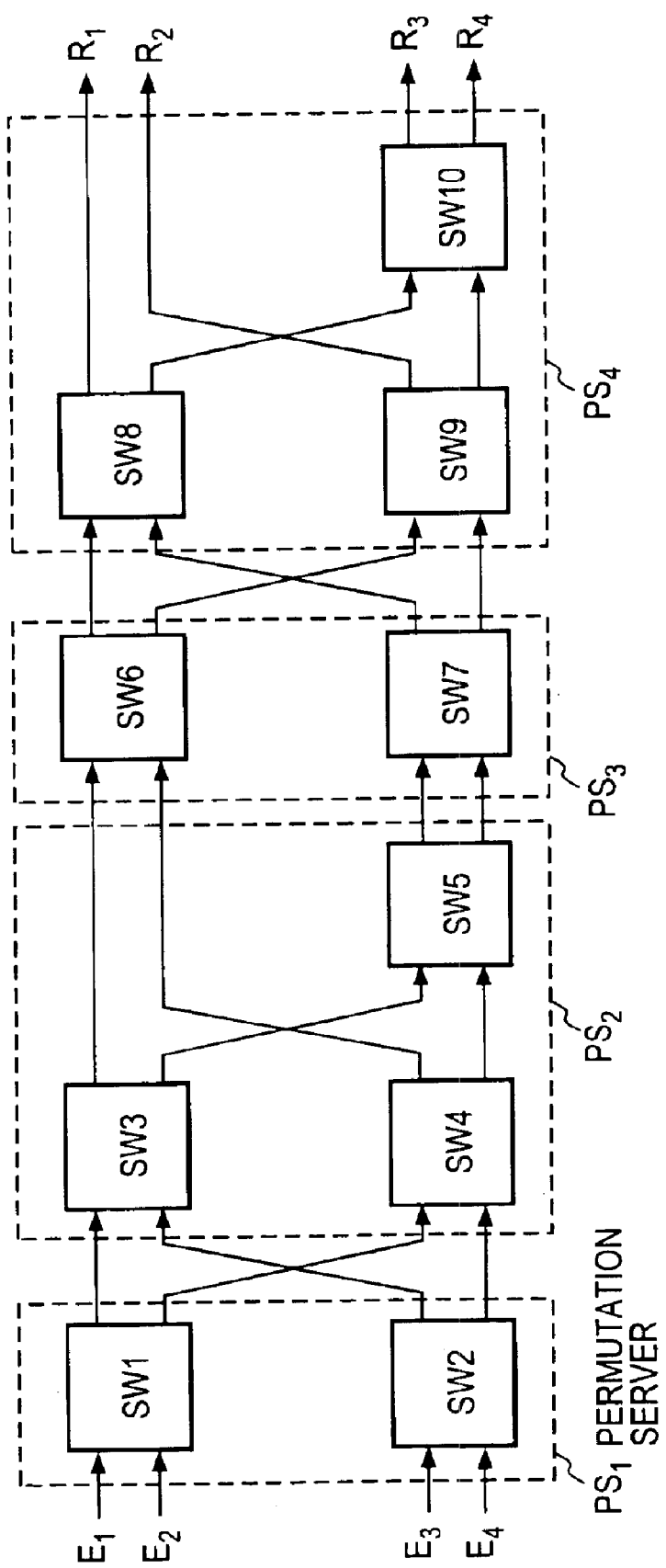
FIG. 15 is a block diagram showing the flow of data in each server in the second embodiment of the present invention.

This embodiment uses the four permutation servers $PS_1, \ldots, PS_4$ to form two four-input perfect permutation networks. The flow of data in this case is depicted in FIG. 15. Though not shown, all data transfers between the permutation servers are made via the bulletin board 400 as depicted in FIG. 12. That is, each permutation server SP, writes its permuted output in the bulletin board 400, and the permutation server $SP_{j+1}$ in the next stage reads out the data from the bulletin board 400 and performs permutation. The permutation server $SP_1$ performs the tasks of the switching gates SW1 and SW2 in the first embodiment and sends the results of processing via the bulletin board 400 to the permutation server $SP_2$. Similarly, the permutation server SP2 performs the tasks of the switching gates SW3, SW4 and SW5, the permutation server SP3 the tasks of the switching gates SW6 and SW7, and the permutation server SP4 the tasks of the switching gates SW8, SW9 and SW10. As depicted in FIG. 13, only one switching gate SW is disposed in each permutation server SP in practice, and the flow of data shown in FIG. 15 is implemented by applying appropriate inputs under the control of the control part 15. In practice, however, more than one switching gates may also be placed in one permutation server PS.

As depicted in FIGS. 12 and 15, the cascade-connected permutation servers $PS_1$ to $PS_4$ constitute at least two cascade-connected perfect permutation networks. For the output from each permutation server PS, the proof of permutation is verified, as in the first embodiment, by the decryption server 20S that has the permutation verification part 30S connected to the bulletin board 400, and if any fault is detected in the input/output relation, the permutation server PS is regarded as being faulty. In such an instance, a different permutation server may be substituted for the faulty permutation server to perform its processing; alternatively, if only one permutation server is defective, its processing may be omitted.

Having verified that all the permutations are correct, the decryption server 20S decrypts the outputs from the permutation network 10 (the outputs from the final-stage permutation server $PS_V$) in the decryption part 21S, and at the same time, generates the decryption proof $Proof_D$ in the decryption proving part 22S and writes it in the bulletin board 400. The verification terminal 200 verifies the permutation proofs $Proof_1$ to $Proof_4$ written by the respective permutation servers into the bulletin board 400, and further verifies the results of decryption (messages $m_1, \ldots, m_N$) and the decryption proof $Proof_D$ written by the decryption server 20S, following the same procedure as in the first embodiment.

With the above construction, even in the case where the random elements are leaked from a certain permutation server due to an attack thereto and consequently the permutation therein is revealed to a third party, the input-output relationship of permutation by the overall system is kept secret as long as the random elements in the remaining permutation servers are concealed. For example, even if the input-output relationship of permutation by the permutation server $PS_1$ is revealed, it is feasible to implement any input-output relationships of permutation since the permutation servers $PS_3$ and $PS_4$ constitute a perfect permutation network. Similarly, even if the input-output relationship of permutation chosen by any one of the permutation servers leaks, the other two permutation servers form a perfect permutation network, making it possible to conceal the random elements.

Third Embodiment

Figure 16:
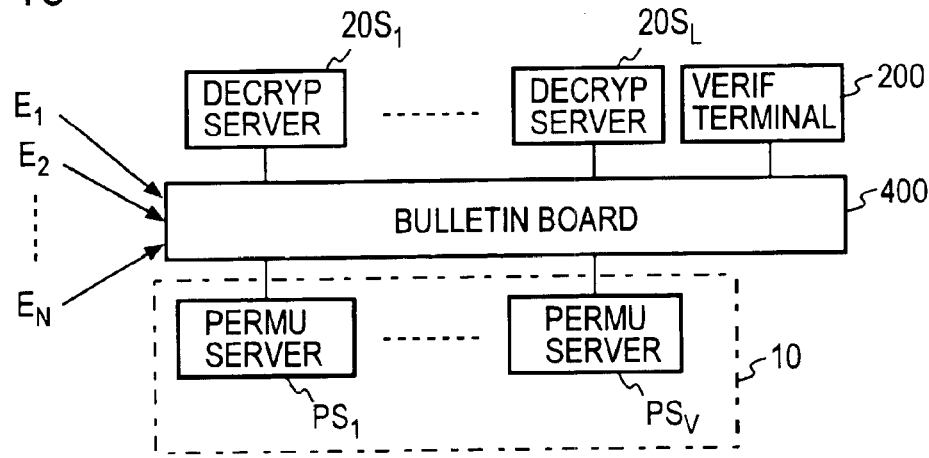
FIG. 16 is a block diagram illustrating the system configuration of a third embodiment of the present invention.

FIG. 16 illustrates in block form a third embodiment of the present invention, in which the decryption server 20S in the second embodiment is divided into two or more decryption servers $20S_1, \ldots, 20S_L$ so that they perform in their entirety the same function as does a single decryption server. According to this embodiment, if at least t+1 decryption servers normally operate for t where t<L, a correct result can be obtained; hence, the robustness of the system improves. In the case of using only one decryption server as shown in FIG. 12, once the decryption server 20S starts decryption, the result of decryption can be obtained at any time, and accordingly, there is a possibility of premature leakage of the results of vote count, for instance. In this embodiment, however, since no results of decryption are available before at least t+1 decryption servers among $20S_1$ to $20S_L$ finish their processing, there is no possibility of premature leakage of the results of decryption from at most t colluding decryption servers.

Figure 17:
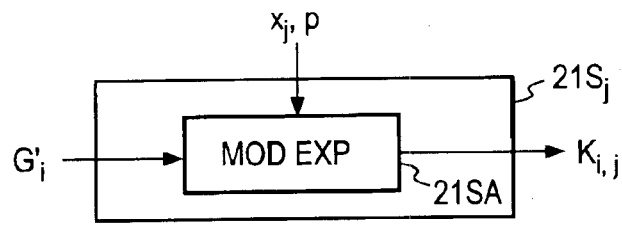
FIG. 17 is a block diagram depicting the configuration of a decryption part in a decryption server 20S in the third embodiment of the present invention.

The system configuration of this embodiment is identical with that of the second embodiment except the decryption servers. Assume that the decryption servers $D_i$ each has stored therein a value $x_i$ obtained by secret sharing a decryption key x with a polynomial of degree t. That is, there is a degree-t (where t<L) random polynomial $F(X) \in Zq[X]$ which satisfies $F(0)=x(\bmod q)$, and each $x_i$ is a value that satisfies $x_i=F(i) \bmod q$. Each decryption server 20Sj is identical in construction with that shown in FIG. 14 except the storing of $x_i$ in place of x in the decryption server 20S and the internal configuration of the decryption part 21S. As depicted in FIG. 17, the decryption part 21S in the decryption server of this embodiment has a modular exponentiator 21SA, which performs the same processing as does the modular exponentiator 21A shown in FIG. 8.

The permutation servers $PS_1, \ldots, PS_V$ are identical in construction and operation with those shown in FIG. 12 embodiment. Each decryption server 20St verifies the input-output relationships of all the permutation servers $PS_1, \ldots, PS_V$ in the same manner as in the second embodiment. Upon completion of verification of correct permutation results $R_1$ to $R_N$ provided from the last-stage permutation server $PS_V$, each decryption server performs decryption. The j-th decryption server $20S_j$ processes the permuted outputs $R_1$ to $R_N$ as described below.

Step 1: The control part receives inputs $R_i$ one after another and provides them to the decryption part 21S (see FIG. 14). Furthermore, the control part inputs $x_j$ and p to the decryption part 21S from the memory 23S.

Step 2: In the decryption part 21S (see FIG. 17), $G'_i$ and $x_j$, p are input to the modular exponentiator 21SA to compute $K_{j,i}:=G'^{x_j}_i$.

After this, the decryption proving part 22S (see FIG. 14) is driven to generate a proof $ProofD_j$ that proves the correctness of decryption. The actual decryption proving operation is the same as in the case where x and y in the corresponding operation of the first embodiment are replaced with $x_j$ and $y_j$, respectively. Let the output from the proving part 22S be represented by $ProofD_j:(c_j, z_j, K_{j,1}, \ldots, K_{j,n})$.

Figure 18:
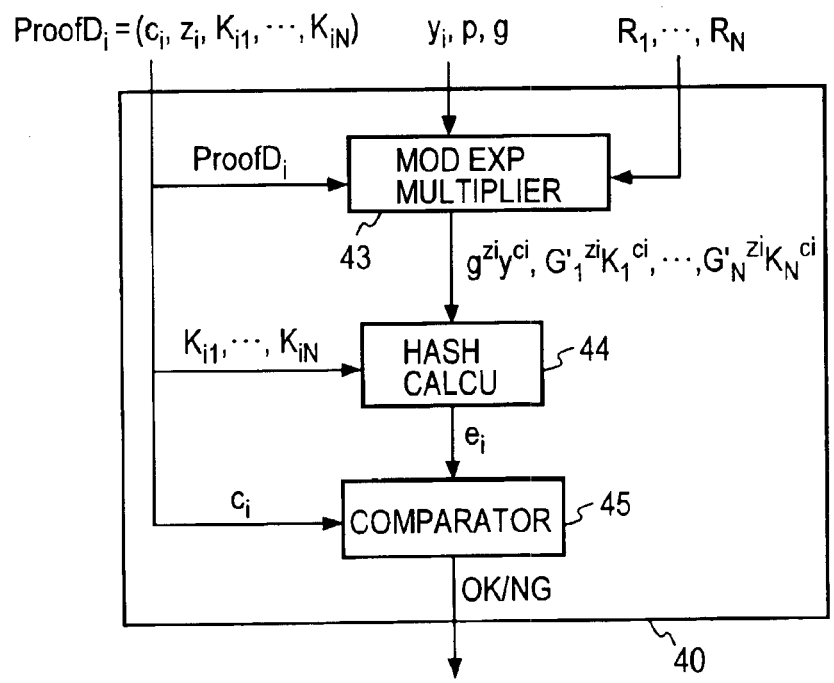
FIG. 18 is a block diagram depicting the configuration of a decryption verification part in the third embodiment of the present invention.

The verification terminal 200 has the same configuration as that depicted in FIG. 2. In this case, however, the decryption verification part 40 is configured as shown in FIG. 18. The operations of the decryption verification part 40 are the same as those in Steps 2 to 4 of the decryption verification part in the first embodiment. When the outputs from t+1 or more decryption servers successfully pass the verifications, the verification terminal outputs OK.

In this embodiment the output from the decryption server 20S$_j$ is $K_{ij}$ and the following procedure is used to actually obtain each decryption result $m_i$. The first step is to set A $\subseteq \{1, \ldots, L\}$ such that $|A| \geq t+1$. In this case, however, the output from the decryption server 20S$_j$ needs to have passed the verification for j where $j \in A$. Suppose that $\lambda_{j,A}$ is an interpolation coefficient defined by $$\lambda_{j,A} := \prod_{k \in A, k \neq j} \frac{k}{k-j} \bmod q.$$

Then, the message $m_i$ is given by $$m_j = \frac{M_i'}{\prod_{j \in A} K_{j,i}^{\lambda_{j,A}}}.$$

for the following reasons. That is, since $x = \Sigma \lambda_{j,A} x \bmod q$ (where $\Sigma$ is for $j \in A$) holds, it follows that $$\left( \prod_{j \in A} K_{j,i}^{\lambda_{j,A}} \right) = G_i^{rx} = K_i.$$

Hence, the decryption operation in this embodiment is equivalent to the decryption operation in the first embodiment.

The above steps of operation may be performed by each decryption server. In such an instance, the decryption verification needs only to be done following the same procedure as used in the first embodiment.

Furth Embodiment

In the second and third embodiments described above the permutation server PS in each stage randomizes input ciphertexts and randomly permutes them and sends such processed ciphertexts to the permutation server of the next stage, and the ciphertexts output from the permutation server in the last stage are decrypted by the decryption server into the original plaintexts. It is possible to verify that the thus obtained plaintexts are those cast correctly, though the owner of each plaintext is not identified.

In the second and third embodiments, it may be considered to arrange such that each time a corrupt server is detected, a fault recovery processing is performed. Therefore, the recovery process would be performed at most t times. As the number of times for fault recovery increases, the throughput of the anonymous channel decreases.

In the fourth embodiment described below, even if the reliability of the anonymous channel decreases to some extent, it is possible to efficiently perform fault recovery to provide the required throughput while maintaining the function of the verifiable anonymous channel.

The first, second and third embodiments have been described to be adapted so that each switching gate SW or each permutation server does not perform decryption but that the decryption unit or decryption server collectively decrypts the ciphertexts. In this embodiment each permutation server is adapted to perform partial decryption. Each permutation server transforms the input ciphertext I in respective permutation stages and performs collective partial decryption in the last permutation stage, making the overall processing time shorter than in the case of performing partial decryption in every permutation stage.

In this embodiment, let f represent the partial decryption process by each permutation server and $f_x(I)$ an output plaintext corresponding to an arbitrary input ciphertext I to the permutation server that has secret key X.

The partial decryption process f by each permutation server is limited to the following.

Commutable

For arbitrary secret keys A and B, the relation $f_A(f_B(I)) = f_B(f_A(I))$ holds.

Collectively Processible

For arbitrary known secret keys A and B there exists a function $g(A, B)$ such that $f_A(f_B(I)) = f_{g(A, B)}(I)$, making it possible to compute $f_{g(A, B)}(I)$ faster than $f_A(f_B(I))$.

In the even that the output from a certain permutation server is regarded as faulty on such premises as mentioned above, only reliable information of a permutation server which is nearest to the unreliable permutation server upstream thereof and whose output has been declared to be correct is used to execute the random permutation/randomization/partial decryption process, which is followed by the nest step without making any compensation for the incorrect process.

The secret key of each permutation server is verifiably secret-shared by all the other permutation servers in advance. Upon detection of an unreliable permutation server, the remaining permutation servers downstream thereof execute the random permutation/randomization/partial decryption process through utilization of the information of the reliable permutation server upstream of the dishonest permutation server, and upon completion of process by all the reliable permutation servers, the reliable servers collect all the shared secret keys of the unreliable permutation server and cooperate to restore them. The partial decryption process of that part of information that the unreliable permutation server ought to have execute (the recovery operation) is collectively performed using all the restored secret keys of the unreliable permutation server. With this collective processing scheme, it is feasible to perform the fault recovery by only one recovery operation even if outputs from two or more permutation servers are not reliable.

This embodiment will be described below to use an El Gamal partial decryption system as an example of the commutable and collectively processible partial decryption process. As long as the above-mentioned properties are satisfied, a generalized El Gamal cryptosystem is also applicable (for example, an elliptic curve El Gamal cryptosystem).

A description will be given of a system configuration with which it is possible to conceal the correspondence between inputs and outputs as a whole even if some permutation servers leak the random elements.

In this embodiment the anonymous channel is formed by V permutation servers, each of which sequentially executes some proof-accompanying random permutation/ randomization/partial decryption processes.

Figure 19:
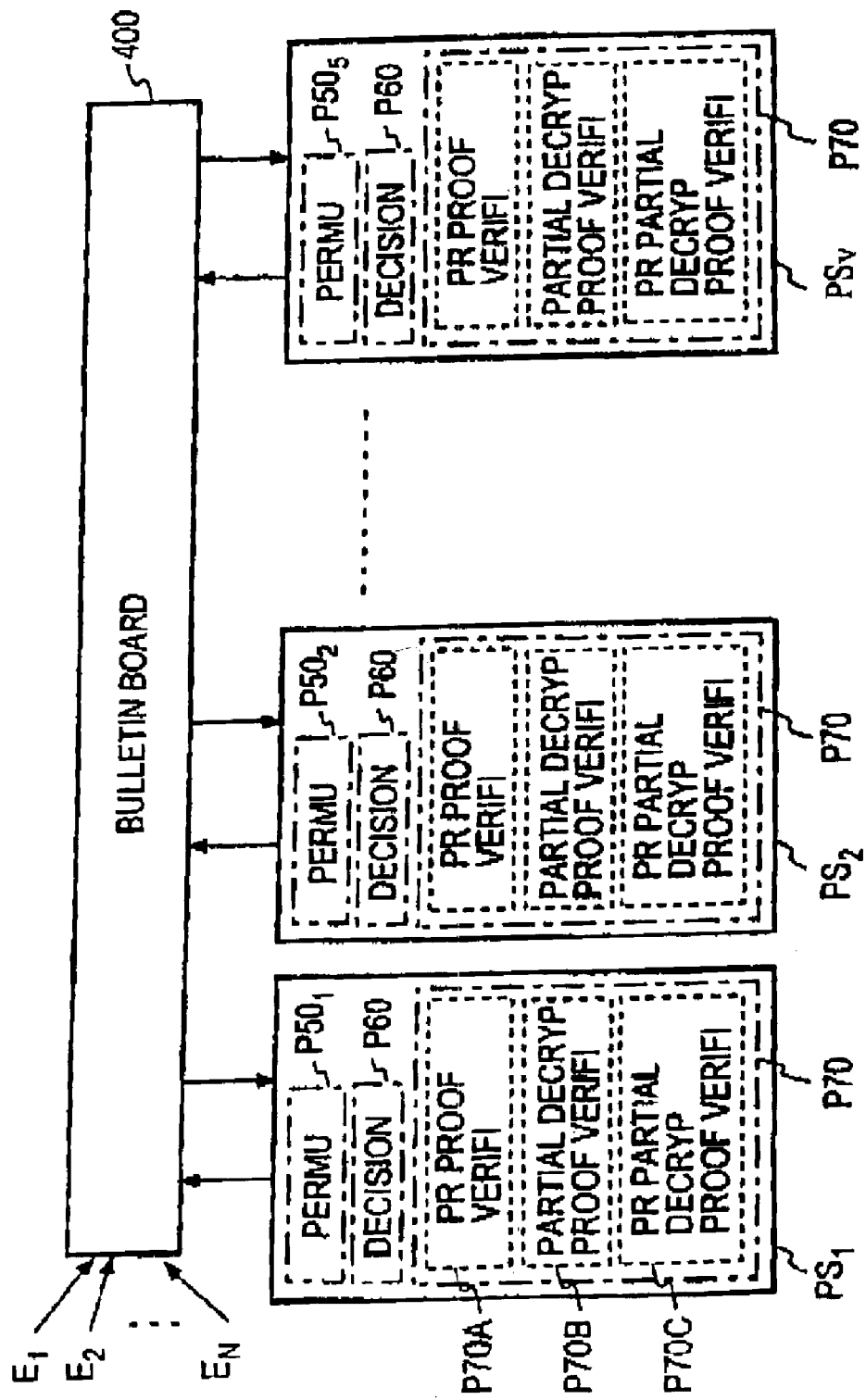
FIG. 19 is a block diagram depicting an example of the system configuration employing the anonymous channel according to the present invention.

FIG. 19 depicts an example of the system configuration of this embodiment, in which the permutation servers $PS_1$ to $PS_V$ are connected to the bulletin board 400 as is the case with the embodiments of FIGS. 12 and 16. In this embodiment, since each permutation server is equipped with a verification function for processes of the other permutation servers and a partial decryption function for input ciphertexts, the verification servers and the decryption servers are not provided unlike the embodiments of FIGS. 12 and 16. Each permutation server has a decision part P60 for deciding whether the processes of the other permutation server are correct, and a verification part P70 for proving the random permutation/partial decryption process, in addition to a permutation part P50 corresponding to the permutation part formed by the plural switching gates SW in each permutation server in the second and third embodiment. The permutation servers $PS_1$ to $PS_5$ have their permutation parts $P50_1$ to $P50_5$ cascade-connected via the bulletin board 400 as shown in FIG. 19. The permutation parts $P50_1$ to $P50_5$ each have switching gates SW for the permutation/ randomization/partial decryption process. No verification terminal 200 is provided independently, but it is placed in each permutation server.

Figure 20:
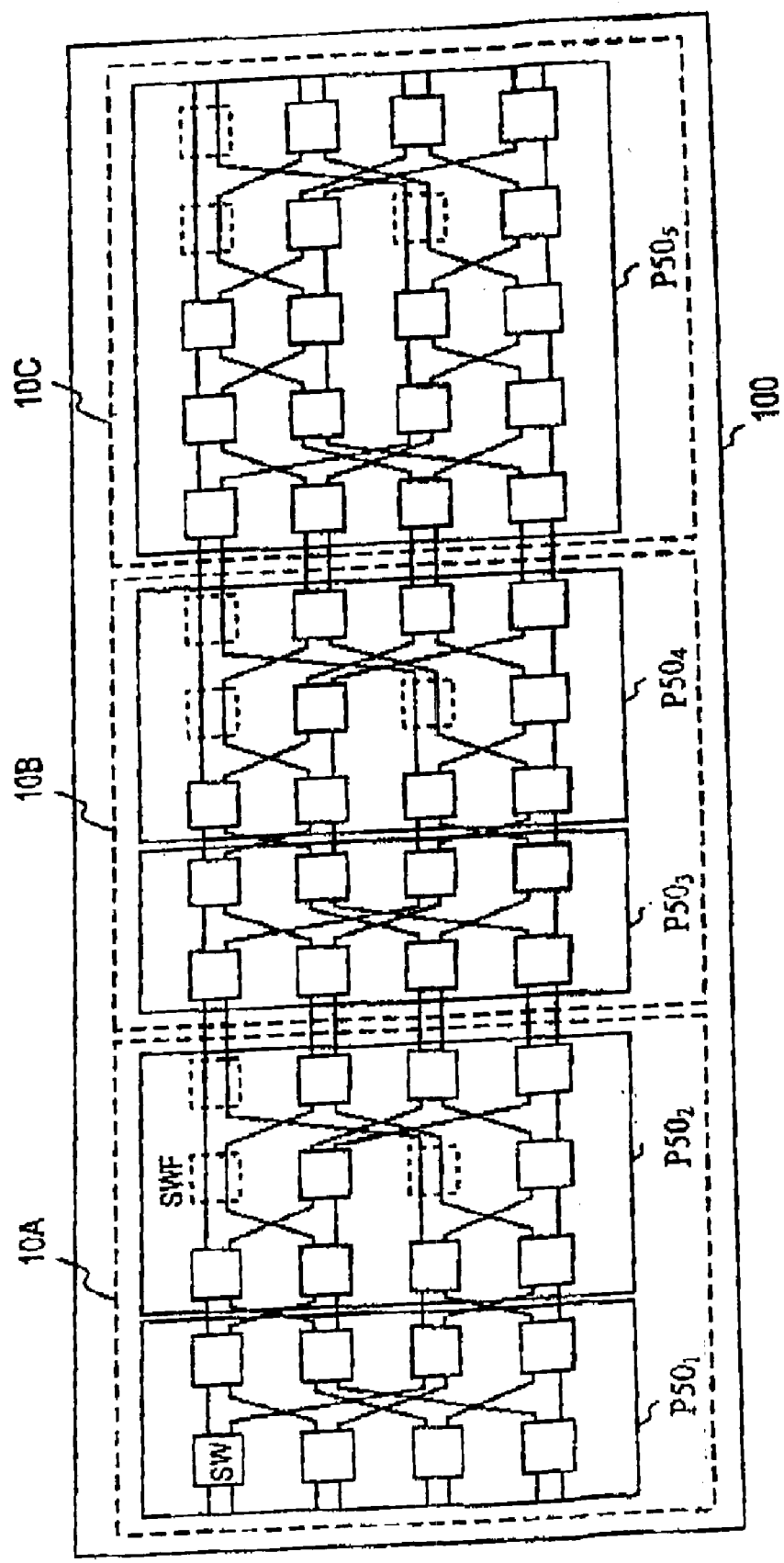
FIG. 20 is a block diagram depicting a plurality of perfect permutation networks formed by permutation servers cascade-connected via bulletin boards in the FIG. 20 embodiment.

The flow of data between the permutation servers via the bulletin board 400 in the system of FIG. 19 is depicted in FIG. 20, in which there are shown only the permutation parts $P50_1$ to $P50_5$ in the permutation servers $PS_1$ to $PS_5$. In this example, the two cascade-connected permutation parts $P50_1$ and $P50_2$ form an eight-input perfect permutation network, the two cascade-connected permutation parts $P50_3$ and $P50_4$ also form an eight-input perfect permutation network, and the permutation part $P50_5$ singly forms an eight-input perfect permutation network. Accordingly, the five permutation parts constitute in their entirety three cascade-connected perfect permutation networks.

In the formation of each eight-input perfect permutation network, it is not necessary that all two-input-two-output unit switching gates SW arranged in a 4 by 5 matrix form; even if input-output relationships are fixed in the switching gates indicated by broken lines, it is feasible to implement all sets of inputs by a combination of switching operations of the remaining switching gates. With a view to reducing the workload in the permutation server, no permutation of inputs is performed in such switching gates in which the input-output relationship can be fixed. Such fixed switching gates are indicated by SWF. However, in the case of decrypting ciphertexts through the permutation networks forming the anonymous channel of the present invention, if the number of times the partial decryption process is executed for input data differs according to its chosen route, the correct decryption cannot be achieved.

In the present invention, the fixed switching gate SWF does not perform permutation of input data but executes other processes (such as randomization, partial decryption and proof generation) for the input data. In the following description, the switching gate SW that executes all processes such as permutation, randomization, partial decryption and proof generation will hereinafter be referred to as a PR partial decryptor with proof function, and the switching gate SWF that does not execute the permutation process will be referred to as a fixed partial decryptor with proof function. And permutation/randomization will be denoted simply by PR.

Figure 21:
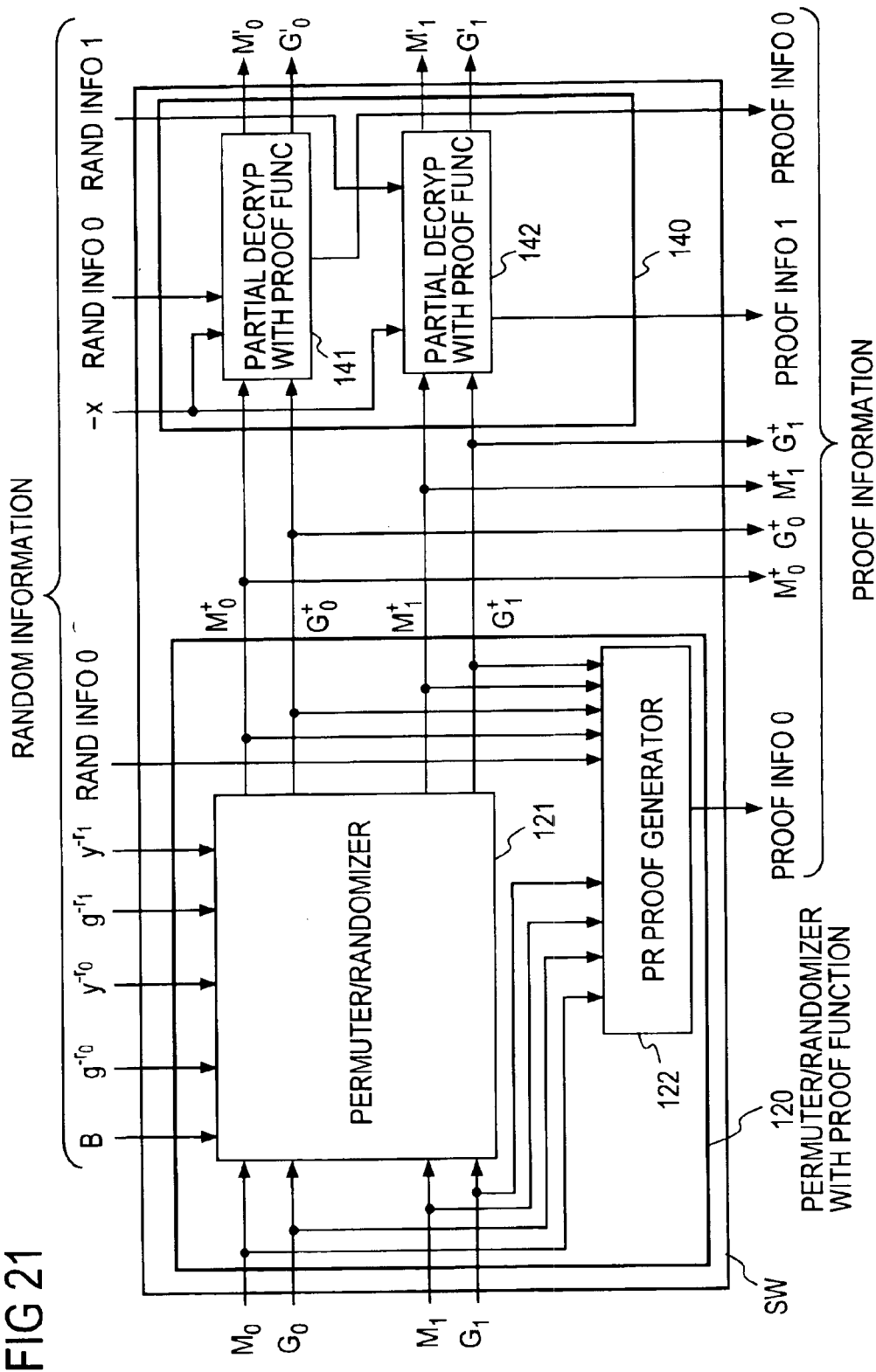
FIG. 21 is a block diagram depicting an example of the functional configuration of a PR (Permutation/Randomization) partial decryptor with proving function.
Figure 27:
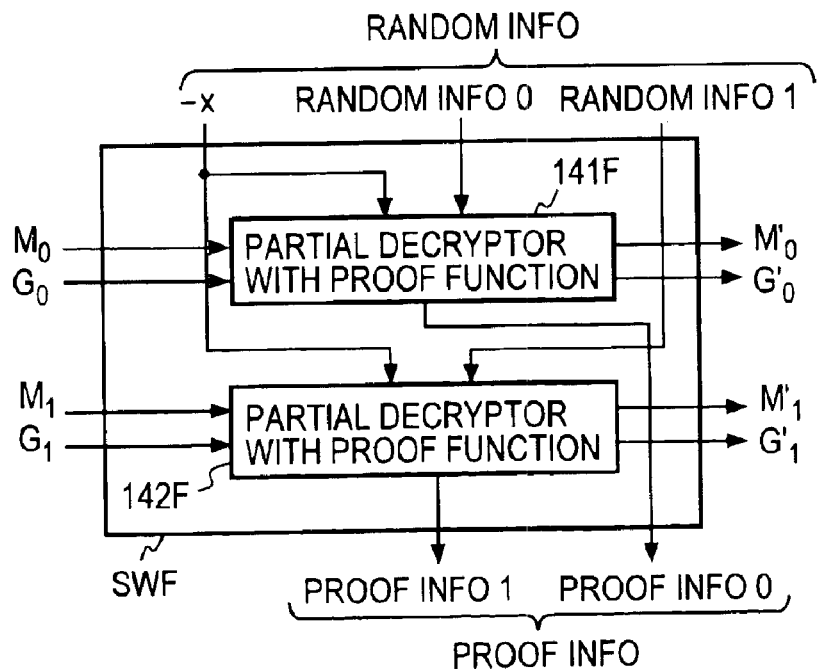
FIG. 27 is a block diagram depicting an example of the functional configuration of a fixed partial decryptor with proving function.
Figure 28:
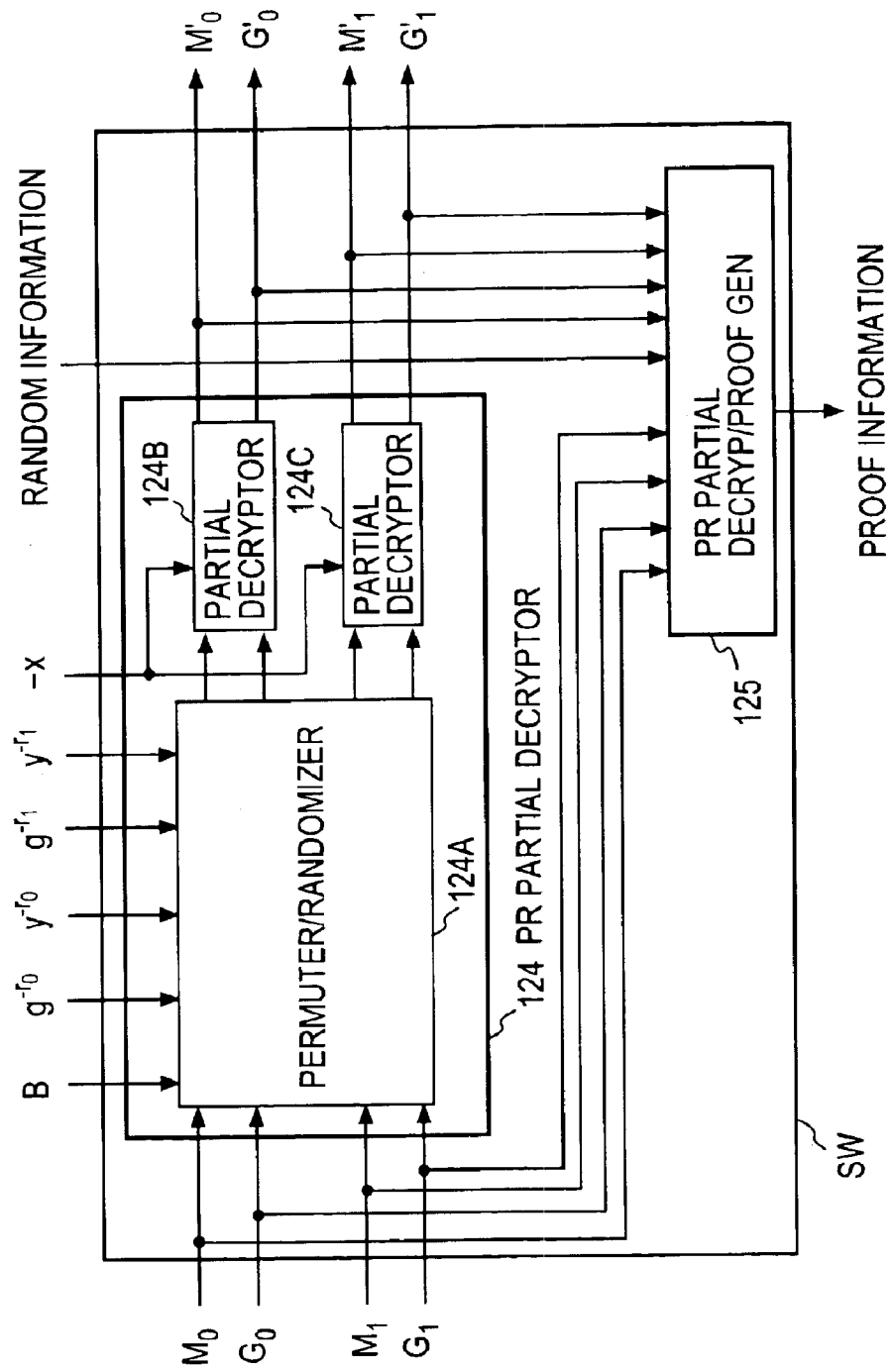
FIG. 28 is a block diagram depicting an example of the functional configuration of PR partial decryptor with proving function.

In the FIG. 19 embodiment, the inputs to each permutation network are eight messages and five permutation servers $PS_1$ to $PS_5$ are used; even if two permutation servers are faulty in their process, it is possible to achieve a correct permutation/randomization/partial decryption. The PR partial decryptor with proof function SW, which forms part of each of the permutation servers $PS_1$ to $PS_5$ has such a configuration as depicted in FIG. 21 or 28. The fixed partial decryptor with proof function SWF is configured as shown in FIG. 27. These partial decryptors will be described later on. The permutation servers $PS_1$ to $PS_5$ are each provided with the verifier P70. The verifier P70 comprises a PR proof verifier P70A, a partial decryption proof verifier P70B and a PR partial decryption proof verifier P70C.

The bulletin board 400 accepts writes of ciphertexts from authorized users and has a function that information once posted thereon cannot be erased. The information written on the bulletin board 400 is made accessible from anyone.

The illustrated system uses the five permutation servers $PS_1$ to $PS_5$ to form the anonymous channel 100 composed of three eight-input, cascade-connected perfect permutation networks 10A to 10C. Even if random elements of two of the three perfect permutation networks 10A to 10C leak out, it is possible to completely conceal the correspondence between the inputs and outputs by the remaining three perfect permutation networks.

The permutation servers $PS_1$ to $PS_5$ process input data in a predetermined order, and each permutation server reads from the bulletin board 400 the input-output data and proof information of the permutation server of the immediately preceding stage. At this time, the permutation server verifies by the verifier P70 of its own the reliability of the preceding-stage permutation server through utilization of the input-output data and proof information thereof. If an incorrect input-output relationship is detected, that is, when the output is not reliable, the permutation server of the preceding stage is regarded as defective. In this instance, the other preceding permutation servers are checked in a retrograde order until an honest permutation server is found, and the output from the permutation server thus found honest is used to execute the required process.

Each permutation server is capable of verifying the outputs of any other permutation servers used, and those permutation servers whose input-output relations are found correct cooperate to compensate for the decryption process that the faulty permutation server ought to have performed. To this end, the secret key of every permutation server is shared by all the permutation servers through a secret sharing scheme.

As described previously, each permutation server performs tasks of plural PR partial decryptors with proof function one after another. The PR partial decryptor with proof function SW is made up of, for instance, a permuter/ randomizer with proof function 120 and a partial decryptor with proof function 140 as shown in FIG. 21. The permuter/ randomizer with proof function is composed of, for example, a permuter/randomizer 121 and a permutation/ randomization (PR) proof generator 122. The partial decryptor with proof function 140 is formed by, for instance, two partial decryptors with proof function 141 and 142.

FIG. 21 illustrates an example of the PR partial decryptor with proof function SW which permutes and randomizes two input El Gamal ciphertexts, partially decrypts the ciphertexts through the use of the partial secret key, and outputs the results of the permutation/randomization/ decryption process and a proof that provies its correctness. The PR partial decryptor with proof function SW is used in the verifiable anonymous channel with collective fault recovery function depicted in FIG. 20.

The PR partial decryptor with proof function SW performs operations as described below; in this case, simultaneously executable steps may be performed in parallel. And commutable steps may be exchanged in order of execution. Further, a plurality of operations by plural devices of the same function may be sequentially conducted by one device while changing parameters one after another as required.

Step 1: The permuter/randomizer with proof function 120 uses various pieces of information in random information to permute and randomize inputs ($M_0$, $G_0$), ($M_1$, $G_1$) and outputs the results of the process ($M_0^+$, $G_0^+$), ($M_1^+$, $G_1^+$) together with proof information 0 that proves their validity.

Step 2: The PR partial decryptor with proof function SW outputs ($M_0^+$, $G_0^+$), ($M_1^+$, $G_1^+$) as part of the proof information.

Step 3: The fixed partial decryptor with proof function 140 outputs ($M'_0$, $G'_0$), ($M'_1$, $G'_1$) resulting from partial decryption of the inputs ($M_0^+$, $G_0^+$), ($M_1^+$, $G_1^+$) through the use of various pieces of information in the random information and proof information 1 which proves the validity of the outputs.

Incidentally, the permutation, randomization and partial decryption processes in the PR partial decryptor with proof function SW can be executed in an arbitrary order. In such a case, however, the contents of proof information differ with the order of execution of the processes.

Figure 22:
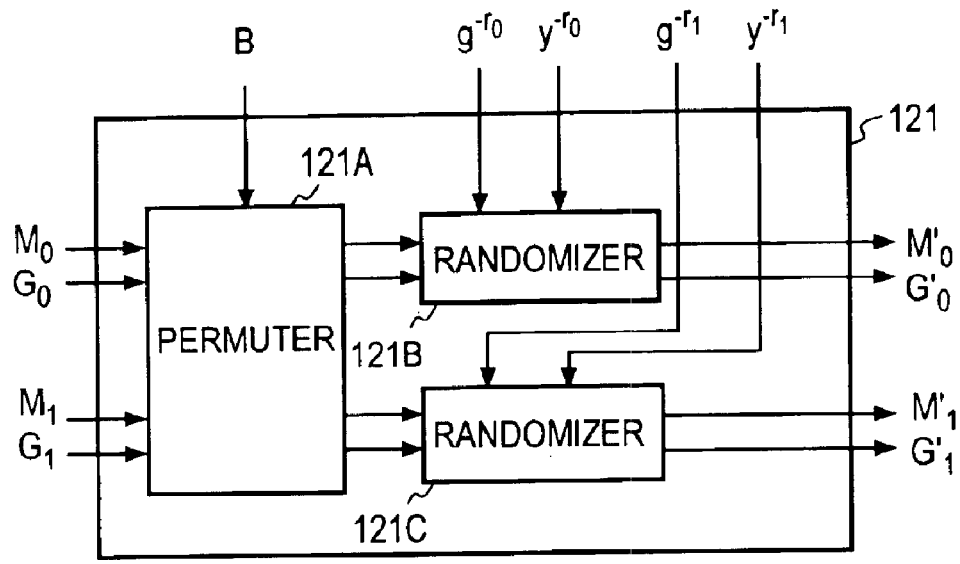
FIG. 22 is a block diagram depicting an example of the functional configuration of a permuter/randomizer.
Figure 23:
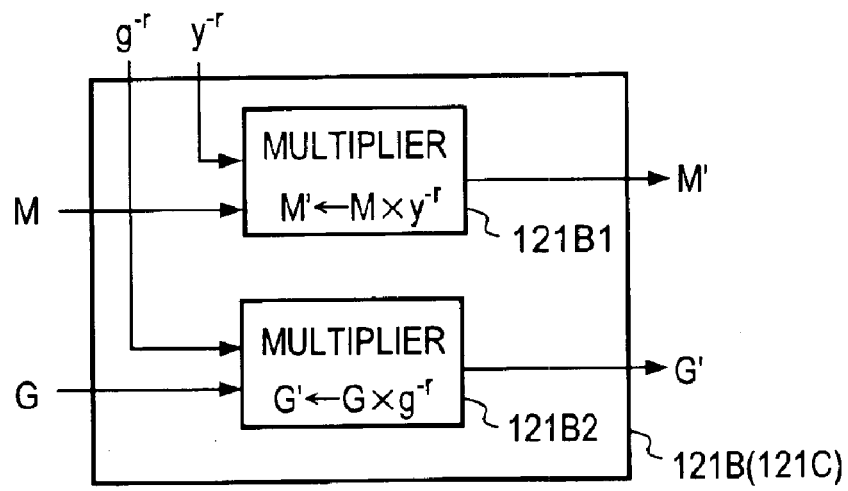
FIG. 23 is a block diagram depicting an example of the functional configuration of a randomizer.

The permuter/randomizer 121 comprises, for instance, a permuter 121A and two randomizers 121B and 121B as depicted in FIG. 22. The randomizers 121B and 121C are identical in construction and they each have two multipliers 121B1 and 121B2 as depicted in FIG. 23. The functional configurations of these parts will be described below one after another.

Randomizer 121B (121C)

FIG. 23 depicts an example of the configuration of the randomizer 121B (121C) which is used to randomize the input El Gamal ciphertexts so as to conceal the correspondence between the input and outputs in the permuter/randomizer 121 shown in FIG. 22. Letting (M, G) represent the input El Gamal ciphertexts, the following equation holds for a plaintext m, a public key (Y, g), a secret key X and a random number w.

$Y = g^X$, $G = g^w$, $M = mY^w$

The randomization of the input ciphertexts (M, G) is to compute M' and G' by the multipliers 121B1 and 121B2 as shown below and output (M', G').

$M' \leftarrow M \times Y^{-r}$,
$G' \leftarrow G \times g^{-r}$ where $g^{-r}$ and $Y^{-r}$ are parameters computed prior to the input of M and G through the use of a random number r kept secret from third parties other than a person in charge of the randomization process. Sine the output (M', G') satisfies $M' = mY^{w-r}$, $G' = g^{w-r}$, it is an El Gamal ciphertext related to the plaintext m, the public key (Y, g), the secret key X and the random number w−r.

The randomizer 121B performs the above operations. When the operations are simultaneously executable, they may be performed in parallel. The order of operations may be changed, if possible. Furthermore, the same operations performed by different devices may be performed by one device while changing parameters as required.

Permuter/Randomizer 121

FIG. 22 illustrates an example of the configuration of the permuter/randomizer 121 which permutes and randomizes the two input El Gamal ciphertexts ($M_0$, $G_0$) and ($M_1$, $G_1$). Let D(M, G, r) describe an El Gamal ciphertext obtained by randomizing the El Gamal ciphertext (M, G) with the random number r. The permuter/randomizer 121 generates the following output messages ($M'_0$, $G'_0$) and ($M'_1$, $G'_1$) following a permutation parameter $B \in \{0,1\}$ held secret from third parties other than a person in charge of the PR process.

When B=0:
($M'_0$, $G'_0$) ← D($M_0$, $G_0$, $r_0$)
($M'_1$, $G'_1$) ← D($M_1$, $G_1$, $r_1$)

When B=1:
($M'_0$, $G'_0$) ← D($M_1$, $G_1$, $r_0$)
($M'_1$, $G'_1$) ← D($M_0$, $G_0$, $r_1$)

The permuter/randomizer 121 is made up of a permuter 121A and randomizers 121B and 121C. The randomizers 121B and 121C each comprise the two multipliers 121B1 and 121B2 as depicted in FIG. 23. The permuter/randomizer 121 performs the following operations. When the operations are simultaneously executable, they may be performed in parallel. The order of operations may be changed, if possible. Furthermore, plural operations by plural devices of the same function may be performed by one device while changing parameters as required.

Step 1: If B=0, the permuter 121A yields
($L_0$, $L_1$) ← ($M_0$, $G_0$)
($L_2$, $L_3$) ← ($M_1$, $G_1$)
and if B=1,
($L_0$, $L_1$) ← ($M_1$, $G_1$)
($L_2$, $L_3$) ← ($M_0$, $G_0$)

Step 2: The randomizer 121B randomizes the inputs ($L_0$, $L_1$) with randomization parameters ($Y^{-r0}$, $g^{r0}$) and outputs ($M'_0$, $G'_0$).

Step 3: The randomizer 121C randomizes the inputs ($L_2$, $L_3$) with randomization parameters ($Y^{-r1}$, $g^{-r1}$) and outputs ($M'_1$, $G'_1$).

That is, the outputs are randomized so as to conceal the correspondence B=i⊕j between $G_i$ and $G_j$, where i,j∈{0, 1}. Accordingly, it is necessary that the values $Y^{-r0}$, $g^{-r0}$ and $Y^{-r1}$ as well as the values $r_0$ and $r_1$ be kept secret. While in FIG. 22 the permutation precedes the randomization, the latter may precedes the former.

Permutation/Randomization (PR) Proof Generator 122

The PR proof generator 122 in FIG. 21 proves the correctness of operation of the permuter/randomizer 121 without revealing the secret information (B∈{0, 1} and the value of the parameters for randomization). To execute this proof, it is necessary to prove that, provided b=i⊕j, $\log_Y(M_i/M'_j) = \log_g(G_i/G'_j)$ for all i,j∈{0, 1} such that b=0, or $\log_Y(M_i/M'_j) = \log_g(G_i/G'_j)$ (Lemma 1)

for all i,j∈{0, 1} such that b=1.

To perform this, the PR proof generator 122 computes and outputs the proof information $T_{ij}$, $W_{ij}$, $z_{ij}$, $e_b$ described below.

An input B is a permutation parameter input to the permuter 121A in the permuter/randomizer 121. An input $r_j$ (j∈{0, 1}) is a randomization parameter input to the randomizers 121B and 121C in the permuter/randomizer 121. Inputs e, $R_{ij}$ (i, j∈{0, 1}) are random numbers for proof. Inputs $Y^{Rij}$, $g^{Rij}$ (i, j∈{0, 1}) are parameters for proof computed prior to the application of the inputs $M_i$, $G_i$, $M'_j$, $G'_j$ (i, j∈{0, 1}). These pieces of information (B, $r_j$, e, $R_{ij}$, $Y^{Rij}$, $g^{Rij}$) will hereinafter be referred to as random information RDM.

The outputs $e_b$, $T_{ij}$, $W_{ij}$, $z_{ij}$ (b, i, j∈{0, 1}) are information that proves the correspondence between ($M_i$, $G_i$) and ($M'_j$, $G'_j$), where b=i⊕j, or proves such correspondence as if it actually exists.

The PR proof generator 122 performs operations as described below. That is, for $i, j \in \{0, 1\}$,
when $i \oplus j = B$,
$T_{ij} \leftarrow Y^{Rij}$, $W_{ij} \leftarrow g^{Rij}$
when $i \oplus j = B'$ (where B' represents an inversion of B),
$T_{ij} \leftarrow (M_i/M'_j)^e Y^{Rij}$, $W_{ij} \leftarrow (G_i/G'_j)^e g^{Rij}$
when B=0,
  $e_0 \leftarrow -e + h(T_{00}, T_{01}, T_{11}, W_{00}, W_{01}, W_{10}, W_{11})$
  $e_1 \leftarrow e$
and when B=1,
  $e_0 \leftarrow -e + h(T_{00}, T_{01}, T_{11}, W_{00}, W_{01}, W_{10}, W_{11})$
  $e_1 \leftarrow e$
For arbitrary $i, j \in \{0, 1\}$,
when $i \oplus j = B$,
  $z_{ij} \leftarrow R_{ij} \leftarrow e_B r_j$
and when $i \oplus j = B'$,
  $z_{ij} \leftarrow R_{ij}$
By the above operation the prover (the PR proof generator 121) outputs proof information VRF=$\{e_b, T_{ij}, W_{ij}, z_{ij}\}$.

In the above, when the operations are simultaneously executable, they may be performed in parallel. The order of operations may be changed, if possible. Furthermore, the same operations performed by different devices may be performed by one device while changing parameters as required.

PR Proof Verifier P70A

The PR proof verifier P70A in the verifier P70 placed in each permutation server shown in FIG. 19 verifies the output from the PR proof generator 122, that is, the proof information VRF=$\{e_b, T_{ij}, W_{ij}, z_{ij}\}$ so as to verify the correctness of the operation of the permuter/randomizer 121.

The inputs $e_b, T_{ij}, W_{ij}, z_{ij}$ (b, i, j $\in \{0, 1\}$) are outputs from the PR proof generator 122 and are information that proves the correspondence between $(M_i, G_i)$ and $(M'_j, G'_j)$, where $b = i \oplus j$, or proves such correspondence as if it actually exists.

The verifier P70A is supplied with $M_0, G_0, M_1, G_1, M'_0, G'_0, M'_1, G'_1$ as well as $T_{ij}, W_{ij}, z_{ij}, e_b$ and determine whether the following equation holds
$e_0 + e_1 = h(T_{00}, T_{01}, T_{10}, T_{11}, W_{00}, W_{01}, W_{10}, W_{11})$.
If not, the verifier P70A outputs False and finishes its operation. The function h is a one-way function.

After this, provided $b = i \oplus j$ for all $i, j \in \{0, 1\}$, the verifier P70A makes a check to determine if the following equations hold
$T_{ij} = (M_i/M'_j)^{e_b} Y^{z_{ij}}$ and
$W_{ij} = (G_i/G'_j)^{e_b} g^{z_{ij}}$.
If any of them does not hold, then the verifier P70A outputs False and finishes its operation. If the both equations hold, it outputs True.

Even if an dishonest prover tries to compute and output
$T_{ij} \leftarrow (M_i/M'_j)^{e_b} Y_{zij}$,
$W_{ij} \leftarrow (G_i/G'_j)^{e_b} g^{zij}$
Using $e_b, z_{ij}$ prepared by some means, it is difficult to precompute either one of $e_0$ and $e_1$ due to unpredictability of the function $h(x0, x1, \ldots)$—this constitutes proof of Lemma 1.

The output from the verifier P70A is an estimation as to whether the permuter/randomizer 121 correctly operated, and it is a truth value.

The PR proof verifier P70A performs the operations as described above. In the above, when the operations are simultaneously executable, they may be performed in parallel. The order of operations may be changed, if possible. Furthermore, plural operations by plural devices of the same function may be performed by one device while changing parameters as required.

Permuter/Randomizer with Proof Function 120

The permuter/randomizer with proof function 120 outputs, without revealing secret information, $(M'_0, G'_0)$, $(M'_1, G'_1)$ resulting from permutation and randomization of two input El Gamal ciphertexts $(M_0, G_0)$, $(M_1, G_1)$ and proof proving the correctness of the process (zero-knowledge proof. The permuter/randomizer with proof function 120 comprises the permuter 121 and the PR proof generator 122.

The permuter/randomizer with proof function 120 performs operations as described below. In this instance, when the operations are simultaneously executable, they may be performed in parallel. The order of operations may be changed, if possible. Furthermore, plural operations by plural devices of the same function may be performed by one device while changing parameters as required.

Step 1: The permuter/randomizer 121 permutes and randomizes the inputs $(M_0, G_0)$, $(M_1, G_1)$ with the input B and randomization parameters $g^{-r0}, Y^{-r0}, g^{-r1}, Y^{-r1}$ and outputs $(M'_0, G'_0), (M'_1, G'_1)$.

Step 2: The PR proof generator 122 generates and outputs the proof information VRF=$\{e_b, T_{ij}, W_{ij}, z_{ij}\}$ through utilization of the inputs $(M_0, G_0)$, $(M_1, G_1)$ and the outputs $(M'_0, G'_0), (M'_1, G'_1)$ and the random information RDM=$\{B, r_j, e, R_{ij}, Y^{Rij}, g^{rij}\}$.

Partial Decryptor with Proof Function 141

Figure 24:
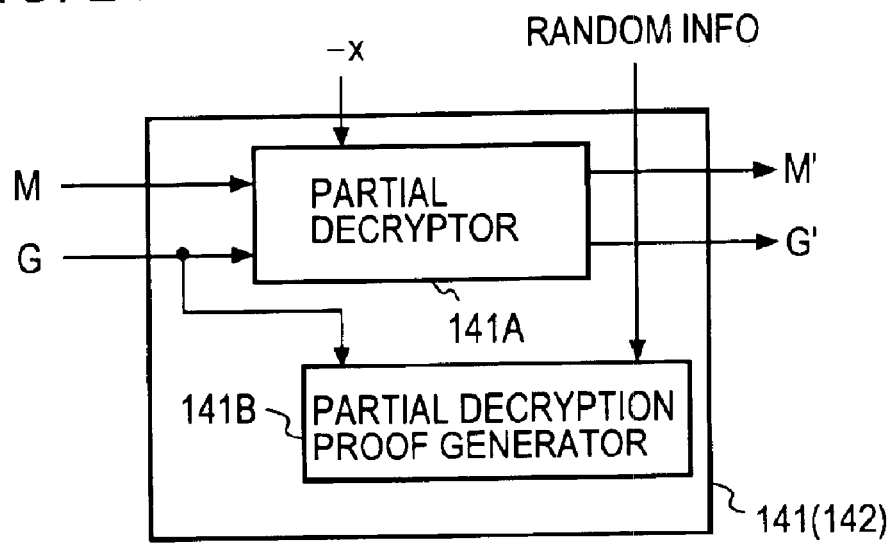
FIG. 24 is a block diagram depicting an example of the functional configuration of a partial decryptor with proving function.
Figure 25:
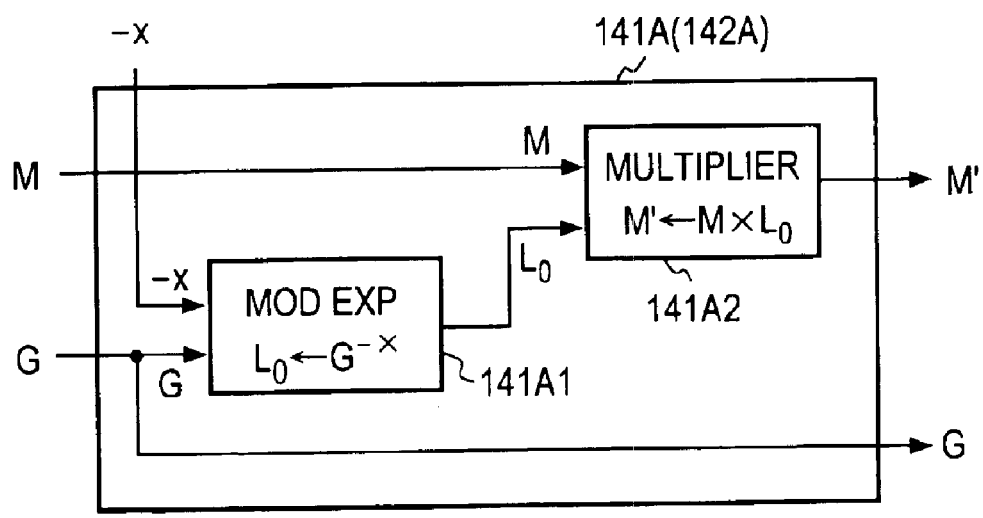
FIG. 25 is a block diagram depicting an example of the functional configuration of a partial decryptor.
Figure 26:
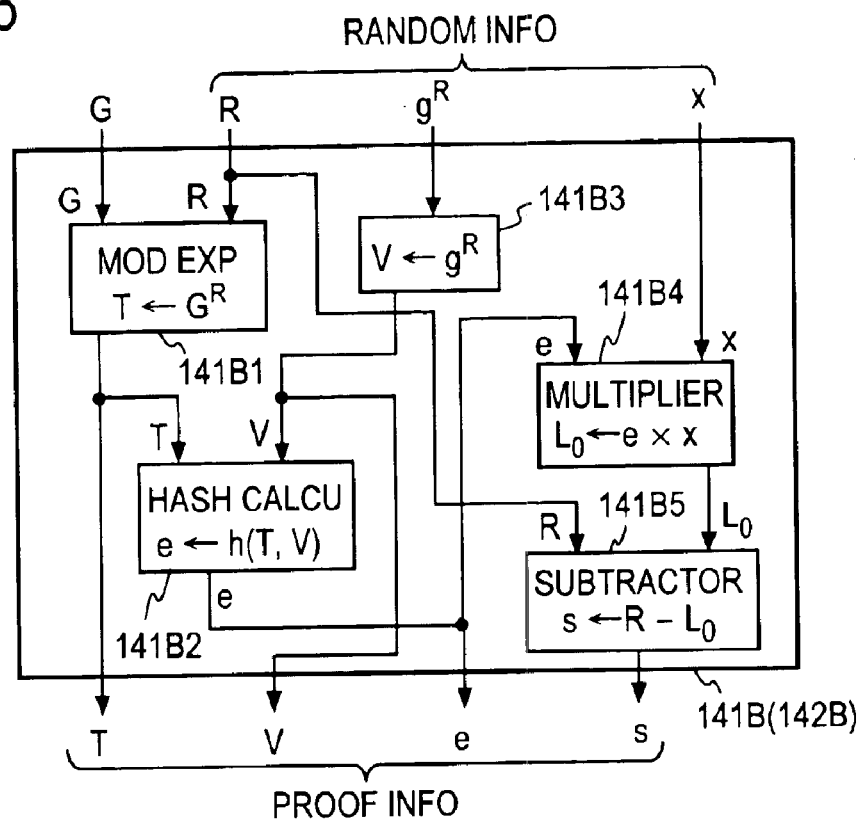
FIG. 26 is a block diagram depicting an example of the functional configuration of a partial decryption proof generator.

Turning to FIGS. 24, 25 and 26, the partial decryptors 141 and 142 shown in FIG. 21 will be described below. The partial decryptor with proof function 141 is composed of a partial decryptor 141A and a partial decryption proof generator 141B, which are shown in more detail in FIGS. 25 and 26. The partial decryptor with proof function 142 is identical in construction with the partial decryptor 141, and hence no description will be repeated.

FIG. 25 illustrates an example of the configuration of the partial decryptor 141A that partially decrypts the El Gamal ciphertexts, using partial information of a secret key. Letting the input El Gamal ciphertexts be represented by (M, G), the following holds
$M = mY^w$, $G = g^w$
for the plaintext m and the public keys (Y, g) and the random number w.

Suppose that the partial decryptor knows the values of partial information x on the secret keys Y=yxy' and y=$g^x$. The partialdecryptor computes $M' \leftarrow M \times G^{-x}$ for the inputs (M, G) and outputs (M', G'). Since the outputs satisfy
$M' = my'^w$, $G = g^w$,
they constitute El Gamal ciphertexts concerning the plaintext m and the public keys (y', g) and the random number w.

The partial decryptor 141A is composed of a modular exponentiation multiplier 141A1 and a multiplier 141A2. This device performs operations as described below. In this instance, when the operations are simultaneously executable, they may be performed in parallel. The order of operations may be changed, if possible. Furthermore, the same operations performed by different devices may be performed by one device while changing parameters as required, Step 1: The modular exponentiation multiplier 141A1 compute $L_0 \leftarrow G^{-x}$ with the inputs -x and G, and outputs $L_0$.

Step 2: The multiplier 141A2 computes $M' \leftarrow M \times L_0$ with the inputs M and $L_0$, and outputs M'.

Step 3: The partial decryptor 141A outputs the input G intact.

Partial Decryption Proof Generator 141B

FIG. 26 illustrates an example of the configuration of the partial decryption proof generator 141B that proves, without revealing secret information, the correctness of the operation of the partial decryptor 141A. To generate this proof, the partial decryption proof generator 141B proves in zero-knowledge that:

it knows the value of the secret key $x$; and $M/M'=G^x$ ho(Lemma 2)

without revealing the value of the secret key $x$ such that $y=g^x$. The proof proves by a Chaum-Pedersen protocol that two discrete logarithms $\log_g y$ and $\log_G (M/M')$ are equal.

The input R is a random number kept secret from other persons except the prover, and $g^R$ is a value computed before the application of the input G. The partial decryption proof generator 141B comprises a modular exponentiation multiplier 141B1, a hash calculator 141B2, a register 141B3, a multiplier 141B4 and a subtractor 141B5.

The hash calculator 141B2 is to calculate the one-way hash function h, and let it be assumed that specifications of the hash functions are made public. The hash calculator 141B2 performs operations as described below. In this instance, when the operations are simultaneously executable, they may be performed in parallel. The order of operations may be changed, if possible. Furthermore, the same operations performed by different devices may be performed by one device while changing parameters as required.

Step 1: The modular exponentiation multiplier 141B1 uses the inputs R and G to compute $T \leftarrow G^R$ and outputs T.

Step 2: The hash calculator 141B2 calculates $e \leftarrow h(T, V)$ with the input T and $V=g^R$ stored in the register 141B3, and outputs e.

Step 3: The multiplier 141B4 uses the inputs e and x to compute $L_0 \leftarrow e \times x$, and outputs $L_0$.

Step 4: The subtractor 141B5 uses the input R and $L_0$ to copute $s \leftarrow R - L_0$, and outputs s.

Step 5: The partial decryption proof generator 141B outputs T, V, e, s as the proof information VRF to the partial decryption proof verifier P70B in FIG. 19.

Partial Decryption Proof Verifier P70B

The partial decryption proof verifier P70B, which verifies the output from the partial decryption proof generator 141B (142B), is to verifies the correctness of the operation of the partial decryptor 141A (142A). This device decides whether "the partial decryptor 141A knows the value $x$ and $M/M'=G^x$ holds (Lemma 2)" and outputs the result of decision.

The partial decryption proof verifier P70B follows the Chaum-Pdersen protocol to verify the output from the partial decryptor 141B depicted in FIG. 26. Let h be a one-way hash function whose specifications have been made public. g and y are already published as referred to previously.

This device performs operations as described below. In this instance, when the operations are simultaneously executable, they may be performed in parallel. The order of operations may be changed, if possible. Furthermore, the same operations performed by different devices may be performed by one device while changing parameters as required.

Step 1: If the following does not hold for the inputs m, M', G, e, s, $e=h(T, V)$, the partial decryption proof verifier P70B (FIG. 19) outputs False and finishes its operation.

Step 2: If the following does not hold for the inputs m, M', G, e, s, $T=(M/M')^e G^s$, the partial decryption proof verifier P70B outputs False and finishes its operation. This can be understood from the fact that when substituting the relations $M'=MG^{-x}$, $s=R-ex$, the equality holds if they are correct.

Step 3: If $V=y^e g^s$ does not hold for the inputs V, e, s, the partial decryption proof verifier P70B outputs False and finishes its operation. This is understood from the relations $V=g^R$, $y=g^x$ and $s=R-ex$.

Step 4: If all the verifications hold, the partial decryption proof verifier P70B outputs True and finishes its operation.

The above is the function configuration of each PR partial decryptor with roof function SW which serves as a switching gate in each perfect permutation network depicted in FIG. 20 and the associated verifier P70B. Next, a description will be given of the fixed partial decryptor with proof function SWF in the perfect permutation network shown in FIG. 20.

Fixed Partial Decryptor with Proof Function SWF

FIG. 27 illustrates an example of the configuration of the fixed partial decryptor with proof function SWF which performs partial decryption of two input El Gamal ciphertexts by using a partial secret key, and outputs the results of decryption together with proofs of their validity.

The fixed partial decryptor SWF is used to perform the fixed permutation and partial decryption in the permutation network of FIG. 20 as described previously. The fixed partial decryptor SWF comprises partial decryptors with proof function 141F and 142F as depicted in FIG. 27, which are identical construction with the partial decryptor with proof function shown in FIG. 24.

The fixed partial decryptor with proof function SWF performs operations as described below. In this instance, when the operations are simultaneously executable, they may be performed in parallel. The order of operations may be changed, if possible. Furthermore, plural operations by plural devices of the same function may be performed by one device while changing parameters as required.

Step 1: The partial decryptor 141F performs partial decryption of $(M_0, G_0)$ with the inputs $-x$ and $(M_0, G_0)$ and the random information 0, and outputs the result $(M'_0, G'_0)$ of the partial decryption and proof information 0 proving its validity.

Step 2: The partial decryptor 142F performs partial decryption of $(M_1, G_1)$ with the inputs $-x$ and $(M_0, G_0)$ and the random information 1, and outputs the result $(M'_1, G'_1)$ of the partial decryption and proof information 1 proving its validity.

PR Partial Decryptor with Proof Function SW

FIG. 28 illustrates a modified form of the PR partial decryptor with proof function SW shown in FIG. 21.

As described previously, the partial decryptor with proof function SW performs the permutation/randomization/partial decryption of the two input El Gamal ciphertexts $(M_0, G_0)$ and $(M_1, G_1)$, and outputs $(M'_0, G'_0)$ and $(M'_1, G'_1)$ together with their validity proofs without revealing the secret information. In the example of FIG. 21 the proof for the permutation/randomization process and the proof for the partial decryption are generated separately, whereas in the example of FIG. 28 the results of the permutation/randomization and the partial decryption process are proved at the same time.

The PR partial decryptor with proof function SW is composed of a PR partial decryptor 124 and a PR partial decryption proof generator 125. The PR partial decryptor 124 is formed by a permuter/randomizer 124A and two partial decryptors 124B and 124C.

The PR partial decryptor SW performs operations as described below. In this instance, when the operations are simultaneously executable, they may be performed in parallel. The order of operations may be changed, if possible. Furthermore, plural operations by plural devices of the same function may be performed by one device while changing parameters as required.

Step 1: The PR partial decryptor 124 performs the permutation/randomization/partial decryption of he inputs $(M_0, G_0)$ and $(M_1, G_1)$ with the inputs B, the randomization parameters and partial information of he secret key, and outputs $(M'_0, G'_0)$ and $(M'_1, G'_1)$.

Step 2: The PR partial decryption proof generator 125 outputs proof information through utilization of the inputs $(M_0, G_0)$, $(M_1, G_1)$ and $(M'_0, G'_0)$, $(M'_1, G'_1)$ and random information.

In the PR partial decryptor with proof function SW, too, the permutation, randomization and partial decryption processes can be executed in an arbitrary order.

The permuter/randomizer 124A in FIG. 28 is identical in construction with the permuter/randomizer 121 depicted in FIG. 22, and the partial decryptors 124B and 124C also have the same configuration as that of the partial decryptor 141A (141B) depicted in FIG. 25.

The PR partial decryptor 124 performs operations as described below. In this instance, when the operations are simultaneously executable, they may be performed in parallel. The order of operations may be changed, if possible. Furthermore, plural operations by plural devices of the same function may be performed by one device while changing parameters as required.

Step 1: The permuter/randomizer 124A outputs two pairs of information representing the results of the permutation/randomization process of the inputs $(M_0, G_0)$ and $(M_1, G_1)$ through the use of permutation/randomization parameters B, $g^{-r0}$, $Y^{-r0}$, $g^{-r1}$ and $Y^{-r1}$.

Step 2: The partial decryptor 124B partially decrypts the one of the two pair of information on the permutation/randomization process through the use of the partial information $-x$ of the secret key, and outputs $(M'_0, G'_0)$.

Step 3: The partial decryptor 124C partially decrypts the other pair of information on the permutation/randomization process through the use of the partial information $-x$ of the secret key, and outputs $(M'_1, G'_1)$.

PR Partial Decryption Proof Generator 125

The PR partial decryption proof generator 125 proves the correct operation of the PR partial decryptor 124A without revealing secret information.

The input B is a permutation parameter input to the permuter (see FIG. 22) in the permuter/randomizer 124A; the input $r_j$ ($j \in \{0, 1\}$) is a random number for randomization input to the randomizer (see FIG. 22) in the permuter/randomizer 124A; the input x is partial information of a decryption key; the inputs e, $K_0$, $K_1$ and $R_{ij}$ (i, $j \in \{0, 1\}$) are random numbers for proof information generation use; and the inputs $g^{K0}$, $g^{K1+ex}$, $y^{rRij}$, and $g^{Rij}$ (i, $j \in \{0, 1\}$) are parameters for proof information generation use computed prior to the application of the inputs $M_i$, $G_i$, $M'_j$ and $G'_j$ (i, $j \in \{0, 1\}$).

The outputs $V_b$, $e_b$, $s_b$, $T_{ij}$, $W_{ij}$ and $z_{ij}$ (b, i, $j \in \{0, 1\}$) are information are information that proves the correspondence between $(M_i, G_i)$ and $(M'_j, G'_j)$, where $b = i \oplus j$, or proves such correspondence as if it actually exists.

To directly prove the correctness of the operation of the PR partial decryptor 124, it is necessary to prove that, provided $b = i \oplus j$, $M/M'_j = y^{rj} G_i^x$ and $G_i/G'_j = g^{rj}$ for all i, $j \in \{0, 1\}$ such that $b = 0$ $M/M'_j = y^{rj} G_i^x$ and $G_i/G'_j = g^{rj}$ for all i, $j \in \{0, 1\}$ such that $b = 1$ (Lemma 3)

To perform this, proof information $V_b$, $e_b$, $s_b$ ($b \in \{0, 1\}$) and $T_{ij}$, $W_{ij}$, $Z_{ij}$ (i, $j \in \{0, 1\}$) are generated as described below.

The PR partial decryption proof generator 125 computes: for all i, $j \in \{0, 1\}$, when $i \oplus j = B$,
$T_{ij} \leftarrow y^{rRij} G_i^{K0}$, $W_{ij} \leftarrow g^{Rij}$;

and when $i \oplus j = B'$ (where B' represents an inversion of B),
$T_{ij} \leftarrow (M_i/M'_j) e y^{rRij} G_j^{K1}$, $W_{ij} \leftarrow (G_i/G'_j)^e g^{Rij}$.

Furthermore, the PR partial decryption proof generator 124: performs substitutions $V_B \leftarrow g^{K0}$, and $V_{B'} \leftarrow g^{Rij}$, and computes $e_0 \leftarrow -e + h(T_{00}, T_{01}, T_{10}, T_{11}, W_{00}, W_{01}, W_{10}, W_{11})$ when $B = 0$; performs a substitution $e_1 \leftarrow e$, and computes $e_1 \leftarrow -e + h(T_{00}, T_{01}, T_{10}, T_{11}, W_{00}, W_{01}, W_{10}, W_{11})$ when $B = 1$; performs a substitution $e_0 \leftarrow e$, and computes $z_{ij} \leftarrow R_{ij} - e_b r_j$ when $i \oplus j = B$; if $i \oplus j = B'$, performs substitution $z_{ij} \leftarrow R_i$ and computes $s_0 \leftarrow K_0 - e_0^x$ when $B = 0$; and performs a substitution $s_1 \leftarrow K_1$ and, when $B = 1$, computes $s_1 \leftarrow K_0 - e_1 x$, thereby $s_0 \leftarrow K_1$.

The PR partial decryption proof generator 125 performs operations as described above. In this instance, when the operations are simultaneously executable, they may be performed in parallel. The order of operations may be changed, if possible. Furthermore, plural operations by plural devices of the same function may be performed by one device while changing parameters as required.

PR Partial Decryption Proof Verifier P70C

The PR partial decryption proof verifier P70C in FIG. 19 is to verifies the correct operation of the PR partial decryptor 124 by checking the output from the PR partial decryptor proof generator 125 in FIG. 28.

The inputs to the PR partial decryption proof verifier P70C are $e_b$, $T_{ij}$, $W_{ij}$ and $z_{ij}$ (b, i, $j \in \{0, 1\}$), which are the outputs from the PR partial decryption proof generator 125 in FIG. 28 and are information that proves the correspondence between $(M_i, G_i)$ and $(M'_j, G'_j)$, where $b = i \oplus j$, or proves such a correspondence as if it actually exists. The verifier P70C first makes a check, by computation, to see if $e_0 + e_1 = h(T_{00}, T_{01}, T_{10}, T_{11}, W_{00}, W_{01}, W_{10}, W_{11})$ holds, and if not, it outputs False and finishes its operation. If the above holds, the verifier P70C makes a check, by computation, to see if $V_b = g^{sb} y^{sb}$ holds for all $b \in \{0, 1\}$, and if not, it outputs False and finishes its operation. If the above holds, the verifier P70C makes a check, by computation, to determine if $T_{ij} = (M_i/M'_j)^{eb} y^{zij} G_i^{sb}$, $W_{ij} = (G_i/G'_j)^{eb} g^{zij}$ holds for all i, $j \in \{0, 1\}$ with $b = i \oplus j$, and if not, outputs False and finishes its operation. If the above holds, the verifier P70C outputs True. In this way, it is decided whether Lemma 3 is true or false.

The verifier P70C performs operations as described above. In this instance, when the operations are simultaneously executable, they may be performed in parallel. The order of operations may be changed, if possible. Furthermore, plural operations by plural devices of the same function may be performed by one device while changing parameters as required.

Perfect Permutation Network 10

Figure 29A:
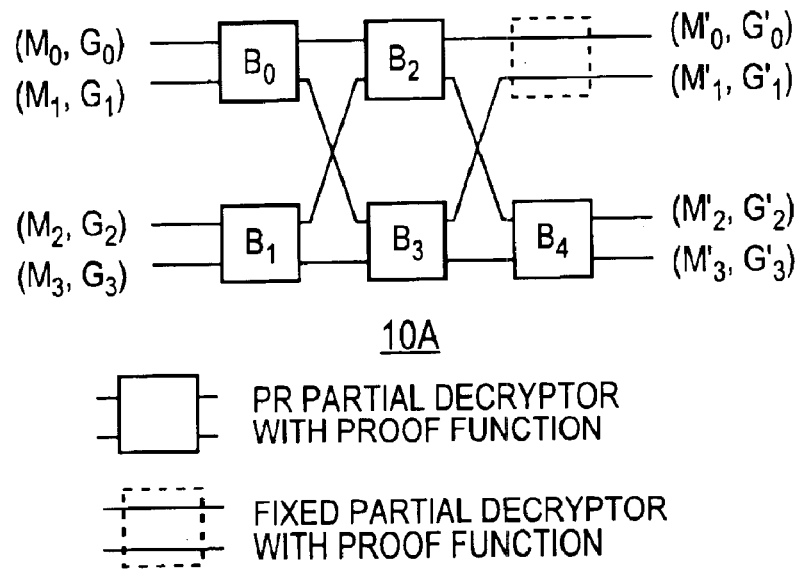
FIG. 29 is a block diagram depicting an example of the configuration of a perfect permutation network.
Figure 29B:
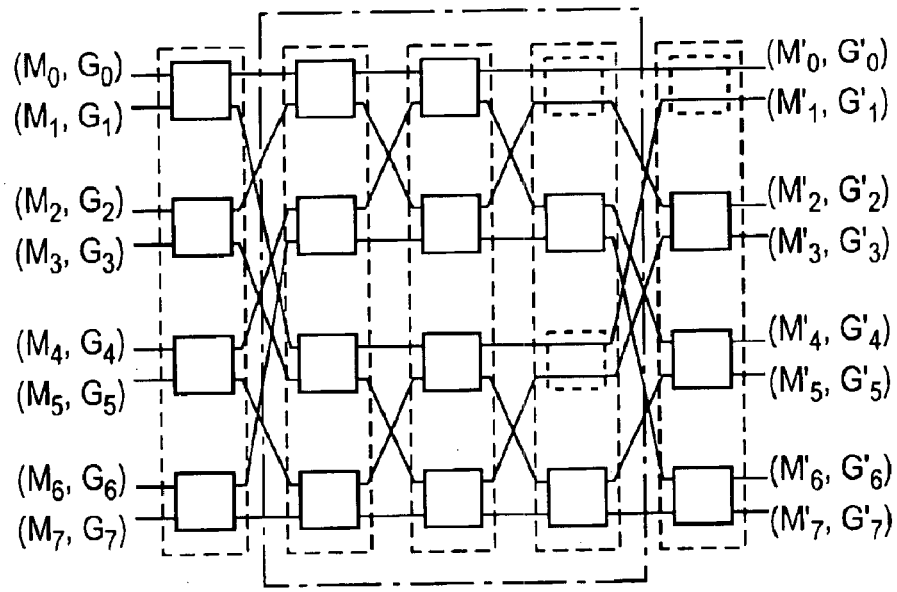

FIGS. 29A and 29B illustrates examples of configurations of four- and eight-input perfect permutation networks 10A and 10B, respectively.

What is meant by the "perfect permutation network" is a network which is formed by plural PR partial decryptors with proof function SW and fixed partial decryptors with proof function SWF are arranged in a matrix form and connected in cascade and which is able to implement every permutation of inputs by a combination of values of secret permutation parameters $B_i$ of the PR partial decryptors with proof function SW. The inputs are N El Gamal ciphertexts and the outputs are N El Gamal ciphertexts or N plaintexts. And information that proves the validity of permutation is proof information of each PR partial decryptor with proof function and each fixed partial decryptor with proof function and input/output information except secret keys, permutation/randomization parameters and random information.

In FIG. 29A PR partial decryptors with proof function SW and fixed partial decryptors with proof function SWF, each of which receives two input El Gamal ciphertexts and outputs two El Gamal ciphertexts, are arranged in a two-by-three matrix form. The one output from the partial decryptor on each row is supplied to the partial decryptor on the same row in the next column, whereas the other output is input to the partial decryptor in the next column on a different row. Indicated by the solid line blocks in FIG. 29A are the PR partial decryptors SW, each of which permutes and randomizes the two El Gamal ciphertexts and partially decrypts them through the use of partial information of secret keys, thereafter outputting the results of permutation/randomization process together with proof information proving their validity. Indicated by the broken-line block is the fixed partial decryptor SWF, which partially decrypts the two input El Gamal ciphertexts through the use of partial information of secret keys, and outputs the results of decryption together with proof information proving their validity. In this instance, the number of possible permutations of four inputs is $4!=4\times3\times2=24$. When the number of permutation parameters $B_i$ is 5, the four inputs can be permuted in $2^5=32$ ways; thus, the network can be set for any of all possible permutations of four inputs. That is, in the case of four inputs, a perfect permutation network can be formed using five PR partial decryptors with proof function, i.e. five processors in which the permutation parameters $B_i$ can be set, respectively. On the other hand, the fixed partial decryptor with proof function is appreciably simpler in configuration than the PR partial decryptor with proof function, that is, is computation complexity is small; hence, it is used as the processor on the first row in the third column. It may also be substituted with the PR partial decryptor with proof function.

In FIG. 29B PR partial decryptors SW and fixed partial decryptors are arranged in a four-by-five matrix form. In the middle three columns the one output from the partial decryptor on each row is supplied to the partial decryptor on the same row in the next column, whereas the other output is input to the partial decryptor in the next column on a different row. The illustrated configuration is a combination of two four-input four-output perfect permutation networks of FIG. 29A as indicated by the broken lines in FIG. 29B.

If the value of the secret permutation parameter $B_i$ in the i-th column is unknown, it is impossible to estimate what permutation was performed. That is, when the combination of the values Bi is unknown, it is impossible to find out the person who input $M'_0, \ldots, M'_3$. To ensure correct decryption, each partial decryptors in the same column (the i-th column) have the same decryption key $x_i$ in both of FIGS. 29A and 29B.

Perfect Permutation Network 10C

Figure 30:
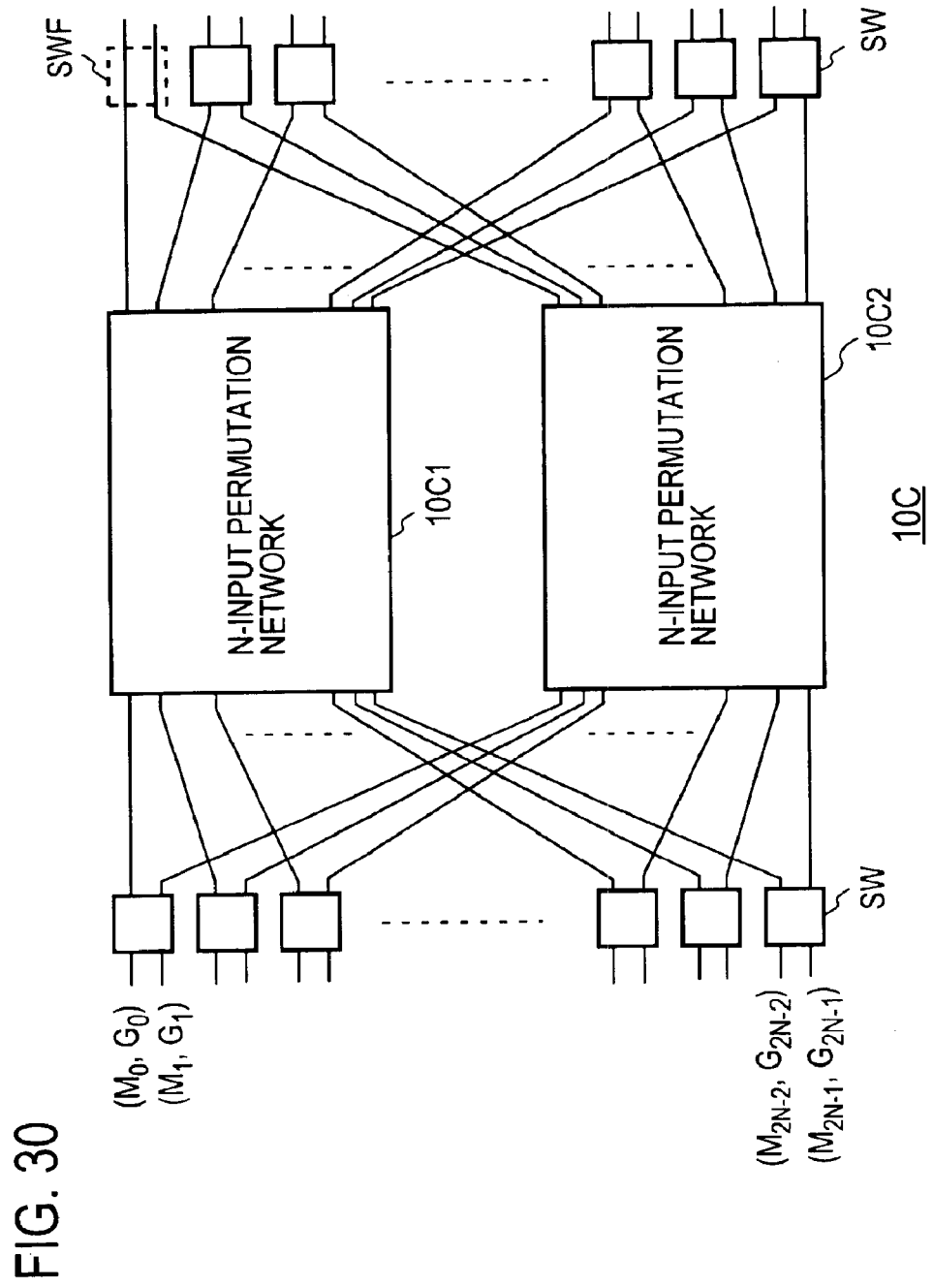
FIG. 30 is a block diagram depicting an example of a scheme for extending the perfect permutation network.

FIG. 30 illustrates an example of the configuration of a 2N-input perfect permutation network 10C. The principle of this network is described in A. Waksman, "A permutation network," Journal of the ACM, 15(1): 159–163, 1968.

Since the permutation network 10C comprises N-input perfect permutation networks 10C1 and 10C2 and two-input perfect permutation networks (PR partial decryptors with proof function) SW, it is feasible to form a four-, eight-, ..., $2^n$-input perfect permutation networks by two-input perfect permutation networks. The illustrated example comprises two N-input perfect permutation networks, N two-input two-output PR partial decryptors with proof function provided at the input stage, and (N−1) two-input two-output PR partial decryptors with proof function SW and one fixed partial decryptor with proof function SWF provided at the output stage. The configuration of FIG. 29B uses a four-input perfect permutation network that is the N-input perfect permutation network of FIG. 30.

Accordingly, a $2^n$-input perfect permutation network which possesses the partial decryption function can be constituted using only PR partial decryptors with proof function and fixed partial decryptors with proof function.

The parts necessary for the $N(=2^n)$-input perfect permutation network are $N \log_2 N - N + 1$ PR partial decryptors with proof function and (N−1) fixed partial decryptors with proof function, and the total number of stages (the number of columns) is $2N \log_2 N - 1$.

Verifiable Anonymous Channel with Collective Fault Recovery Function 100

FIG. 20 depicts an example of an 8-input, 2-secret leakage tolerance, 2-fault tolerance, verifiable anonymous channel with collective fault recovery function. The verifiable anonymous channel with collective fault recovery function 100 is formed by a cascade-connection of permutation servers PS1 to PS5. The t-secret leakage tolerance means that the correspondence between inputs and outputs is completely concealed even if secret permutation information $B_i$ of a maximum of t permutation servers among a total of V(>2t) permutation servers leaks out due to an attack or the like.

The verifiable anonymous channel with collective fault recovery function 100 includes three perfect permutation networks 10A, 10B and 10C, and does not have any permutation servers spanning the perfect permutation networks. Hence, even if the secret permutation information $B_i$ leaks out from two permutation servers, there exists at least one perfect permutation network which does not include the two permutation servers and secret information of this perfect permutation network is entirely concealed; therefore, this perfect permutation network conceals the correspondence between its inputs and outputs, and consequently, conceals the correspondence between inputs and outputs of the anonymous channel 100 as well. Accordingly, the verifiable anonymous channel 100 with collective fault recovery function has 2-secret leakage tolerance since the anonymous channel shown in FIG. 20 is made up of the five permutation servers $PS_1$ to $PS_5$.

Generally, in the case where the verifiable anonymous channel 100 with collective fault recovery function has a network formed by a series connection of t+1 perfect permutation networks and the network is divided into V and the divided parts are formed by permutation servers, if the network is divided such that any permutation server does not span two perfect permutation networks, the verifiable anonymous channel with collective fault recovery function has t-secret leakage tolerance.

The t-fault tolerance mans a verifiable anonymous channel with collective fault recovery function which is allowed by fault recovery to ultimately provide correct outputs even if a maximum of t permutation servers among a total of V (>2t) permutation servers are not correct in operation.

Every permutation server has its secret key shared by the other permutation servers through a verifiable secret sharing scheme so that the key can be restored if t+1 or more permutation servers agree to do so. For example, let a 0-degree coefficient be a secret key $x_i$ to be concealed and assume that a value $x_{ij}=f_i(j)$ of a t-degree polynomial $f_i(z)$ related to z, for which other coefficients are determined by secret random numbers, is distributed or assigned to a j-th permutation server. If t+1 or more values $x_{ij}$ and the corresponding permutation servers j gather for one i, the secret key can be restored as $x_i=f_i(0)$ by using the following Lagrange interpolation formula concerning a set J of t+1 or more arbitrary and different j among them.

$$f_i(z) = \sum_{j \in J} \left( x_{ij} \prod_{k \in J, k \neq j} \frac{z-j}{k-j} \right)$$

Such a key secret sharing and restoring scheme is set forth, for example, in Tatsuaki OKAMOTO and Kazuo OHTA, editors, "Cryptograph/Zero-Knowledge Proof/Number Theory," pp. 62–63, Kyouritsu Shuppan Kabushikaisha, Dec. 20, 1995.

As depicted in FIG. 19, each permutation server PS is provided with a verifier P70A for verifying the validity of the input-output relations of other servers. Upon each output of a ciphertext from each permutation server PS, its validity is checked and the result of check is published on the bulletin board 400.

Each permutation server takes as its input the last output determined to be correct by inspection, then computes the product of all public keys not used so far for the partial decryption of the input, and executes the permutation/randomization/partial decryption process of the input by using the product as a parameter necessary for randomization.

When all the permutation servers mutually declare the correctness of their operation after outputting from the last permutation server, this last output is used as the ultimate list of plaintexts At all other times, in the case where three (t+1) or more permutation servers having ultimately done mutually reliable input/output operations gather after the outputting from the last permutation server, secret keys of permutation servers decided not to have correctly operated are restored by the key secret sharing and restoration scheme and the sum total is published as x'.

The ultimately reliable permutation servers restore their mutually reliable outputs by using secret keys x' and published as a list of plaintexts. The decryption by the secret key x' is based on the "Collective Processibility" condition, and the fault recovery fails when three (t+1) or more permutation servers having ultimately done mutually reliable input/output operations do not gather.

Whether the permutation server is reliable or not can be detected by verifying all of its PR partial decryptors with proof function, permuter/randomizers with proof function and fixed partial decryptors with proof function through utilization of input and proof information of the permutation server. The processing for the permutation servers performed in the order in which they are cascade-connected, and the input to each permutation server is chosen to be the output from the immediately preceding reliable permutation server. A description will be given of a retrieval scheme for choosing such a permutation server. This retrieval is performed by the decision part P60 in each permutation server.

Figure 31:
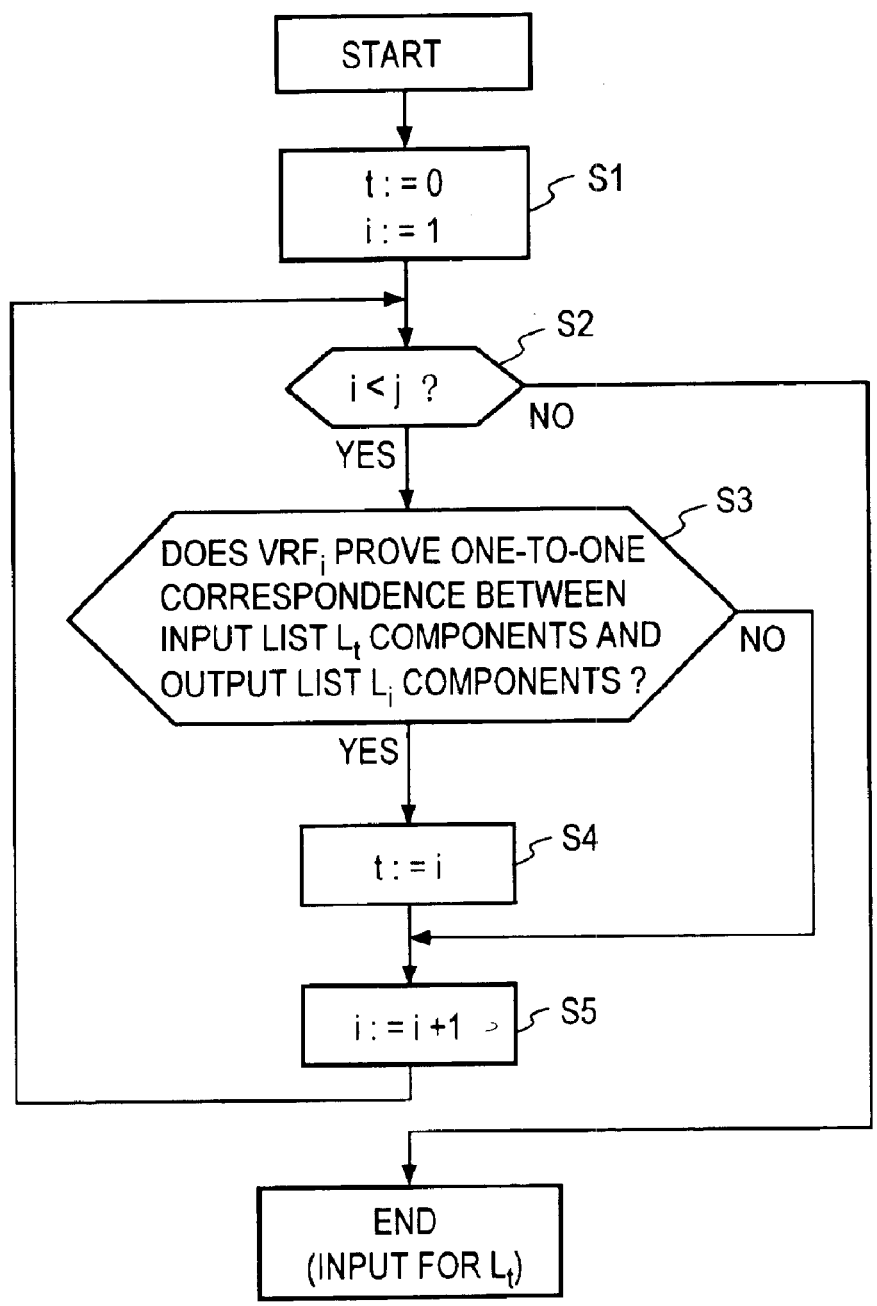
FIG. 31 is a flowchart showing an example of processing for retrieving an input list of a permutation server.

Letting $L_0$ represent input lists to the anonymous channel 100 and $L_i$ output lists from an I-th permutation server $PS_i$, the input lists $L_j$ of the j-th permutation server $PS_j$ can be obtained by such a procedure as shown in FIG. 31. Letting t represent the position of a correctly-operated permutation server immediately preceding the j-th one $PS_j$, the procedure begins with initializing t=0 and i=1 (S1). A check is made to determine whether i is smaller than j (S2), and if so, it is checked whether proof information $VRF_i$ of the i-th permutation server $PS_i$ proves a one-to-one correspondence between components of input and output lists $L_t$ and $L_i$ (S3). If so, t=i is set (S4), and i is incremented by one, which is followed by a return to step S2. When it is found in step S3 that the proof information $VRF_i$ does not prove the one-to-one correspondence between the input and output list components, the procedure goes to step S5, and when i becomes equal to or greater than j, the procedure ends; based on the value t at this time, the output list $L_t$ of the permutation server $PS_t$ becomes the input list $L_j$ of the permutation server $PS_j$.

Figure 32:
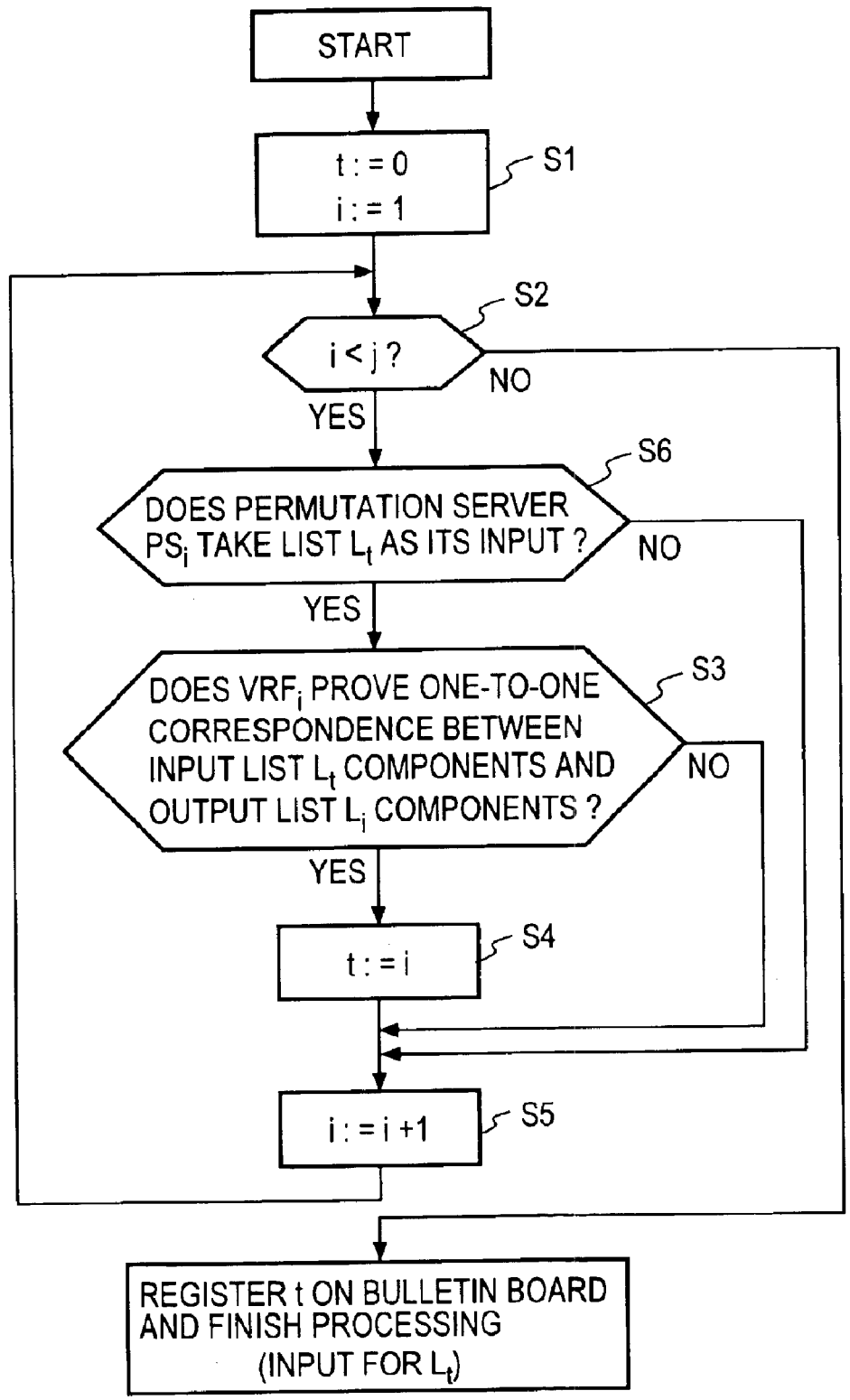
FIG. 32 is a flowchart showing another example of the input list retrieval processing.

The computational cost for the retrieval of the input list in FIG. 31 can be reduced as described below. In FIG. 31, the number t of each permutation server is registered on the bulletin board to indicate which permutation server has determined the input list concerned, and between steps S2 and S3 a check is made to see if the permutation server $PS_i$ takes as its input the output list $L_t$ of a reliable permutation server (S6) as depicted in FIG. 32. If the permutation server $PS_i$ to be verified does not take as its input the output list $L_t$ of a reliable permutation server, a decision can be made without making the verification in step S3 that the permutation server $PS_i$ performed incorrect processing. Then, as depicted in FIG. 32, when the permutation server $PS_i$ does not take as its input the list $L_t$, the procedure proceeds to step S5 without verifying the correspondence between the input and output lists $L_t$ and $L_i$ of the permutation server $PS_i$, whereas when the permutation server $PS_i$ takes as its input the list $L_t$, the procedure goes to step S3. In this way, the computation complexity can be reduced as compared with that in the case of FIG. 31. Upon completion of the verification for the permutation servers $PS_1$ to $PS_{j-1}$ (when i≧j), the value t is registered on the bulletin board in step S6 and the procedure ends.

Another example of the retrieval scheme is depicted in FIG. 33, In this example, each permutation server $PS_i$, where i=1, . . . , V, registers on the bulletin board the result of decision as to whether the preceding permutation servers are reliable as depicted in FIG. 33A. Each permutation server $PS_i$ has a register in which the results of decision about the reliability of preceding permutation servers $PS_k$ (where 1≦k≦j) are recorded as reliability information $R_k$=True or False. FIG. 33B is a table showing an example of the reliability information recorded in the register of the permutation server $PS_j$. In FIG. 33A, the results of decision on all permutation servers upstream of a (j−1)-th permutation server are indicated "reliable" by white circles and "unreliable" by crosses.

Figure 34:
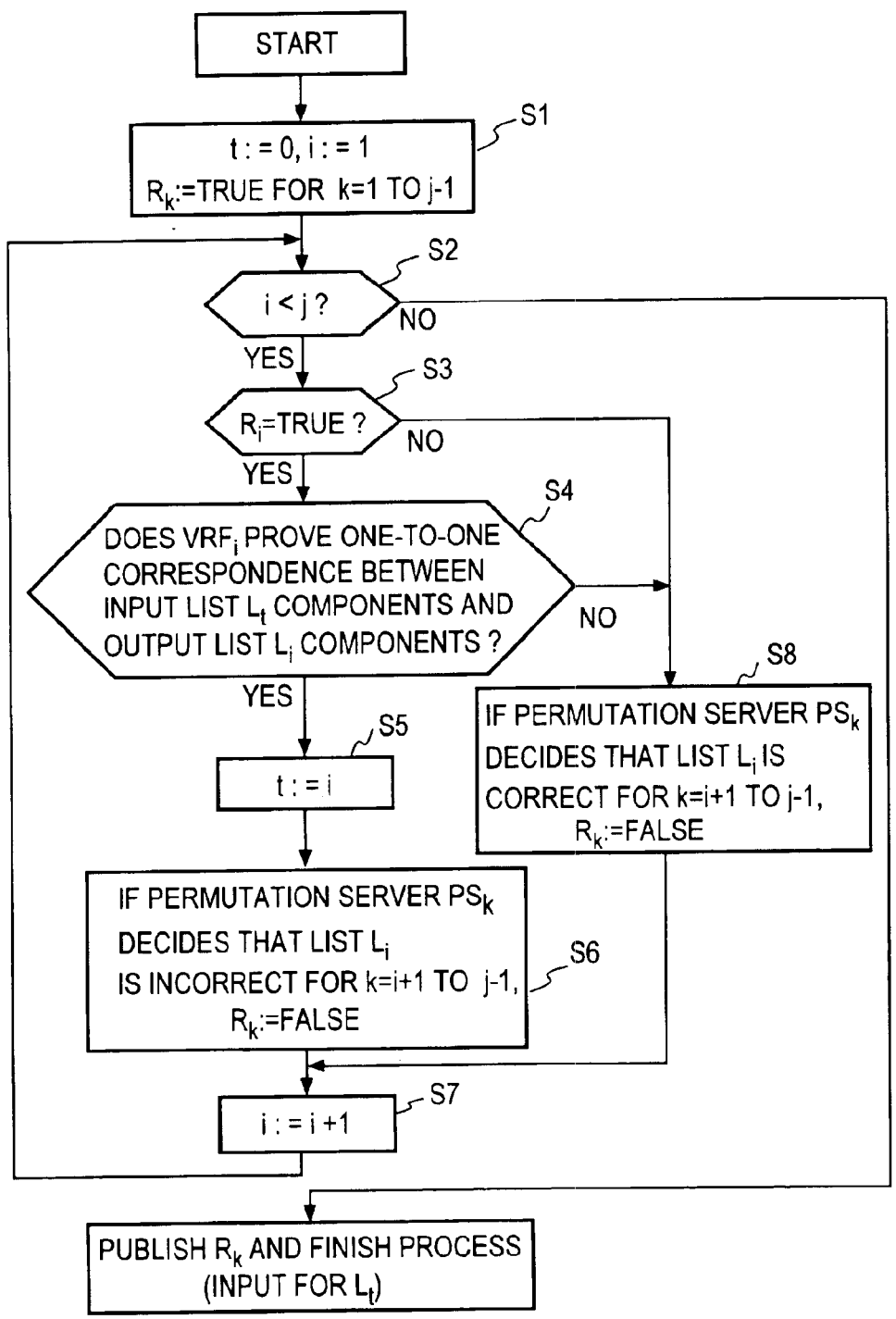
FIG. 34 is a flowchart showing still a further example of the input list retrieval processing scheme.

Since each permutation server is required to take as its input the output from the immediately preceding reliable permutation server, the j-th permutation server $PS_j$ sequentially checks preceding permutation servers, starting with the first one $PS_1$. In this case, the j-th permutation server $PS_j$ decides that, for example, the second permutation server is unreliable, but the i-th permutation server decides that the second permutation server is reliable as show in FIG. 33A. Accordingly, the j-th permutation server can decide that the i-th permutation server is unreliable. In such an instance, the j-th permutation server can skip the process for verification of the correspondence between the inputs and outputs of the i-th permutation server. Similarly, also in the case where the i-th permutation server decides the third permutation server as unreliable (reliable in FIG. 22A) although the j-th permutation server decides the third permutation server as reliable, the j-th permutation server can decide the i-th permutation server as unreliable, and in this case, too, the j-th permutation server can skip the verification of the correspondence between the inputs and outputs of the i-th permutation server. A description will be given, with reference to FIG. 34, of the input list retrieval by the j-th permutation server using this scheme.

The procedure by which the permutation server $PS_j$ retrieves its input list begins with setting t=0 and i=0 and to perform such initialization that all values $R_k$ of the register of the permutation servers $PS_j$ for k=1, . . . , j−1 are True (S1). If i is smaller than j (S2), reference is made to the register of FIG. 33B to check whether the reliability information $R_i$ of the (k−i)-th permutation server is True (S3). If $R_i$ is True (initialized True), a check is made to see if the proof information $VRF_i$ of the permutation server $PS_i$ proves the one-to-one correspondence between the components of the lists $L_t$ and $L_i$ (S4), and if so, t is updated with i (S5). In this instance, since permutation servers $PS_k$, where k=i+1, . . . , j−1, ought to judge that the output list $L_i$ of the permutation server $PS_i$ is correct, that is, the permutation server $PS_i$ is reliable, reference is made to the bulletin board of FIG. 33A, and if there is found a permutation server $PS_k$ having decides the permutation server $PS_i$ as unreliable, the reliability information $R_k$ about that permutation server $PS_k$ is changed to False (S7). Thereafter, i is incremented by one, which is followed by a return to step S2 (S7).

When it is impossible in step S4 to verify the one-to-one correspondence between the list Lt components and the list Li components, the procedure goes to step S8, in which reference is made to the bulletin board. If there is found that one of the permutation servers $PS_k$, where k=1, . . . , j−1, which has decided the permutation server $PS_i$ as reliable, the reliability information $R_k$ about that permutation server $PS_k$ is changed to False, then in step S7 in which i is increment by one, and the procedure goes back to step S2. Accordingly, in the subsequent execution of the loop, when in step S2 i becomes i=k which is the number of the permutation server whose reliability information $R_k$ in its register was changed to False in step S4 or S8 in the previous process, the reliability information $R_k$ of that server in the register is held False in step S3, and consequently, the procedure proceeds to step S8 without conducting the verification of step S4.

When i exceeds j in step S2, the list Lt at that time is determined as the input list $L_j$ and the reliability information $P_k$ about every permutation server $PS_k$ is published (registered in the bulletin board), with which the procedure ends.

As described above, the computational cost for the retrieval of the output list to be input to each permutation server can be reduced through utilization of the reliability information $R_k$ that is the results of various inspections.

Figure 35:
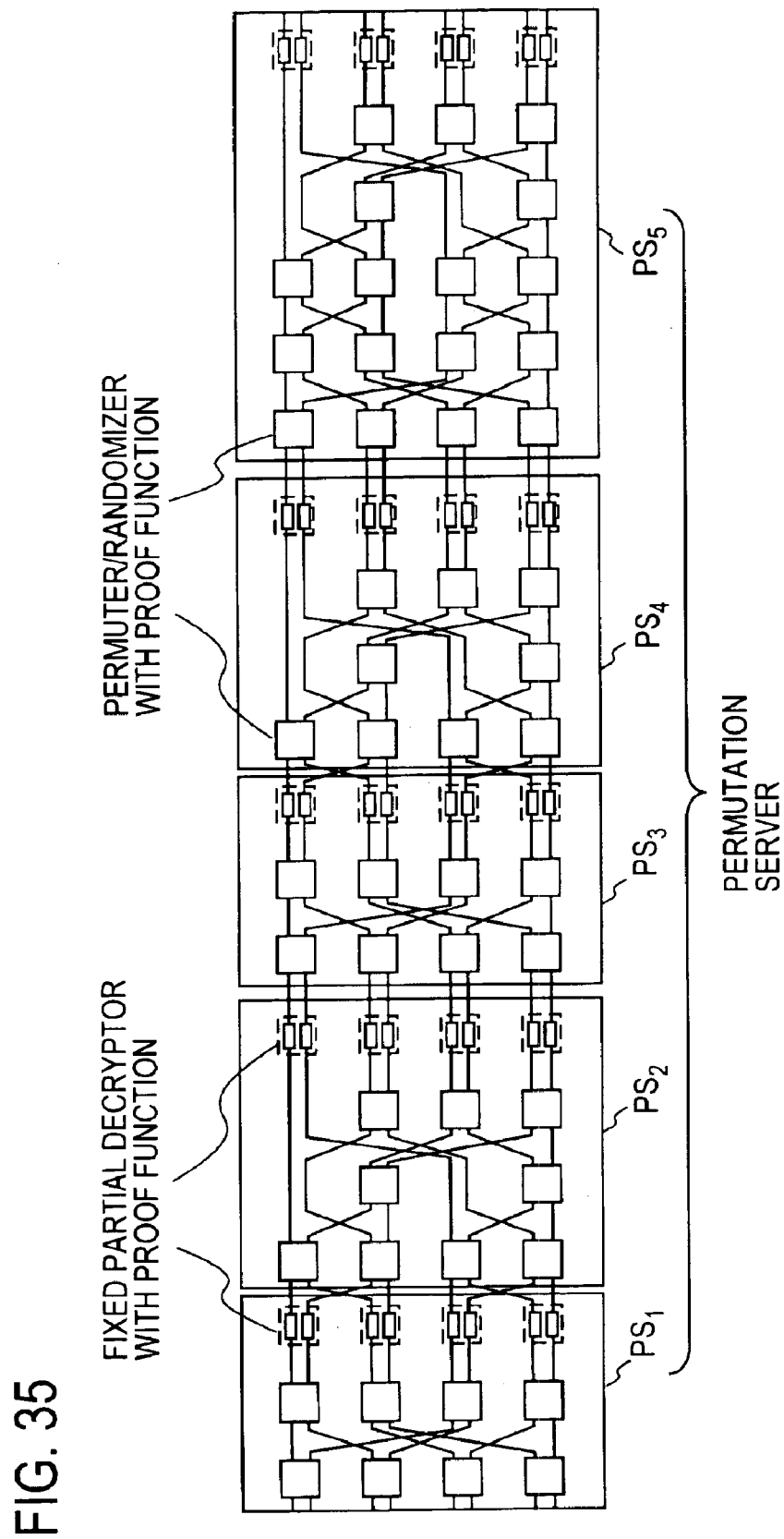
FIG. 35 is a block diagram illustrating another embodiment of the anonymous channel according to the present invention.

In the FIG. 20 embodiment the permutation servers PS1 to PS5 each employ the PR partial decryptors with proof function alone or in combination with the fixed partial decryptors with proof function. However, each permutation server PS may be formed using the permuter/randomizer with proof function and the fixed partial decryptor with proof function. In FIG. 35, the PR partial decryptors with proof unction in FIG. 20 are replaced with permuter/randomizers with proof function, the fixed partial decryptors with proof function in FIG. 20 are adapted to output the inputs intact, and a fixed partial decryptor is provided on each row in the column following the last column of each permutation server.

Furthermore, for example, all of the processors on the respective rows in the first column of the permutation server PS1 in FIG. 20 may be substituted with permuter/randomizers with proof function. The point is that the permutation server needs only to execute the permutation/randomization process with proof function as a whole and partial decryption process with proof function by the processors in at least one column. Incidentally, in the case where no t-fault tolerance is needed and only the t-secret leakage tolerance is required, it is enough to use t+1 permutation networks formed with no overlapping of permutation servers, and the condition V>2t is not necessary.

In the embodiments of the present invention described above, the permutation network, which constitutes the anonymous channel according to the present invention, may be constructed by connecting two-input two-output unit switching gates SW (SWF) under certain rules. For example, in the case of $N=2^k$ inputs, a permutation network in which $2^{k-1}$ unit switching gates SW (SWF) are arranged in (2k−1) columns may be designed so that one data processor in each column receives the results of processing in the preceding column, performs processing of 2k−1 unit switching gates SW, and outputs the results of processing one after another. Moreover, one processor may also execute processing to be performed by the (2k−1) data processors in the (2k−1) columns.

For example, when one data processor is provided in each of the (2k−1) columns, the processor in the J-th column sequentially takes therein El Gamal ciphertexts (M, G) that are $2^k$ results of processing in the preceding column, and sequentially outputs under predetermined rules ciphertexts (M', G') obtained by the permutation/randomization/partial decryption process as described previously. The procedure in this case will be described below with reference to FIGS. 36 to 39.

Figure 36:
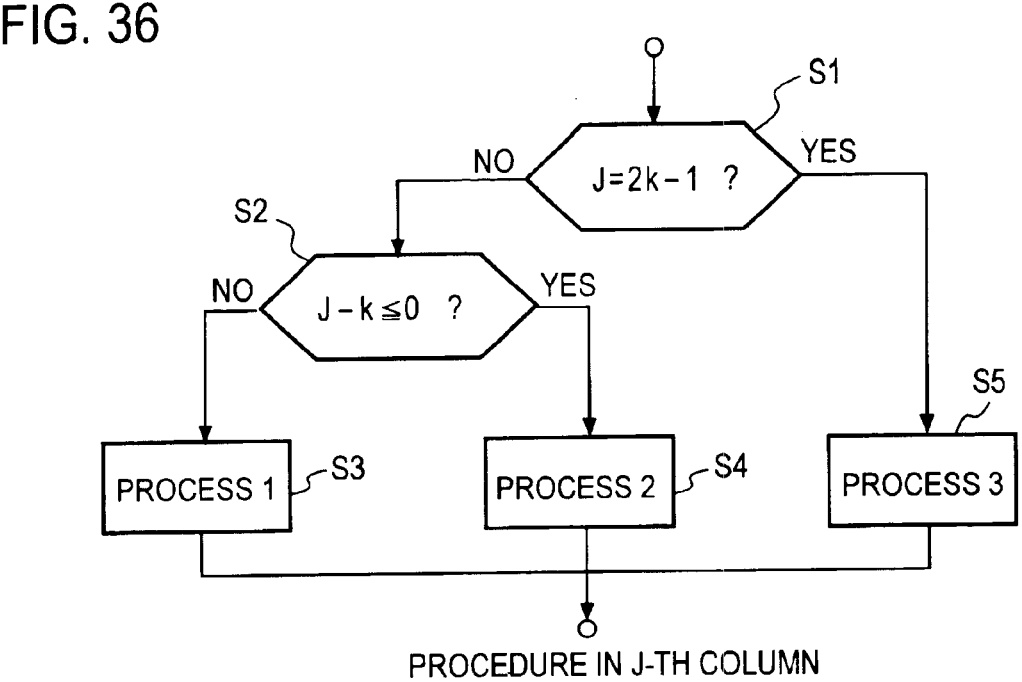
FIG. 36 is a flowchart showing a permutation process selecting procedure in a J-th column of the permutation network according to the value J.

FIG. 36 depicts the procedure in the J-th column. In this case, it is decided to which of 1 to k−1 columns, k to 2k−1 columns and 2k−1 column the processor in the J-th column belongs, and it is determined which of processes 1, 2 and 3 is to be performed. Assume that the processor in each column has N output registers which store N process results in correspondence with the positions of $N=2^k$ output terminals.

Figure 39:
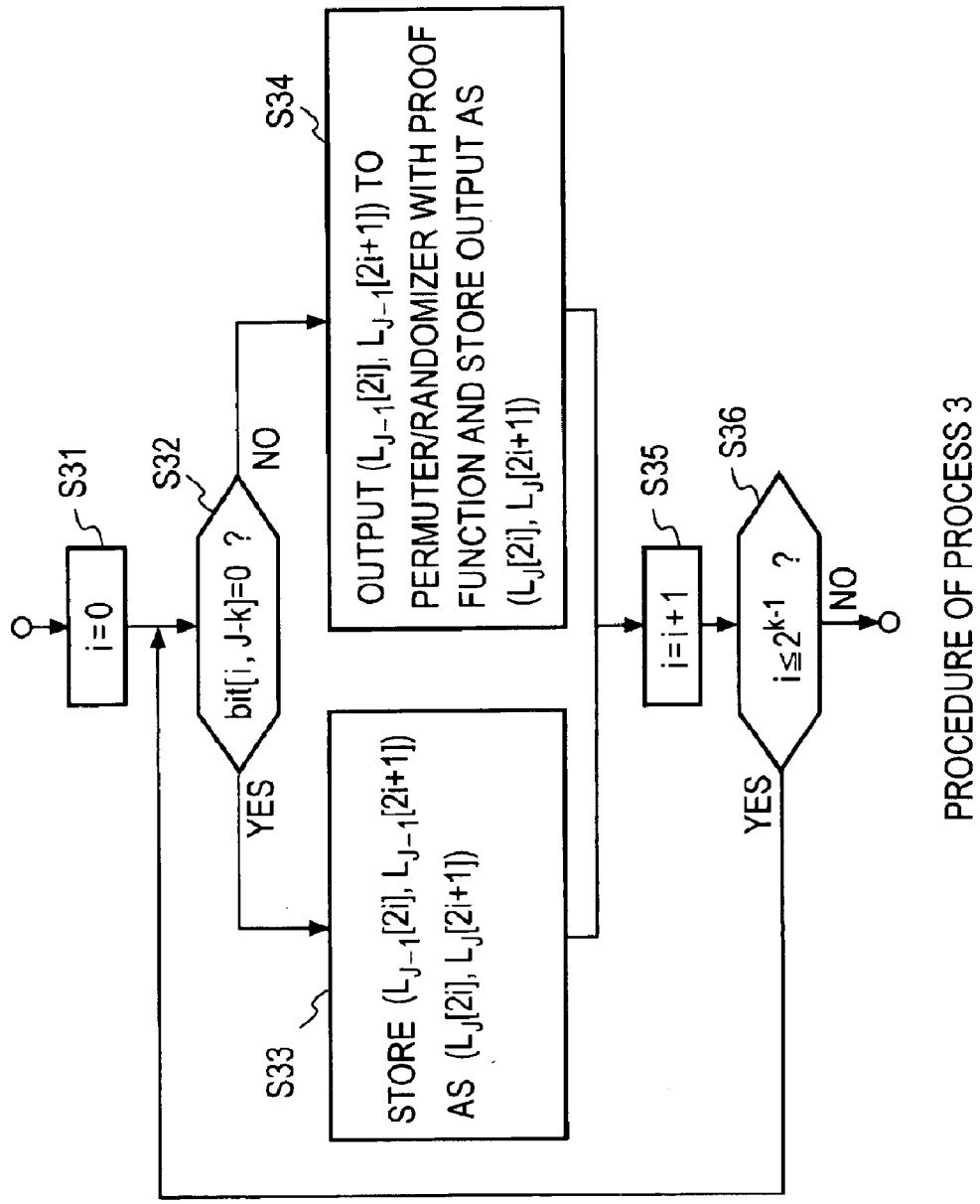
FIG. 39 is a flowchart showing the procedure of process 3 in FIG. 36.

Step S1: Decide whether J=2k−1, that is, whether J is the last column. If so, proceed to the execution of Process 3 (FIG. 39). If not, proceed to step S2.

Figure 38:
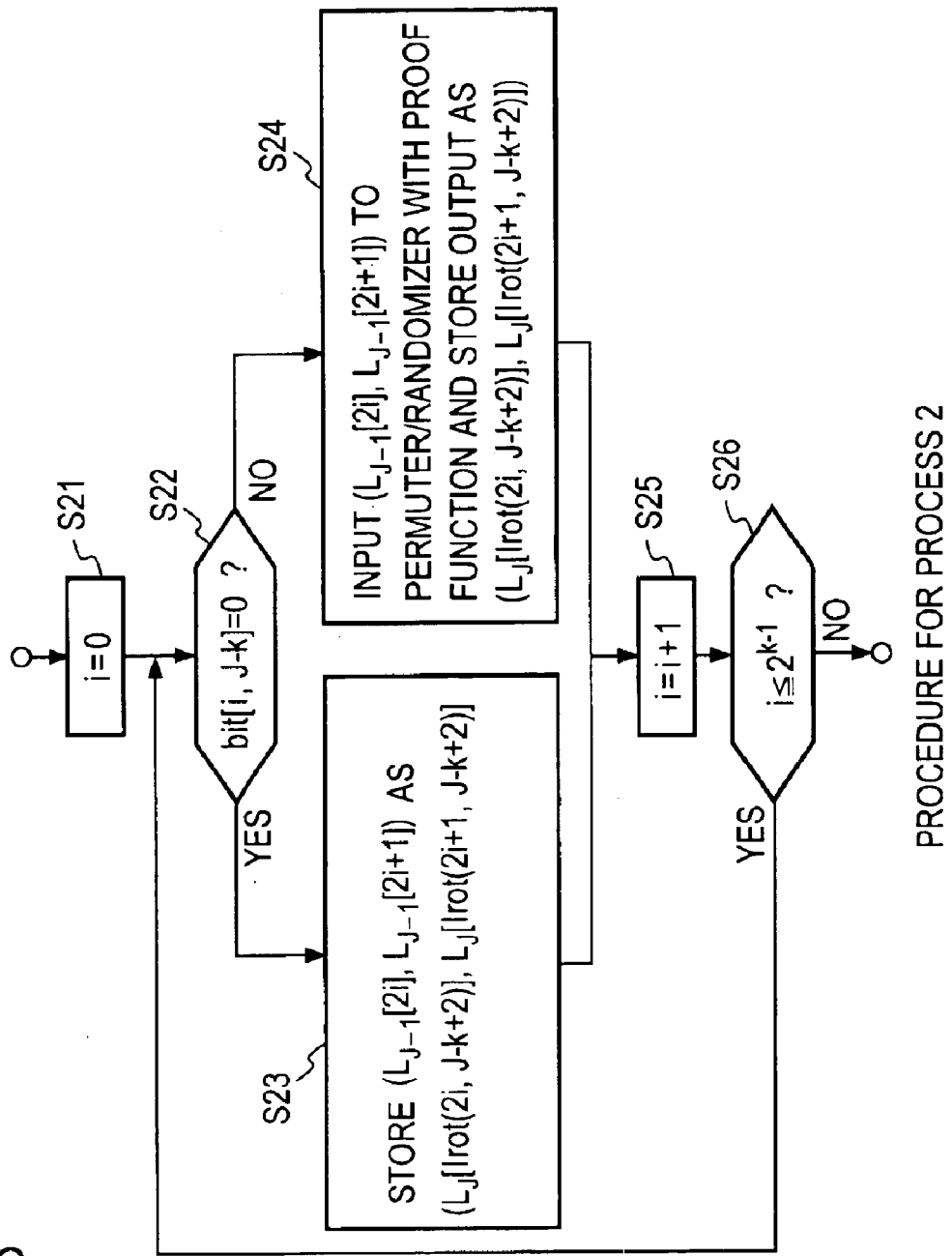
FIG. 38 is a flowchart showing the procedure of process 2 in FIG. 36.

Step S2: Decide whether j−k≧0, that is, whether J is a value in the range from k to 2k−2. If so, proceed to the execution of Process 2 (FIG. 38). If not, proceed to step S3.

Step S3: J is a value in the range from 1 to k−1, and proceed to the execution of Process 1 (FIG. 37)

Figure 37:
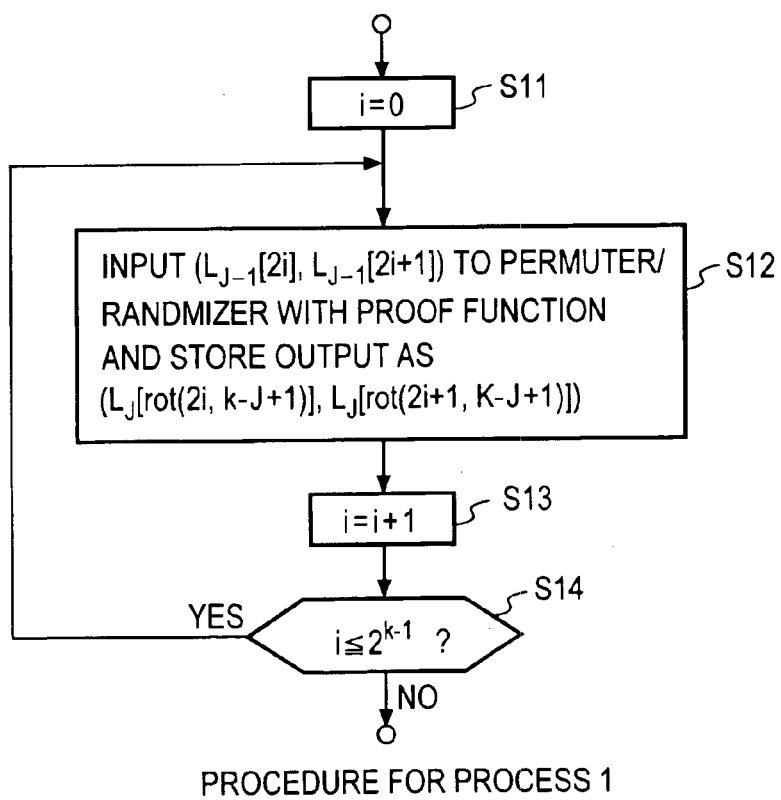
FIG. 37 is a flowchart showing the procedure of process 1 in FIG. 36.

FIGS. 37, 38 and 39 are flowcharts of Processes 1, 2 and 3. $(L_{J-1}[2i], L_{J-1}[2i+1])$ represent ciphertexts $(M_{2i}, G_{2i})$ and $(M_{2i+1}, G_{2i+1})$ at positions [2i] and [2i+1] of two outputs to be randomly permuted in a (J−1)-th column. 1rot(u, v) means the transformation of binary data u by a one-bit left rotation of its low-order v-bit data. For example, assuming that u=10110 and v=3, 1rot(u, v) is to transform u to 10101 by a one-bit left rotation of the right-hand three bits of 10110. Similarly, rot(u, v) means the transformation of the data u by a one-bit right rotation of its low-order v-bit data.

bit[x, y] represent the value of low-order y its of x of the binary notation. For example, when x=10001 and y=4, bit[x, y]=1.

Process 1 shown in FIG. 37 is processing in permutation columns J=1, . . . , k−1. In these columns all the pairs of ciphertexts $(L_{J-1}[2i], L_{J-1}[2i+1])$ are subjected to random permutation, randomization and partial decryption as described below.

Step S11: Initialize i=0.

Step S12: Execute the permutation/randomization/partial decryption with proof function for two ciphertexts ($L_{J-1}[2i]$, $L_{J-1}[2i+1]$) to be randomly permuted in the columns 2i-th and (2i+1)-th from the (J−1)-th column, and store the results of process in [rot(2i,k−J+1)]-th and [rot(2i+1,k−J+1)]-th output registers, respectively.

Step S13: Increment i by one.

Step S14: Determine if $i \leq 2^{k-1}$. If so, there remains unprocessed data; return to step S11. If not, end the data processing in the J-th column.

Process 2 shown in FIG. 38 is processing in permutation columns J=1, . . . , 2k−1. In these columns the pair of input ciphertexts ($L_{J-1}[2i]$, $L_{J-1}[2i+1]$) are subjected to such processing as described below.

Step S21: Initialize i=0.

Step S22: Determine if bit[I,J−k]=0. If YES, it means processing by the fixed switching gate SWF; proceed to step S23. NO means processing by the switching gate SW; proceed to step S24.

Step S23: Store a pair of 2i-th and (2i+1)-th ciphertexts ($L_{J-1}[2i]$, $L_{J-1}[2i+1]$) from the preceding column ((J−1)-th) intact in [1rot(2i,J−k+2)]-th and [1rot(2i+1,J−k+2)]-th output registers, respectively.

Step S24: Execute the permutation/randomization/partial decryption with proof function for a pair of 2i-th and (2i+1)-t ciphertexts ($L_{J-1}[2i]$, $L_{J-1}[2i+1]$) from the (J−1)-th column, and store the results of process in [1rot(2i,J−k+2)]-th and [1rot(2i+1,J−k+2)]-th output registers, respectively.

Step S25: Increment i by one.

Step S26: Determine if $i \leq 2^{k-1}$. If so, there remains unprocessed data; return to step S22. If not, end the data processing in the J-th column.

Process 3 shown in FIG. 39 is processing in the last column J=2k−1. In this column a pair of input ciphertexts ($L_{J-1}[2i]$, $L_{J-1}[2i+1]$) from the preceding column are subjected to such processing as described below.

Step S31: Initialize i=0.

Step S32: Determine if bit[I,J−k]=0. If YES, it means processing by the fixed switching gate SWF; proceed to step S33. NO means processing by the switching gate SW; proceed to step S34.

Step S33: Store a pair of 2i-th and (2i+1)-th ciphertexts ($L_{J-1}[2i]$, $L_{J-1}[2i+1]$) intact in 2i-th and (2i+1)-th output registers, respectively.

Step S34: Execute the permutation/randomization/partial decryption with proof function for a pair of 2i-th and (2i+1)-th ciphertexts ($L_{J-1}[2i]$, $L_{J-1}[2i+1]$) from the (J−1)-th column, and store the results of process in 2i-th and (2i+1)-th output registers, respectively.

Step S35: Increment i by one.

Step S36: Determine if $i \leq 2^{k-1}$. If so, there remains unprocessed data; return to step S32. If not, end the data processing in the J-th column.

In the case of executing the processes in all (2k−1) columns, the procedures of FIGS. 36 to 39 need only to be repeated for J=1, 2, . . . , 2k−1 in a sequential order.

The permutation/randomization/decryption process according to the present invention described above may be recorded as computer programs on a recording medium so that they read out therefrom to perform the process.

The functions of the encryption and the decryption apparatus described above may also be recorded as computer programs so that they are read out therefrom to implement the desired functions.

Figure 40:
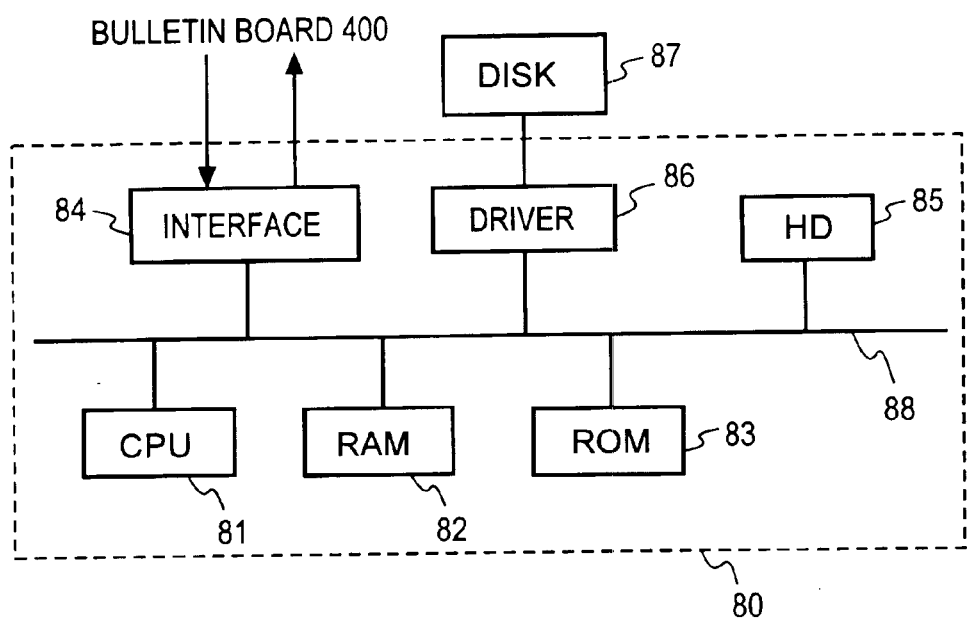
FIG. 40 is a conceptual diagram of a computer which reads out a program of the PR partial decryption method with proving function according to the present invention from a recording medium and performs the PR partial decryption.

FIG. 40 depicts the configuration of a computer for implementing the permutation/randomization/partial decryption with proof function in the permutation network forming the anonymous channel according to the present invention. The computer, indicated generally by 80, comprises a CPU 81, a RAM 82, ROM 83, an I/O interface 84 and a had disk 85 interconnected via a bus 88. In the ROM 83 there is a basic program for the operation of the computer 80, and in the had disk 85 there is prestored a program for implementing the permutation/randomization/partial decryption process according to the present invention which is executed by the afore-mentioned, for example, one permutation server. During encryption an encryption program is loaded from the hard disk 85 into the RAM 82 and encrypted votes read from the bulletin board 400 via the interface 84 are processed under program control to decrypt the encrypted votes via the anonymous channel, and the decrypted votes are output to the bulletin board 400 via the interface 84.

The program for implementing the permutation/randomization/partial decryption scheme according to the present invention may be a program recorded on an external disk unit 87 connected via a driver 86 to the bus 88. The recording medium for recording the program for implementing the scheme of the present invention may be any kinds of recording media such as a magnetic recording medium, an IC memory and a compact disk.

Effect of the Invention

Through utilization of the fact that the permutation of a small number of inputs is relatively easy, the present invention performs the entire permutation by repeated permutation of a small number of inputs. Letting N represent the total number of inputs, the computation and communication costs for proving the overall permutation can be reduced to a value proportional to N log 2N, making it possible to construct an efficient verifiable anonymous channel.

In the prior art, upon each detection of a fault in one permutation server, a compensation process is performed, and consequently, when t devices are faulty, the compensation processes needs to be carried out t times. According to the present invention, however, even if the outputs from t of V permutation servers are not reliable, the process proceeds bypassing the unreliable (faulty or corrupt) devices, and at the end of processing, plaintexts can be obtained using keys restored by a key secret sharing scheme. That is, a fault recovery can be achieved by only one faulty recovery process.

Furthermore, according to the present invention, the fault recovery can be achieved t times faster than in the prior art, and hence the throughput of the verifiable anonymous channel can be maintained efficiently.

Besides, t-secret leakage tolerance can be obtained by cascade-connecting t+1 perfect permutation networks without using permutation servers in common to them.

What is claimed is:

1. A verifiable anonymous channel in which N encrypted input messages, where N is an integer equal to or greater than 2, are permuted and randomized to obtain N output messages and it is proved to an arbitrary verifier that said output messages and said input messages have a one-to-one correspondence with each other, comprises:

unit permutation means which: randomly permutes n inputs, where n is an integer equal to or greater than 2 but not exceeding said N, and randomizes said n inputs with secret information to provide n outputs; and executes a zero-knowledge proof to said arbitrary verifier that guarantees the existence of said secret information and said random permutation which indicate the correspondence between said n inputs and said n outputs without revealing said secret information and said random permutation to said arbitrary verifier;

first repeating means which performs the processing of N inputs by said unit permutation means in groups of n to provide N outputs; and second repeating means which performs the processing of said N messages, provided thereto as initial inputs, by said first repeating means to provide said N outputs and performs the processing of said N outputs as said N inputs by said first repeating means a predetermined number of times to obtain N permuted and randomized output messages that have a one-to-one correspondence with said N messages.

2. The channel of claim 1, wherein said first repeating means comprises a plurality of unit permutation means each processing said n inputs in groups of n.

3. The channel of claim 1 or 2, wherein said second repeating means comprises a cascade-connection of a plurality of said first repeating means.

4. The channel of claim 3, wherein said unit permutation means forms a permutation network containing at least one perfect permutation network.

5. The channel of claim 3, wherein said n is 2 and each of said unit permutation means comprises: random generating means for generating a switching random number which randomly takes either one of two values; and switching control means responsive to said switching random number to control whether to output two outputs after permuting them or to output said two outputs intact.

6. The channel of claim 1, wherein said unit permutation means comprises: partial decryption means for partially decrypting said n results of permutation and randomization through the use of a partial decryption key to obtain said N outputs; and partial decryption proof generating means for generating a zero-knowledge proof that proves the use of said partial decryption key for said partial decryption without revealing said partial decryption key.

7. The channel of claim 1, wherein said second repeating means comprises a cascade-connection of V permutation serves each composed of one first repeating means or a plurality of cascade-connected first repeating means, said V being an integer equal to or greater than 2.

8. The channel of claim 7, wherein said unit permutation means comprises: partial decryption means for partially decrypting said n results of permutation and randomization through the use of a partial decryption key to obtain said N outputs; and partial decryption proof generating means for generating a zero-knowledge proof that proves the use of said partial decryption key for said partial decryption without revealing said partial decryption key.

9. The channel of claim 8, wherein said partial decryption key is verifiably secret-shared by all the other permutation servers in advance, and which further comprises: means for recovering each partial decryption key by shared keys of permutation servers of reliable outputs when the outputs from t permutation servers are not reliable, said t being smaller than V/2; and means for collectively decrypting the outputs from output-reliable permutation servers to obtain plaintexts through the use of all of said recovered partial decryption keys.

10. The channel of claim 8, wherein a perfect permutation network, which is capable of performing every permutation of said N input messages when permitting leakage of the permutation by a maximum of t permutation servers, is formed by a concatenation of t+1 permutation servers, is formed by a concatenation of t+1 permutation servers among said V cascade-connected permutation servers.

11. The channel of claim 9 or 10, wherein each of said permutation servers comprises verification means for verifying the reliability of the outputs from the other permutation servers through the use of their inputs, outputs and proof information; and decision means for causing reliable permutation servers to execute processing while bypassing said unreliable permutation servers.

12. The channel of claim 11, wherein: said verification means of said each permutation server sequentially verifies the outputs from said permutation servers upstream of said each permutation server; and said decision means decides, based on the results of said verification, whether said upstream permutation servers are reliable, the output from that one of said upstream permutation servers which is closest to said each permutation server and decided reliable being input to said each permutation server.

13. The channel of claim 12, wherein further comprises bulletin board means for publishing the result of decision on the reliability of said permutation means by said decision means, and wherein said decision means refers to the result of decision published on said bulletin board means in the decision on the input for the corresponding permutation means.

14. The channel of claim 13, wherein: the result of decision published on said bulletin board means is information indicating the permutation server having output input data that every permutation server decided reliable; and said decision means of said each permutation server skips the verification of the inputs and outputs of the permutation server to be verified when said permutation server to be verified is the unreliable permutation server published on said bulletin board.

15. The channel of claim 13, wherein: the result of decision published by each of said permutation servers is the result of decision made by said each permutation means about the reliability of every permutation servers; said each permutation server has a register for recording reliability information about said permutation servers upstream of said each permutation server; and when the result of decision about the reliability of said upstream permutation servers published by the other permutation servers is different from the result of decision by said each permutation server, said each permutation server decides that the permutation server published said different result of decision is unreliable, and registers the decision in said register and skips the verification of the inputs and outputs of said permutation server decided unreliable.

16. The channel of claim 7, which further comprises non-erasable bulletin board means connected to said each permutation server, and wherein said each permutation server reads input data from said bulletin board means and writes the result of processing in said bulletin board means.

17. The channel of claim 16, which further comprises decryption server means for verifying the result of permutation of said each permutation server and for decrypting data output from the last column of a permutation network, and it verification server for verifying a permutation proof of said each permutation server and a decryption proof of said decryption server means, said decryption server means and said verification server being connected to said bulletin board.

18. The channel of claim 17, wherein said decryption server means comprises a plurality of decryption servers each connected to said bulletin board, for performing partial decryption.

19. The channel of any one of claims 1, 2, 6 or 7, wherein said encrypted messages are El Gamal ciphertexts.

20. A verifiable anonymous communication method in which N encrypted input messages, where N is an integer equal to or greater than 2, are permuted and randomized to obtain N output messages and it is proved to an arbitrary verifier that said output messages and said input messages have one-to-one correspondence with each other, comprise the steps of:
  (a) randomly permuting n inputs, where n is an integer equal to or smaller than 2 but not exceeding said N, and randomizing said n inputs with secret information to provide n outputs, and executing a zero-knowledge proof to said arbitrary verifier that guarantees the existence of said secret information and said random permutation which indicate the correspondence between said n inputs and said n outputs without revealing said secret information and said random permutation to said arbitrary verifier;
  (b) performing the processing of N inputs by said unit permutation means in groups of n to provide N outputs; and
  (c) performing the processing of said N messages, provided thereto as initial inputs, by said first repeating means to provide said N outputs and performing the processing of said N outputs as said N inputs by said first repeating means a predetermined number of times to obtain N permuted and randomized output messages that have a one-to-one correspondence with said N messages.

21. The method of claim 20, wherein said step (b) include a step of processing said n inputs by said step (a) a plurality of times.

22. The method of claim 20 or 21, wherein said step (c) includes a step of repeating said step (a) a plurality of times.

23. The method of claim 21, wherein said n is 2 and said step (a) comprises: a random generating step of generating a switching random number which randomly takes either one of two values; and a switching control step of responding to said switching random number to control whether to output two outputs after permuting them or to output said two outputs intact.

24. The method of claim 20, wherein said step (a) comprises: a step of partially decrypting said n results of permutation and randomization through the use of a partial decryption key to obtain said N outputs; and a step of generating a zero-knowledge proof that proves the use of said partial decryption key for said partial decryption without revealing said partial decryption key.

25. The method of claim 20, wherein said step (c) comprises a step of performing said step (b) V cascade-connected permutation servers once or more times, said V being an integer equal to or grater than 2.

26. The method of claim 25, wherein said step (a) comprises: a step of partially decrypting said n results of permutation and randomization through the use of a partial decryption key to obtain said N outputs; and a step of generating a zero-knowledge proof that proves the use of said partial decryption key for said partial decryption without revealing said partial decryption key.

27. The method of claim 26, wherein said partial decryption key is verifiably secret-shared by all the other permutation servers in advance, and which further comprises the steps of:
  (d) recovering each partial decryption key by shared keys of permutation servers of reliable outputs when the outputs from t permutation servers are not reliable, said t being smaller than V/2; and
  (e) collectively decrypting the output from output-reliable permutation on servers to obtain plaintexts through the use of all of said recovered partial decryption keys.

28. The method of claim 26, wherein a perfect permutation network, which is capable of performing every permutation of said N input messages when permitting leakage of the permutation by a maximum of t permutation servers, is formed by a concatenation of t+1 permutation servers among said V cascade-connected permutation servers.

29. The method of claim 27 or 28, wherein each of said permutation servers verifies the reliability of the outputs from the other permutation servers through the use of their inputs, outputs and proof information, and causes reliable permutation servers to execute processing while bypassing said unreliable permutation servers.

30. The method of claim 29, wherein said each permutation server sequentially verifies whether the outputs from said permutation servers upstream of said each permutation server are correct, and uses, as the input to said each permutation server, the output from that one of said upstream permutation servers which is closest to said each permutation server.

31. The method of claim 30, wherein said each verifier publishes the result of decision on the reliability of said permutation means on a bulletin board, and said each permutation server refers to the result of decision published on said bulletin board means in the decision on the input for the corresponding permutation means.

32. The method of claim 31, wherein: the result of decision published on said bulletin board means is information indicating the permutation server having output input data that every permutation server decided reliable; and said each permutation server skips the verification of the inputs and outputs of the permutation server to be verified when said permutation server to be verified is the unreliable permutation server published on said bulletin board.

33. The method of claim 31, wherein: the result of decision published by each of said permutation servers is the result of decision made by said each permutation means about the reliability of every permutation servers; said each permutation server has a register for recording reliability information about said permutation servers upstream of said each permutation server; and when the result of decision about the reliability of said upstream permutation servers published by the other permutation servers is different from the result of decision by said each permutation server, said each permutation server decides that the permutation server published said different result of decision is unreliable, and registers the decision in said register and skips the verification of the inputs and outputs of said permutation server decided unreliable.

34. The method of claim 25, wherein there is provided non-erasable bulletin board means connected to said each permutation server, and wherein said each permutation server reads input data from said bulletin board means and writes the result of processing in said bulletin board means.

35. The method of claim 34, wherein there are provided decryption server means and a verification server connected to said bulletin board means, and wherein: said decryption server means verifies the result of permutation of said each permutation server, decrypts data output from the last column of a permutation network, and generates and writes a decryption proof in said bulletin board means; and said verification server verifies a permutation proof of said each permutation server and said decryption proof of said decryption server means.

36. The method of claim 35, wherein said decryption server means comprises a plurality of decryption servers each connected to said bulletin board, each of said plurality of decryption servers performing partial decryption.

37. The method of any one of claims 20, 21, 24 or 25, wherein said encrypted messages are El Gamal ciphertexts.

38. A recording medium having recorded thereon a program for implementing a verifiable anonymous communication method in which N encrypted input messages, are permutated and randomized to obtain N output messages and it is proved to an arbitrary verifier that said output and said input messages have a one-to-one correspondence with each other, said N being an integer equal to or greater than 2, said program comprising the steps of:

(a) randomly permuting n inputs, where n is an integer equal to or smaller than 2 but not exceeding said N, and randomizing said n inputs with secret information to provide n outputs, and executing a zero-knowledge proof to said arbitrary verifier that guarantees the existence of said secret information and said random permutation which indicate the correspondence between said n inputs and said n outputs without revealing said secret information and said random permutation to said arbitrary verifier;

(b) performing the processing of N inputs by said unit permutation means in groups of n to provide N outputs; and (c) performing the processing of said N messages, provided thereto as initial inputs, by said first repeating means to provide said N outputs and performing the processing of said N outputs as said N inputs by said first repeating means a predetermined number of times to obtain N permuted and randomized output messages that have a one-to-one correspondence with said N messages.

39. The recording medium of claim 38, wherein said step (b) includes a step of processing said n inputs by said step (a) a plurality of times.

40. The recording medium of claim 38 or 39, wherein said step (c) includes a step of repeating said step (a) a plurality of times.

41. The recording medium of claim 39, wherein said n is 2 and said step (a) comprises: a random generating step of generating a switching random number which randomly takes either one of two values; and a switching control step of responding to said switching random number to control whether to output two outputs after permuting them or to output said two outputs intact.

42. The recording medium of claim 38, wherein said step (c) comprises a step of performing said step (b) V cascade-connected permutation servers once or more times, said V being an integer equal to or greater than 2.

43. The recording medium of claim 38, wherein said step (a) comprises: a step of partially decrypting said n results of permutation and randomization through the use of a partial decryption key to obtain said N outputs; and a step of generating a zero-knowledge proof that proves the use of said partial decryption key for said partial decryption without revealing said partial decryption key.

44. The recording medium of any one of claims 38, 39, 42 or 43, wherein said encrypted messages are El Gamal ciphertexts.

* * * * *